(12) United States Patent
Savicki, Jr. et al.

(10) Patent No.: US 11,990,301 B2
(45) Date of Patent: May 21, 2024

(54) PROTECTIVE WIRING DEVICE

(71) Applicant: Pass & Seymour, Inc., Syracuse, NY (US)

(72) Inventors: Gerald R. Savicki, Jr., Canastota, NY (US); Syed J. Jamal, Rochester, NY (US); Clayton Roberts, Tully, NY (US); Richard Rohmer, Memphis, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 501 days.

(21) Appl. No.: 16/967,331

(22) PCT Filed: Feb. 8, 2019

(86) PCT No.: PCT/US2019/017336
§ 371 (c)(1),
(2) Date: Aug. 4, 2020

(87) PCT Pub. No.: WO2019/157371
PCT Pub. Date: Aug. 15, 2019

(65) Prior Publication Data
US 2021/0035760 A1 Feb. 4, 2021

Related U.S. Application Data

(60) Provisional application No. 62/733,920, filed on Sep. 20, 2018, provisional application No. 62/725,560, (Continued)

(51) Int. Cl.
*H01H 71/04* (2006.01)
*H01H 71/02* (2006.01)
*H02H 3/04* (2006.01)

(52) U.S. Cl.
CPC ........ *H01H 71/0207* (2013.01); *H01H 71/04* (2013.01); *H02H 3/044* (2013.01)

(58) Field of Classification Search
CPC .. H01H 71/0207; H01H 71/04; H01H 83/226; H02H 3/044; H02H 3/162; H02H 3/33; H02H 3/334
(Continued)

(56) References Cited

U.S. PATENT DOCUMENTS 2,270,353 A 1/1942 Spruck
3,121,826 A 2/1964 Kniel et al.
(Continued)

OTHER PUBLICATIONS

International Search Report Form PCT/ISA/220, International Application No. PCT/US19/17336, pp. 1-10 dated Jun. 7, 2019.

*Primary Examiner* — Mohamad A Musleh
*Assistant Examiner* — Lisa N Homza
(74) *Attorney, Agent, or Firm* — Bond, Schoeneck & King PLLC; Frederick J. M. Price

(57) ABSTRACT

A protective electrical wiring device including: a plurality of line terminals including a first line terminal and a second line terminal; a plurality of load terminals including a first load terminal and a second load terminal, wherein the plurality of line terminals and the plurality of load terminals are configured to be coupled to an AC electrical distribution system; a pair of contacts including a first contact and a second contact; and a latch block being configured to move between a first position and a second position, wherein in the first position the latch block permits the first line terminal and the first load terminal to be in contact with the first contact and the second line terminal and second load terminal to be in contact with the second contact, wherein, when moving from the first position to the second position, the latch block advances at least one of the first line terminal and the first
(Continued)

load terminal away from the first contact and at least one of the second line terminal and the second load terminal away from the second contact.

9 Claims, 82 Drawing Sheets

Related U.S. Application Data filed on Aug. 31, 2018, provisional application No. 62/628,659, filed on Feb. 9, 2018.

(58) Field of Classification Search
USPC .......................................................... 335/172
See application file for complete search history.

(56) References Cited

U.S. PATENT DOCUMENTS

| | | | | |
|---|---|---|---|---|
| 7,554,781 B1* | 6/2009 | Weeks | ............... | H01R 13/7135 |
| | | | | 335/22 |
| 7,751,160 B1* | 7/2010 | Radosavljevic | ....... | H01H 83/04 |
| | | | | 361/45 |
| 8,120,882 B1* | 2/2012 | Radosavljevic | ....... | H01H 83/04 |
| | | | | 361/42 |
| 2003/0080837 A1* | 5/2003 | Macbeth | .................. | H02H 3/05 |
| | | | | 335/18 |
| 2003/0206085 A1* | 11/2003 | Germain | ................ | H01H 83/04 |
| | | | | 335/166 |
| 2007/0188276 A1* | 8/2007 | Shi | ......................... | H01H 83/04 |
| | | | | 335/6 |
| 2007/0268635 A1* | 11/2007 | Bonasia | ................ | H01H 83/04 |
| | | | | 361/42 |
| 2009/0035967 A1 | 2/2009 | Weeks et al. | | |
| 2009/0184787 A1* | 7/2009 | Weeks | ................... | H01H 71/58 |
| | | | | 335/18 |
| 2010/0053826 A1 | 3/2010 | Finlay et al. | | |
| 2010/0123982 A1* | 5/2010 | Weeks | ................... | H01H 71/02 |
| | | | | 361/42 |
| 2011/0188160 A1* | 8/2011 | Weeks | ................... | H01H 71/02 |
| | | | | 361/42 |
| 2011/0261490 A1* | 10/2011 | Weeks | ................... | H01H 71/02 |
| | | | | 361/63 |
| 2012/0154972 A1* | 6/2012 | McMahon | ............. | H01H 83/04 |
| | | | | 361/187 |
| 2013/0057990 A1* | 3/2013 | Finlay, Sr. | ............. | H02H 3/338 |
| | | | | 361/50 |
| 2014/0111900 A1* | 4/2014 | Weeks | ............... | H01H 71/0207 |
| | | | | 361/115 |
| 2015/0333498 A1* | 11/2015 | Weeks | ................... | H01H 83/04 |
| | | | | 324/509 |
| 2016/0211659 A1* | 7/2016 | Weeks | ................... | H01H 71/02 |
| 2016/0240341 A1* | 8/2016 | Weeks | ................... | H01H 83/04 |
| 2018/0145500 A1* | 5/2018 | Weeks | ................ | H01H 47/002 |

\* cited by examiner

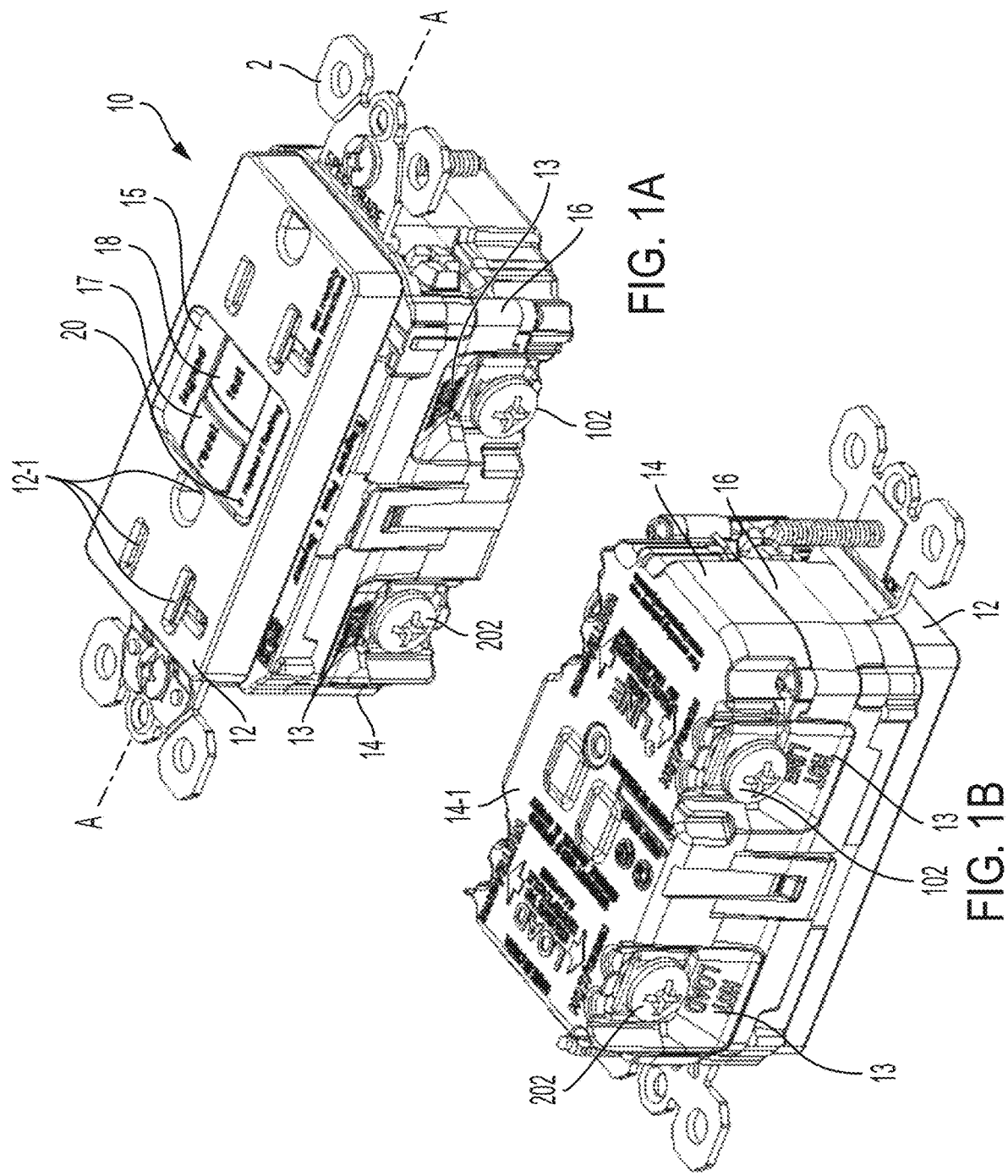

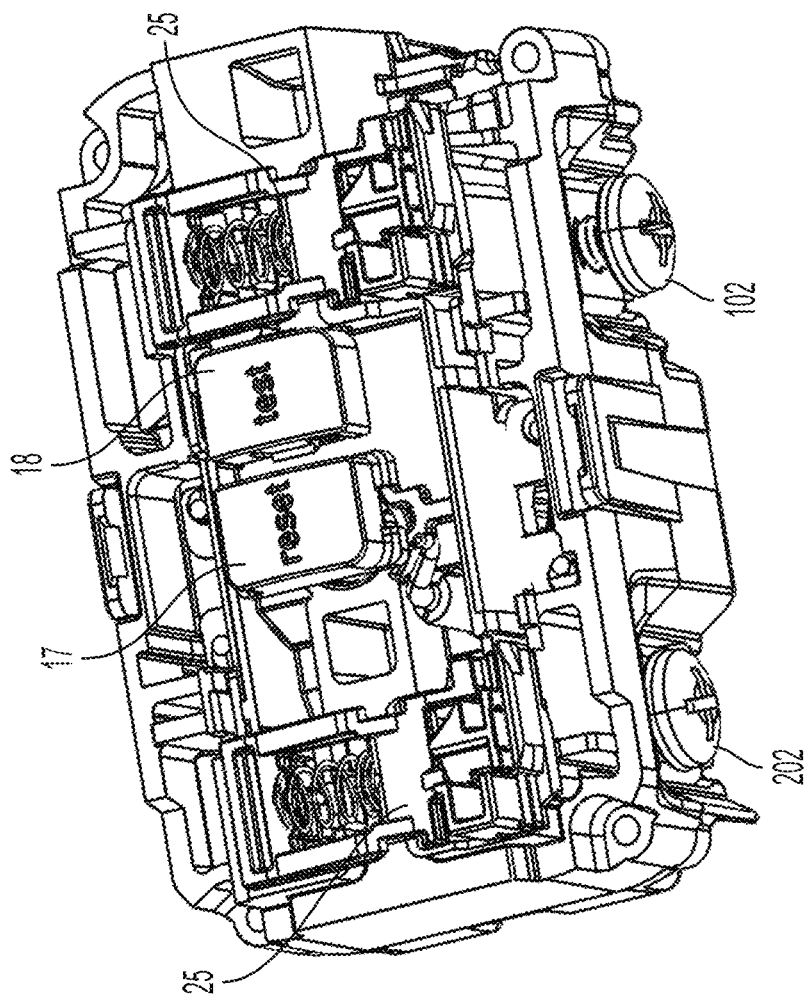
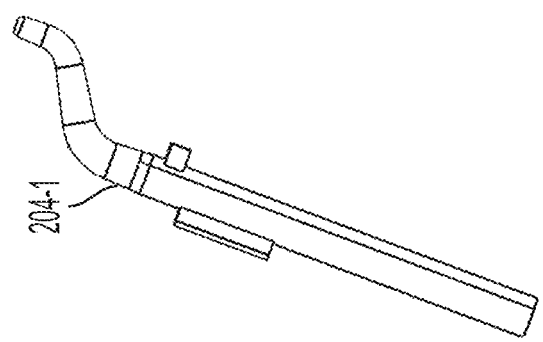
FIG. 4B

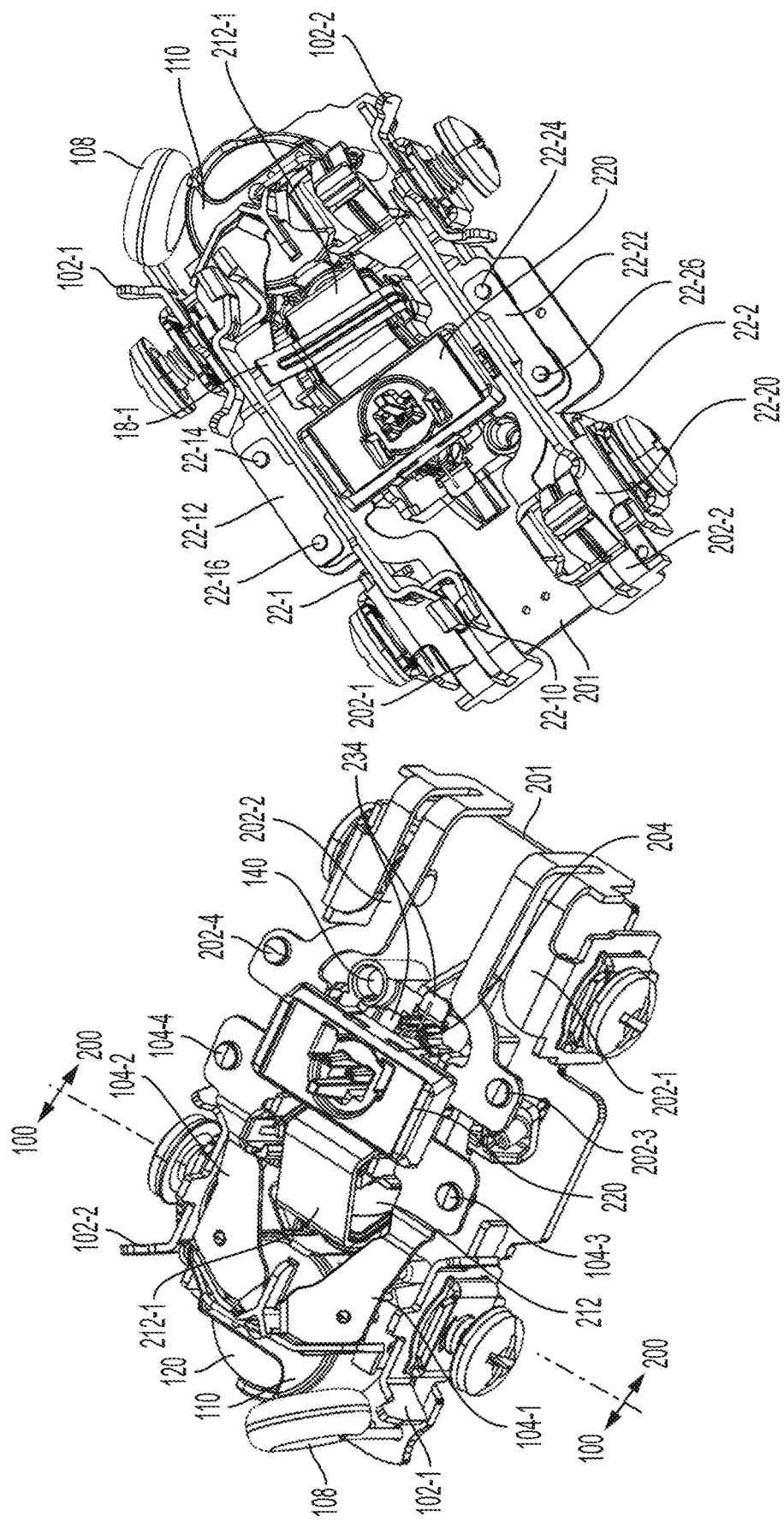

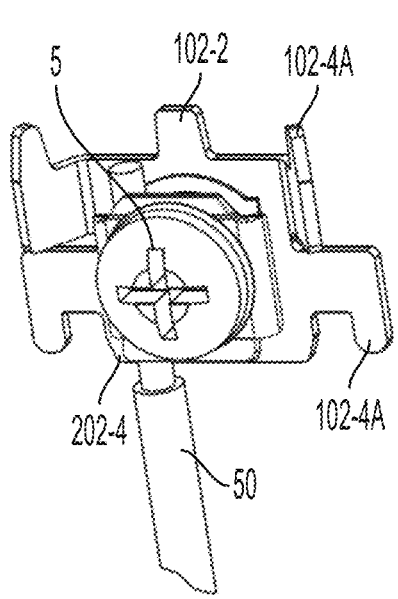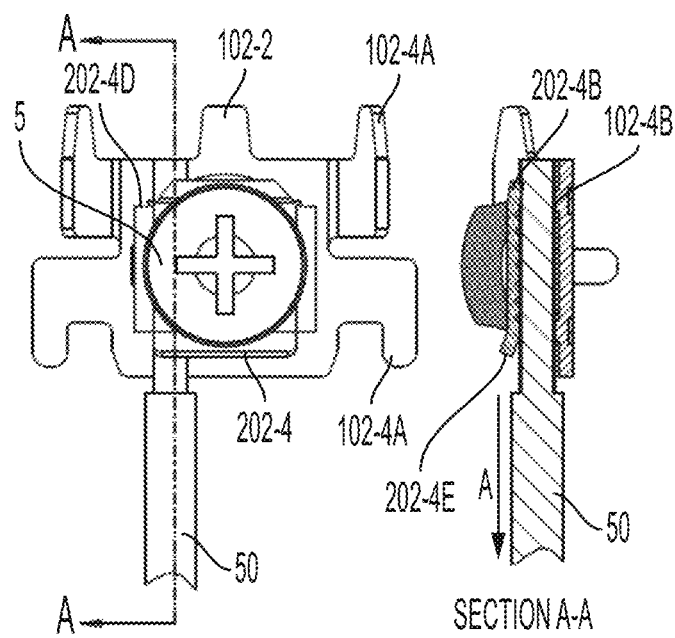
FIG. 12A  FIG. 12B  FIG. 12C

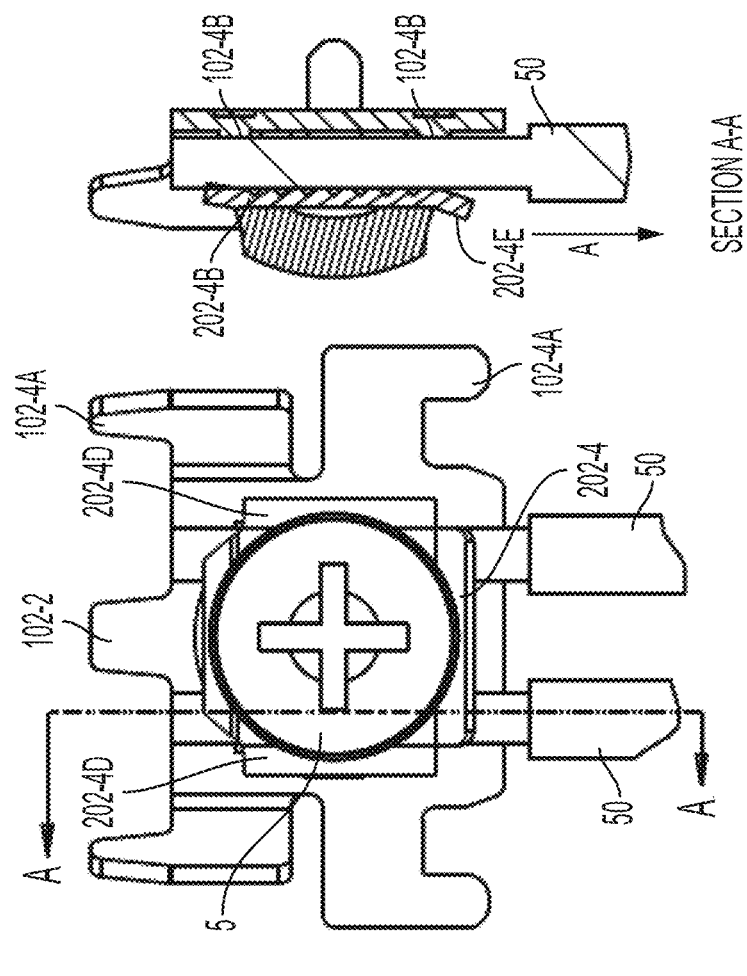
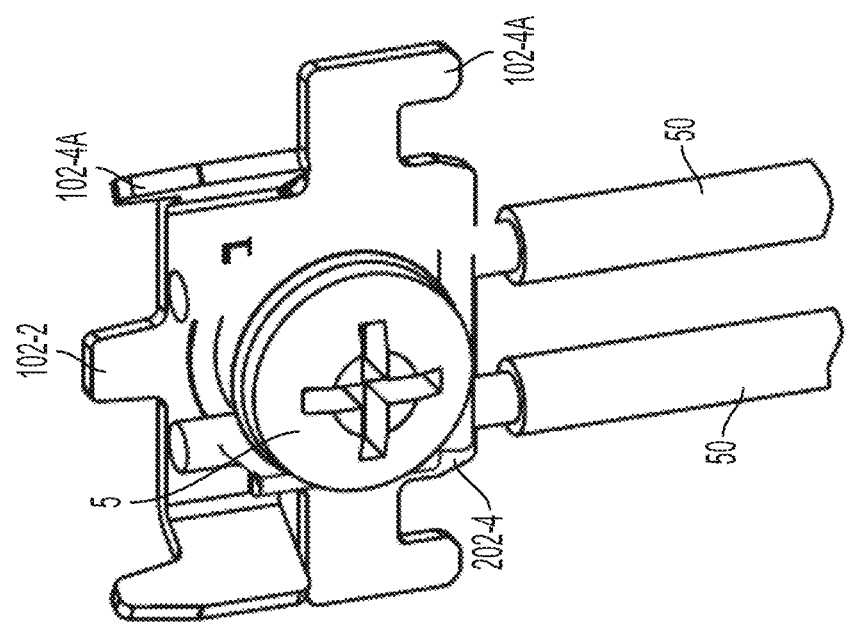
FIG. 13C  FIG. 13B  FIG. 13A

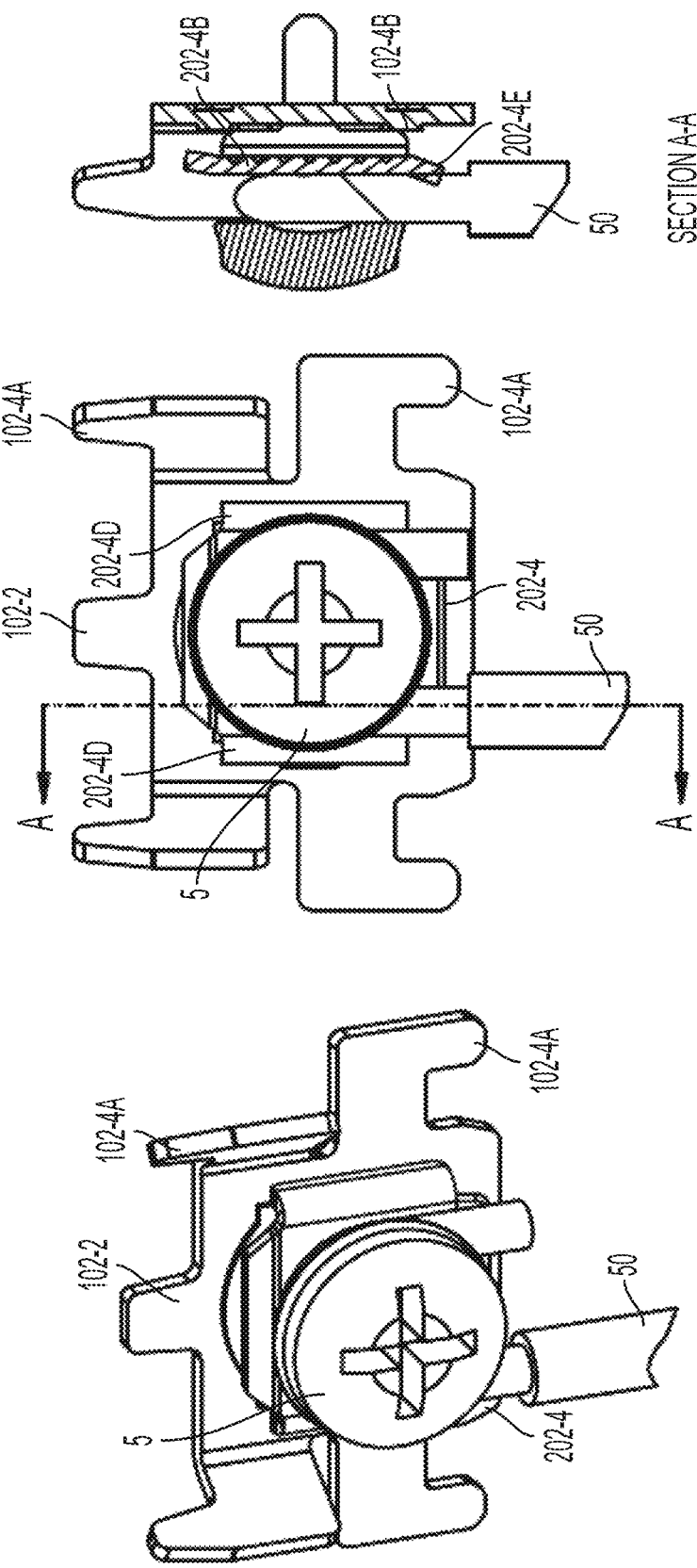

Latch Angle advantage

Frictional force = (coefficient of friction of material) × Normal Force to Actuation Force When actuation is angled, the Normal Force is Fy instead of Fs.

$$Fy = Fs \cos(\beta)$$

Fy therefore becomes less than Fs by the factor of the cosine of the angle, therefore, the frictional force is directly reduced.

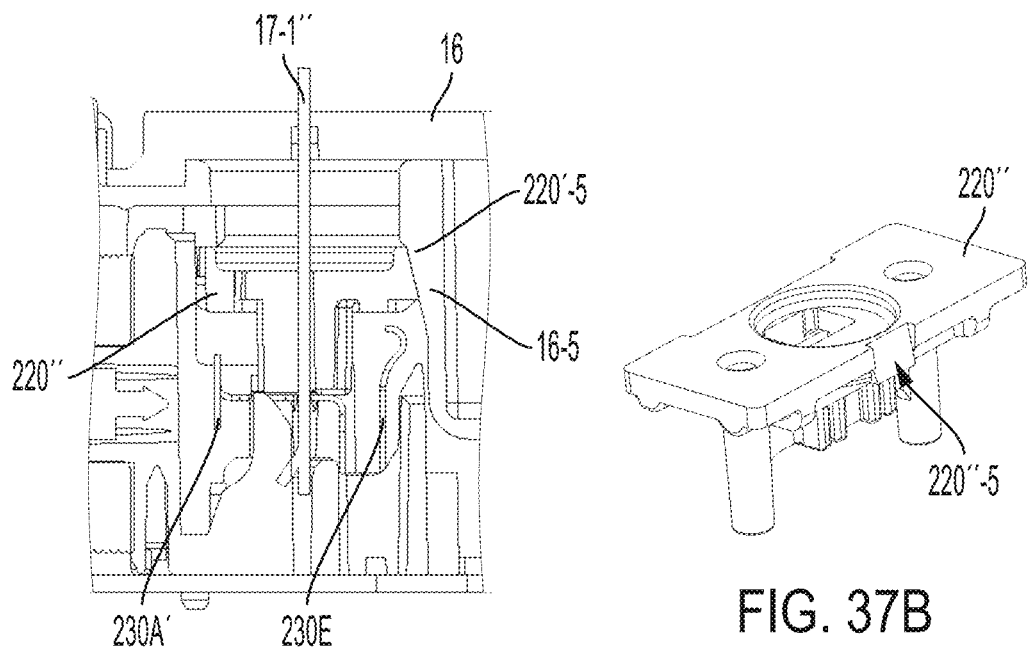
FIG. 37A
FIG. 37B
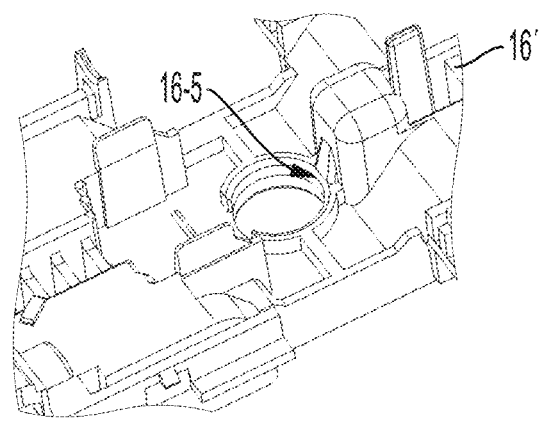
FIG. 37C

PROTECTIVE WIRING DEVICE

CROSS-REFERENCE TO RELATED APPLICATIONS

This application is a national stage application under 35 U.S.C. 371 based on international patent application PCT/US19/17336, filed on Feb. 8, 2019, which claims priority to U.S. Provisional Patent Application Ser. No. 62/628,659, filed on Feb. 9, 2018, U.S. Provisional Patent Application Ser. No. 62/725,560, filed on Aug. 31, 2018, and U.S. Provisional Patent Application Ser. No. 62/733,920, filed on Sep. 20, 2018.

BACKGROUND OF THE INVENTION

1. Field of the Invention

The present invention relates generally to electrical wiring devices, and particularly to protective electrical wiring devices (or protective wiring devices or protective devices).

2. Description of the Related Art

Electric circuits are installed throughout a structure such that electrical service is readily accessible to people that live or work in that structure. An electric circuit includes electrical wires that interconnect electrical wiring devices that are positioned at various locations throughout a structure. There are a variety of electrical wiring devices available to the consumer including outlet receptacles, light switches, dimmers, ground fault circuit interrupters, arc fault circuit interrupters and the like.

Ground fault circuit interrupters (GFCIs), transient voltage surge suppressors (TVSS), surge protective devices (SPDs) and arc fault circuit interrupters (AFCIs) are examples of electrical protective devices. They are used to protect persons and structures from being harmed by electrical fault conditions. Protective devices are typically equipped with a set of interrupting contacts that are used to break the connection between the line terminals and load terminals when a fault condition is detected. Mechanisms and various structures exist to break such connections. However, such conventional mechanisms are limited in structure and/or functionality.

Additional background information can be found, for example, in the background section of U.S. Pat. Nos. 9,437, 386 and 10,020,649.

Description of the Related Art Section Disclaimer: To the extent that specific patents/publications/products are discussed above in this Background Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products (and/or specific portions thereof) are discussed above in this Background Section and/or throughout the application, the descriptions/disclosures of which are all hereby incorporated by reference into this document in their respective entirety(ies) (or at least the specific references sections are incorporated by reference into this document in their respective entirety(ies), as may be applicable).

BRIEF SUMMARY OF THE INVENTION

It is therefore a principal object and advantage of the present invention to provide a protective wiring device that eliminates one or more of the problems/issues discussed above. In particular, the present disclosure is directed to inventive devices and systems structured and/or configured to uniquely break the connection between the line terminals and load terminals when a fault condition is detected (a "tripped state/position/condition"). A particular non-limiting goal of the utilization of the embodiments and implementations herein is to provide a device and system which is structured and/or configured to push movable contacts away from fixed contacts in a tripped state. The mechanical trip mechanism of an embodiment functions, in part, in an opposite way to conventional mechanical trip mechanisms. Typically, in such conventional mechanical trip mechanisms, a latch block or other moveable structure applies force via a make spring to the contacts (arms) to make a connection. When the solenoid gets the trip signal, it causes the reset structure (or catch) to release the latch block from its force being applied to the contacts. The latch block of an embodiment moves up and down between the reset and tripped states/positions respectively. In a reset position, the latch block can be pulled up via a reset structure. When the latch block is pulled up, its force is relieved from the line and load contacts, and eventually removed completely, allowing the terminal's connection points on flexible/movable cantilever springs to be biased up toward fixed contacts to exert a force on fixed receptacle contacts. A break spring is compressed between the reset button and latch block. The break spring stores mechanical energy in the reset state and releases energy in tripped state resulting in exerted force on latch block to line and load contacts. Stated differently, when the device receives a trip signal, the solenoid impacts the reset structure/latch, which then releases the latch block (which moves via a force exerted by the break spring) and exerts a force on the line and load contacts breaking the connection between fixed and moveable contacts.

Additionally, in accordance with an embodiment, when in the reset state/position, the reset button, reset structure, and latch block compress the break spring. Energy is stored in the break spring, to be used for a tripped event. While in reset state/position, the reset button, reset structure, break spring, and/or latch block are practically floating above the line and load arms due to the force exerted in the direction opposite the break spring (lift) by the return spring(s) (e.g., AUX spring(s)). This combination of parts is aligned by the front cover of the device (aligns the reset button) and bobbin/latch guide structure (which can be injection molded). When tripped, the break spring releases its energy, exerting a force on the reset button, which is transfers a force onto the front cover. At the opposite end of the break spring, force is exerted onto the latch block, which transfers force onto the line and load terminals, overcoming the "lifting" force imposed by the return spring(s) and breaking the flow of current in the device.

It is another object and advantage of the present invention to provide a solenoid assembly and a latch mechanism at an angle to reduce the frictional force of the travel of the latch and latch in a tripped condition.

It is an additional object and advantage of the present invention to provide a latch/catch interface that includes a vibration tolerant structural configuration.

It is a further object and advantage of the present invention to provide a dual functioning (mechanical and electrical) auxiliary switch mechanism.

Other aspects of embodiments of the invention include, but are not limited to a torque resistant construction, a flat stamped reset structure, and a toroid arrangement with current carrying conductors.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the invention will be apparent from and elucidated with reference to the embodiment(s) described hereinafter.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

FIG. 1A is a top perspective view of an assembled protective electrical wiring device of an embodiment;

FIG. 1B is a bottom perspective view of an assembled protective electrical wiring device of an embodiment;

FIG. 4B is a top perspective view of an assembled protective electrical wiring device of an embodiment;

FIG. 7D is a top perspective view of elements of the protective electrical wiring device assembled in conjunction with a PCB of an embodiment;

FIG. 7E is a top perspective view of elements of the protective electrical wiring device assembled in conjunction with a PCB of an embodiment;

FIG. 12A is a perspective view of a single wire being connected to a neutral line terminal component of an embodiment;

FIG. 12B is a perspective view of a single wire being connected to a neutral line terminal component of an embodiment;

FIG. 12C is a side sectional view taken along A-A of FIG. 12B of the single wire being connected to the neutral line terminal component of an embodiment;

FIG. 13A is a perspective view of a two wires being connected to a neutral line terminal component of an embodiment;

FIG. 13B is a perspective view of a two wires being connected to a neutral line terminal component of an embodiment;

FIG. 13C is a side sectional view taken along A-A of FIG. 13B of the two wires being connected to the neutral line terminal component of an embodiment;

FIG. 14A is a perspective view of a single wire in a wrapped configuration and being connected to a neutral line terminal component of an embodiment;

FIG. 14B is a perspective view of a single wire in a wrapped configuration and being connected to a neutral line terminal component of an embodiment;

FIG. 14C is a side sectional view taken along A-A of FIG. 14B of the single wire in a wrapped configuration and being connected to the neutral line terminal component of an embodiment;

FIG. 32B is a top perspective view of a latch guide component of an alternative embodiment;

FIG. 33A is a partial sectional side view of various components of a protective electrical wiring device according to an alternative embodiment;

FIG. 33B is a partial sectional side view of various components of a protective electrical wiring device according to an alternative embodiment;

FIG. 34A is a partial sectional side view of various components of a protective electrical wiring device in the reset button actuated position according to an alternative embodiment;

FIG. 34B is a partial sectional side view of various components of a protective electrical wiring device in the reset button actuated position according to an alternative embodiment;

FIG. 35A is a partial sectional side view of various components of a protective electrical wiring device in the reset state and position according to an alternative embodiment;

FIG. 35B is a partial sectional side view of various components of a protective electrical wiring device in the reset state and position according to an alternative embodiment;

FIG. 36A is a partial sectional side view of various components of a protective electrical wiring device in the tripped state and position according to an alternative embodiment;

FIG. 36B is a partial sectional side view of various components of a protective electrical wiring device in the tripped state and position according to an alternative embodiment;

FIG. 37A is a partial sectional side view of various components of a protective electrical wiring device according to an alternative embodiment;

FIG. 37B is a perspective view of a latch block component according to an alternative embodiment; and FIG. 37C is a partial bottom perspective view of a separator component according to an alternative embodiment.

FIG. 38 is a schematic representation of a circuit according to an embodiment.

DETAILED DESCRIPTION OF THE INVENTION

Figure 2A:
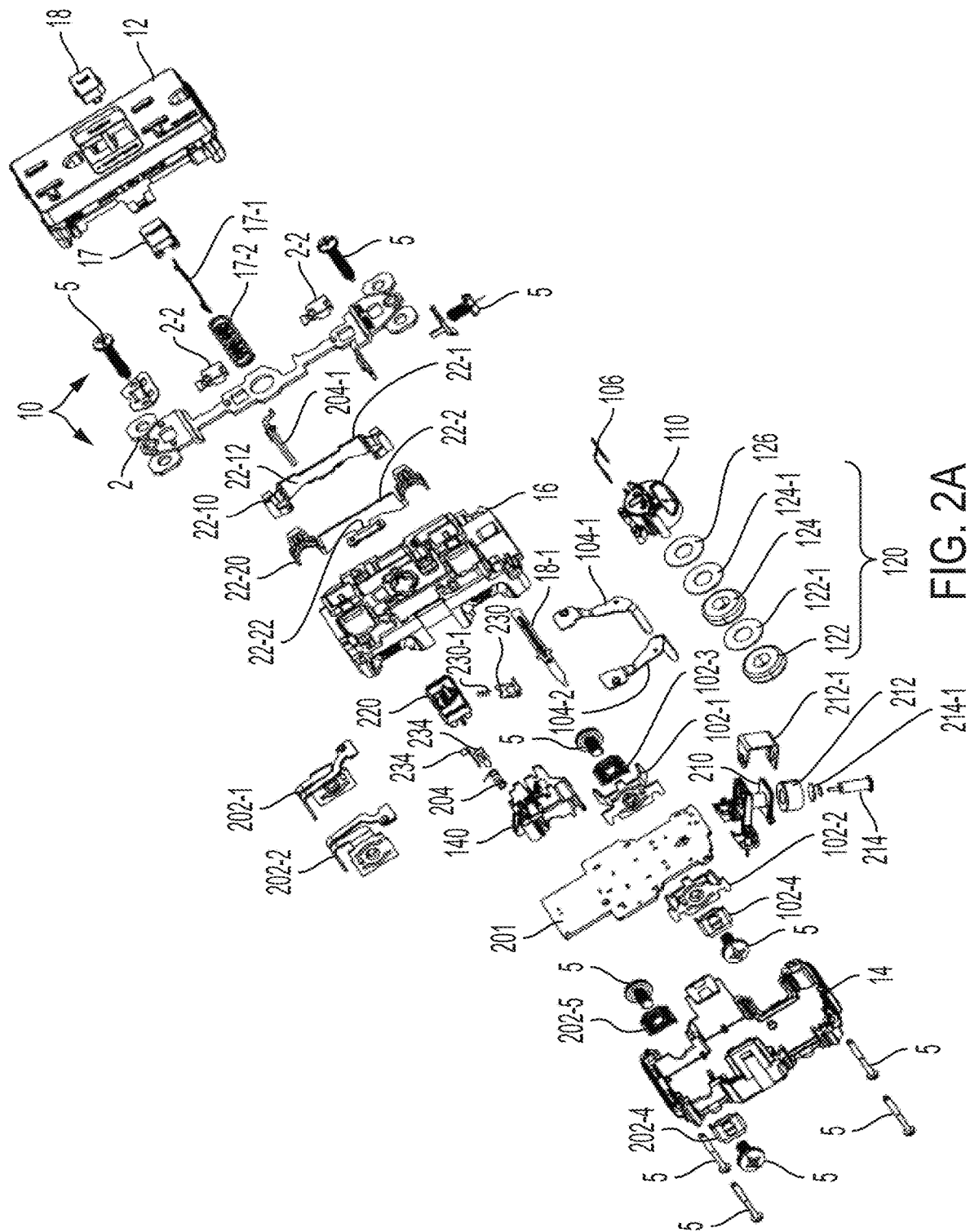
FIG. 2A is a perspective exploded view of the protective electrical wiring device of an embodiment.

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. A 20 amp protective wiring device is shown and described herein with respect to the illustrated embodiments. Embodiments of the present invention similarly apply to a 15 amp protective wiring device (as well as other protective wiring devices identified herein), as should be understood and appreciated by a person of ordinary skill in the art in conjunction with a review of this disclosure (i.e., the front cover and neutral side contacts are structurally different, otherwise, embodiments of the invention are structurally and functionally the same).

Certain structural and functional aspects of embodiments of the present invention are similar to embodiments of the protective wiring device described and illustrated in U.S. Pat. No. 9,437,386. Those similarities should be understood by a person of ordinary skill in the art in conjunction with a review of this disclosure and accompanying drawings in conjunction with U.S. Pat. No. 9,437,386, and are not necessarily further discussed in detail herein. Similarly, aspects of a tamper resistant mechanism of an embodiment are shown and are further described in U.S. Pat. Nos. 9,847,611, 9,543,715 and 9,893,456, and are not necessarily further discussed in detail herein. Certain differences, including various inventive features of embodiments of the present invention are further described herein and below with reference to the accompanying drawings. Aspects of U.S. Pat. No. 9,437,386 that are different or in addition to the inventions described herein can be implemented in embodiments of the present invention in place of, to modify or in addition to certain embodiments described herein as should be understood by a person of ordinary skill in the art in conjunction with a review of this disclosure and U.S. Pat. No. 9,437,386.

Reference will now be made in detail to the present exemplary embodiments of the invention, examples of which are illustrated in the accompanying drawings. Wherever possible, the same reference numbers will be used throughout the drawings to refer to the same or like parts. Various parts/elements of the protective device of embodiments of the present invention are first identified below and illustrated in the accompanying drawings. Many of the parts/elements are conventional, should be understood by a person of ordinary skill in the art in conjunction with a review of this disclosure, and are not necessarily further discussed in detail beyond being identified and represented in certain Figures. The structure, configuration, and positioning with respect to other particular parts/elements/assemblies in the assembled protective wiring device as a whole, and/or functionality of other particular parts/elements/assemblies are unique and inventive. Such other parts/elements/assemblies are described in further detail below in addition to the being identified and represented in certain Figures.

An exemplary embodiment of the protective wiring device of the present invention is shown in FIGS. 1A-B, and is designated generally throughout by reference numeral 10.

As embodied herein, and depicted in FIGS. 1A-1B, top and bottom perspective views of an assembled protective electrical wiring device 10 of an embodiment of the present invention are shown. The protective device 10 includes a housing having a front cover 12, a back body member 14 and a separator 16. The front cover includes outlet receptacles 12-1 which are configured to accept the hot, neutral and ground blades of a corded plug. The back body portion 14 includes line screw terminals 102 and load screw terminals 202 that allow the device to be connected to a source of AC power and a load circuit, respectively. FIG. 1B shows a fuller view of the back body portion 14 with the rear major surface 14-1.

As shown, an embodiment of the present invention provides the user with various kinds of indicators. FIG. 1A, for example, shows an asymmetric recessed portion in the front cover that includes a recessed planar surface 15 that can accommodate human-readable indicia and one or more indicator lights 20. The indicator lights may be configured as a trip indicator, a pilot light, a miswire indicator or an end-of-life indicator (as should be understood by a person of ordinary skill in the art in conjunction with a review of this disclosure). The human-readable indicia, therefore, may provide a message or an instruction appropriate for the light(s). For example, if the light is a trip indicator, the message may read "press reset button if illuminated." Other indicators may be present including audible indicators. A reset button 17 and a test button 18 are disposed adjacent to the recessed planar region 15.

In FIG. 1A, in particular, the recessed region features a symmetric design with recessed planar surfaces 15 disposed on either side of the test button 18 and reset button 17. An end-of-life indicator light 20 with the message "replace if flashing" adjacent thereto is also shown. FIG. 1 B shows human-readable indicia included on the screw terminal section and on the rear major surface 14-1, such as load and line terminal indicators (which can be stamped line/load markings 13 on the separator 16 portion of device 10).

Figure 2D:
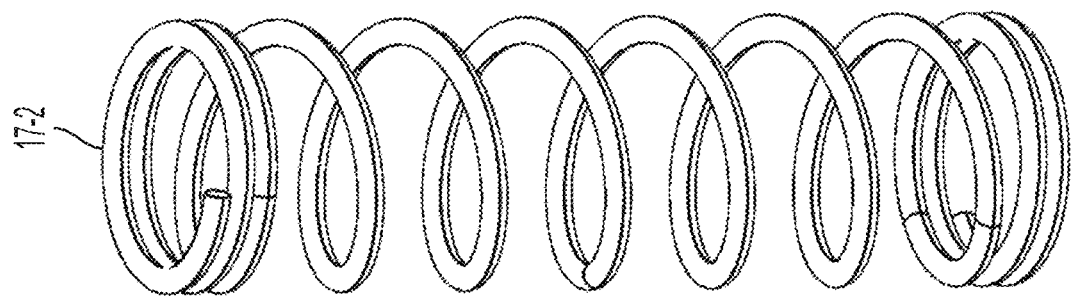
FIG. 2D is a perspective view of a reset break spring component of an embodiment.
Figure 2C:
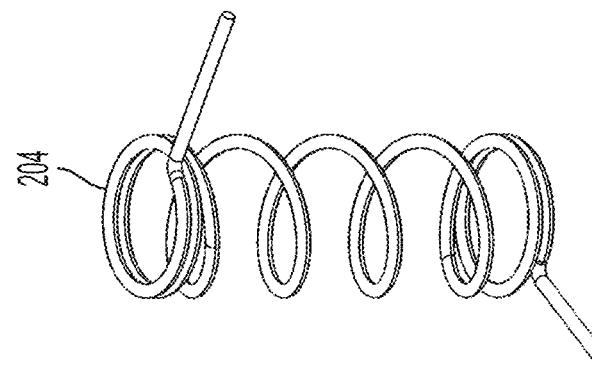
FIG. 2C is a perspective view of an auxiliary spring component of an embodiment.
Figure 2B:
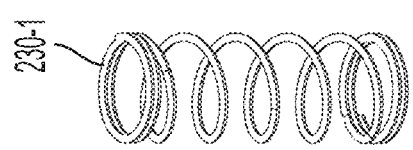
FIG. 2B is a perspective view of a latch spring component of an embodiment.
Figure 2E:
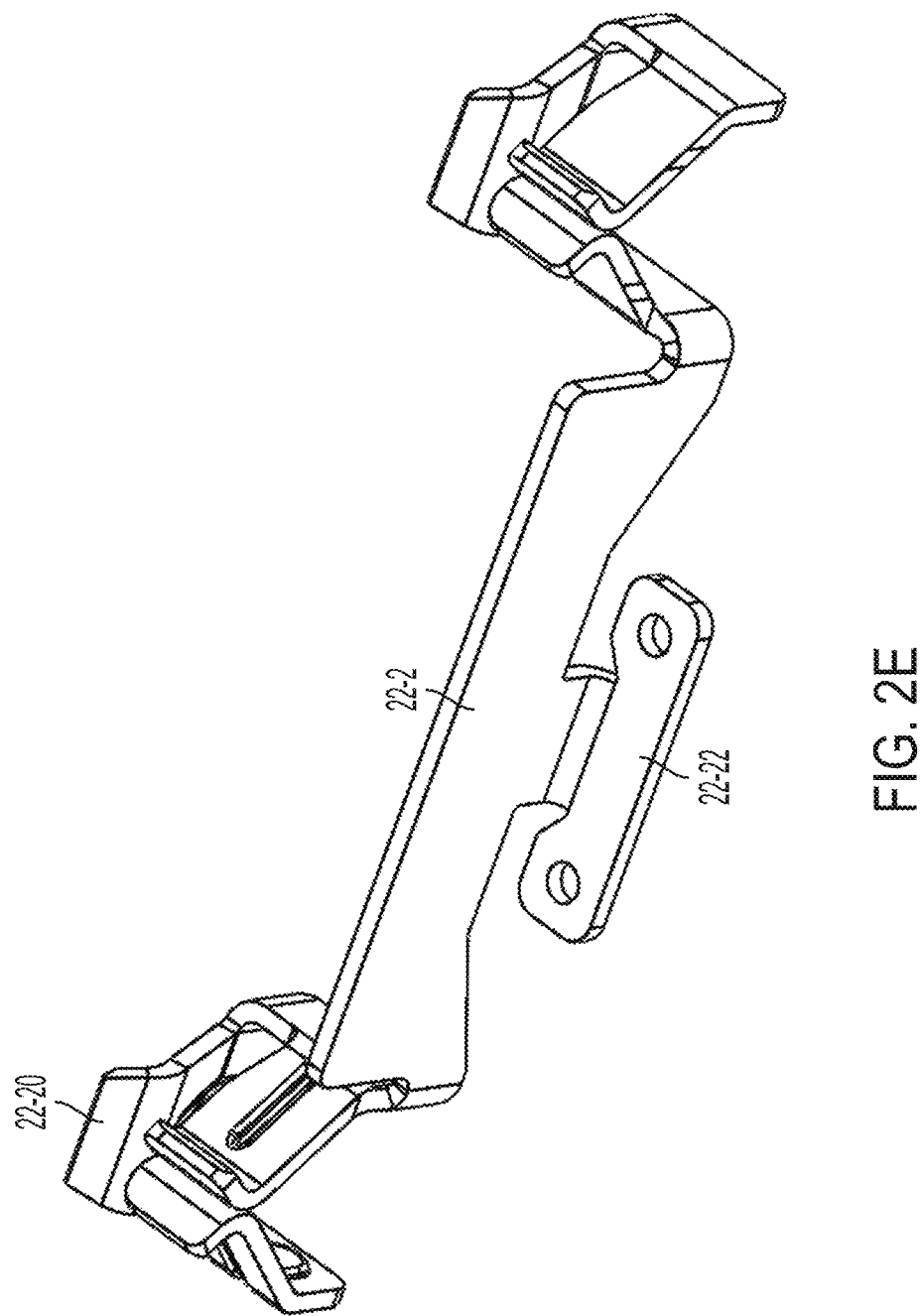
FIG. 2E is a perspective view of a neutral receptacle terminal component of an embodiment.
Figure 2F:
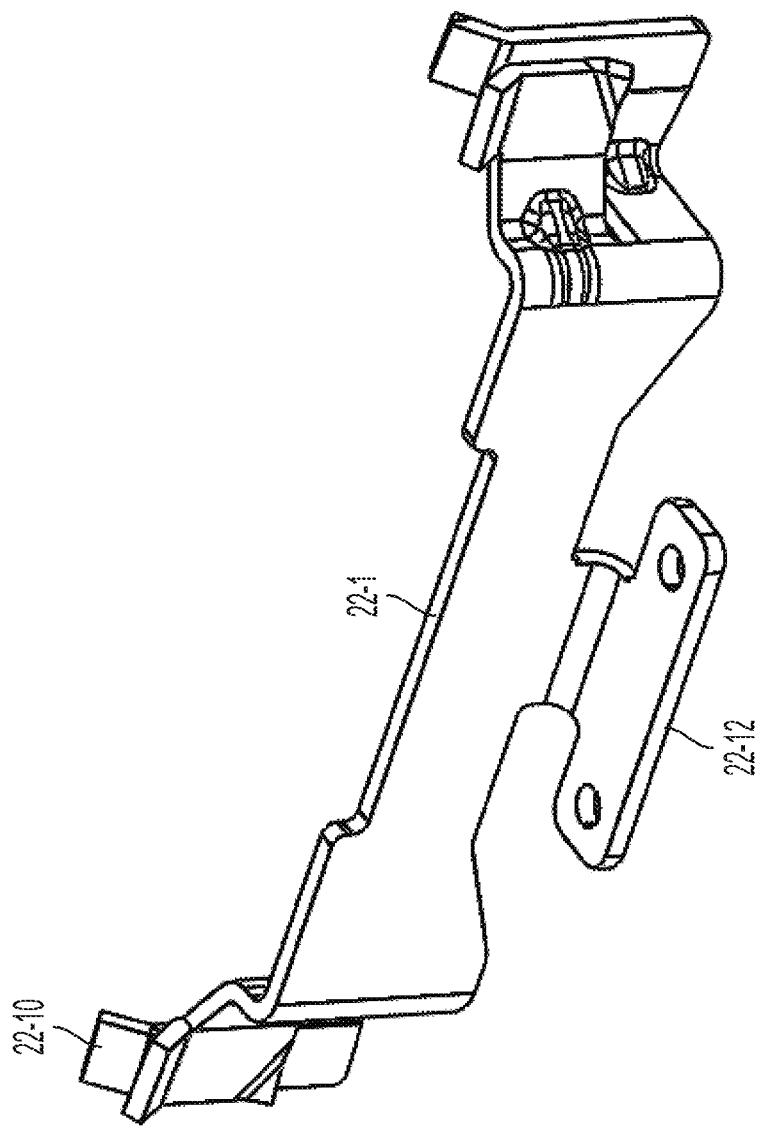
FIG. 2F is a perspective view of a hot receptacle terminal component of an embodiment.
Figure 2G:
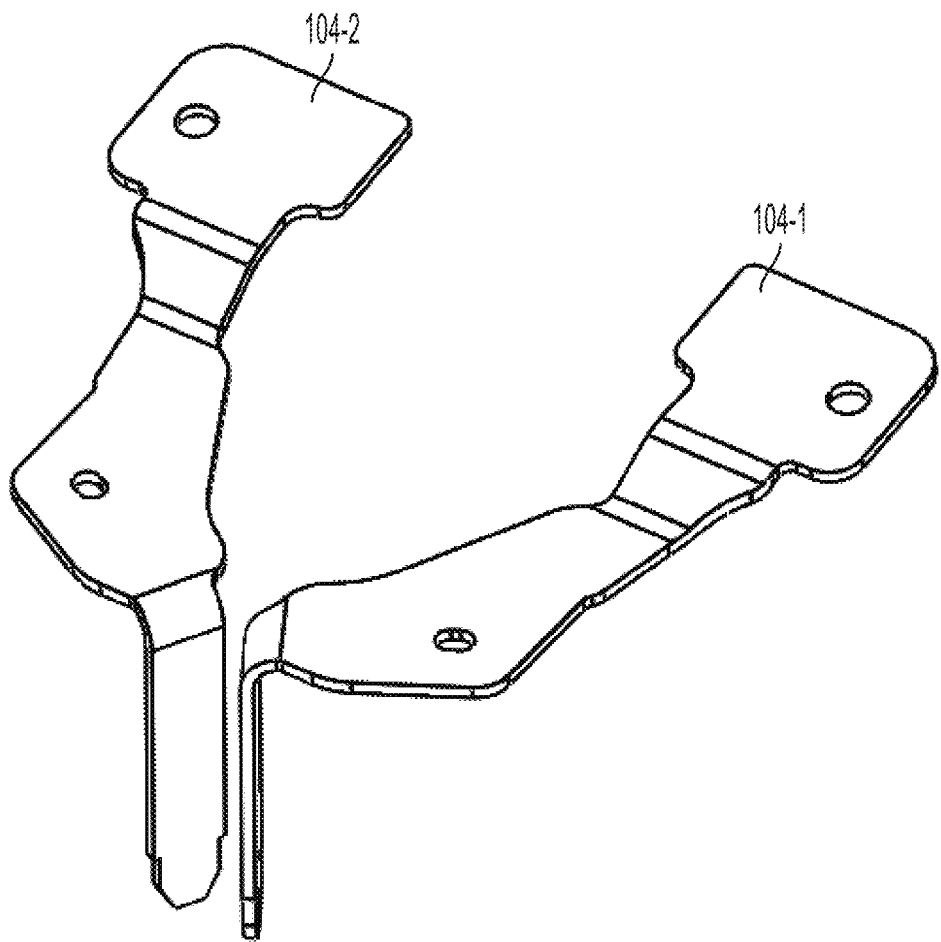
FIG. 2G is a perspective view of line contact arm components of an embodiment.
Figure 2H:
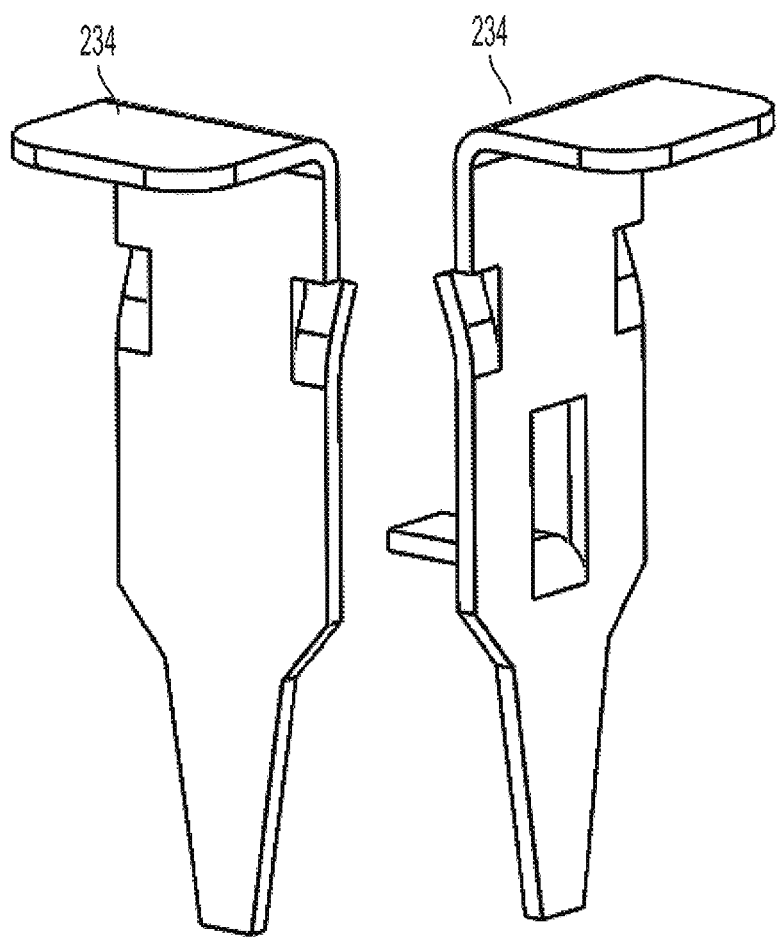
FIG. 2H is a perspective view of auxiliary contact components of an embodiment.

Turning to FIG. 2A, a perspective exploded view of the protective electrical wiring device 10 of an embodiment of the present invention is shown. Starting from the top portion of the device, the various parts/elements are now identified—test button 18, front cover 12, reset button 17, reset structure 17-1, reset break spring 17-2 (see detailed magnified view in FIG. 2D), ground strap 2 with ground contacts 2-2, light pipe 204-1, a hot receptacle terminal 22-1 including hot outlet receptacle contacts 22-10 and fixed contact bridge 22-12 (see detailed magnified view in FIG. 2F), a neutral receptacle terminal 22-2 including neutral outlet receptacle contacts 22-20 and fixed contact bridge 22-22 (see detailed magnified view in FIG. 2E), separator 16, load terminal hot 202-1, load terminal hot pressure plate 202-3, load terminal neutral 202-2, load terminal neutral pressure plate 202-4, line contact arms 104-1 and 104-2 (see detailed magnified view in FIG. 2G), test blade 18-1, latch block 220, latch 230, latch spring 230-1 (see detailed magnified view in FIG. 2B), auxiliary contacts 234, auxiliary spring 204 (see detailed magnified view in FIG. 2C), latch guide 140, toroidal housing 110 (which can be dielectric, or electrically insulative), toroidal sensor assembly 120 including a grounded neutral sensor 122, an insulator 122-1, a differential sensor 124, another insulator 124-1, a shield portion 126, electromechanical PCB 201, hot line terminal 102-1, hot line terminal pressure plate 102-3, neutral line terminal 102-2, neutral line terminal pressure plate 102-4, solenoid bobbin assembly 210, solenoid frame 212-1, solenoid coil 212, coil spring 214-1, armature plunger 214, back body member 14, and assembly screws 5. FIG. 2H shows a perspective view of auxiliary contact components of an embodiment.

Figure 3A:
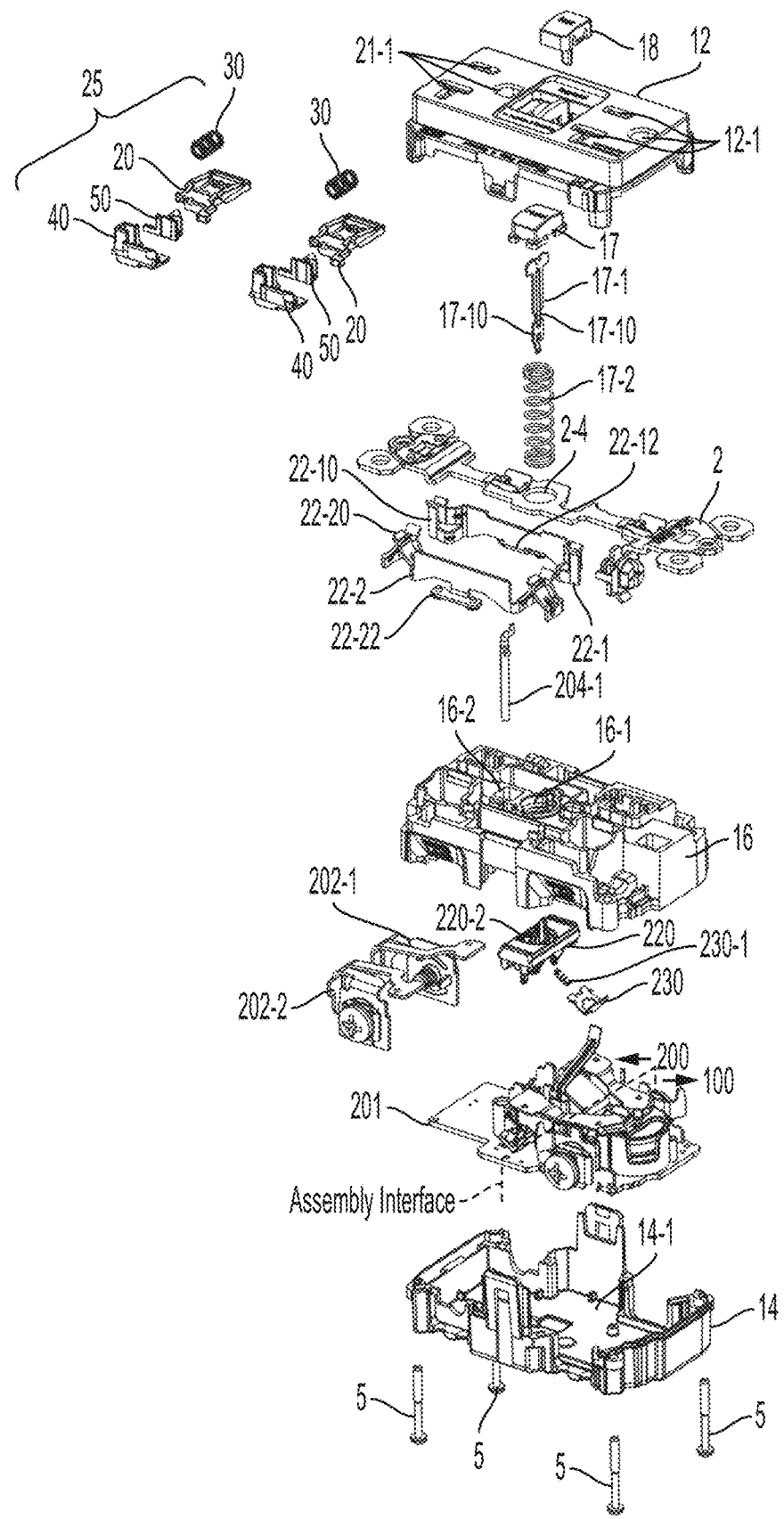
FIG. 3A is a perspective partial exploded view of the protective electrical wiring device of an embodiment.
Figure 3D:
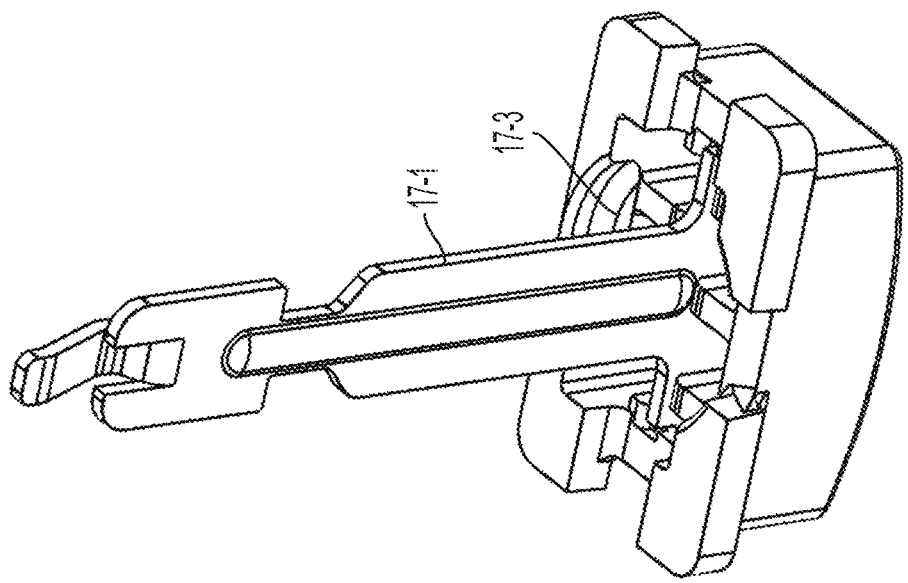
FIG. 3D is a perspective top view of a reset button and reset structure assembly of an embodiment.
Figure 3B:
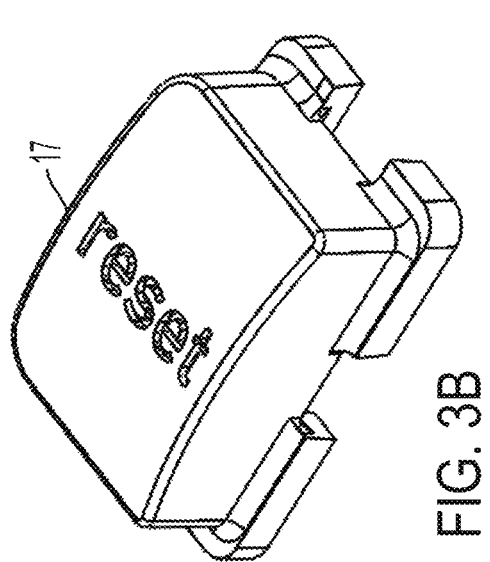
FIG. 3B is a perspective top view of a reset button component of an embodiment.
Figure 3C:
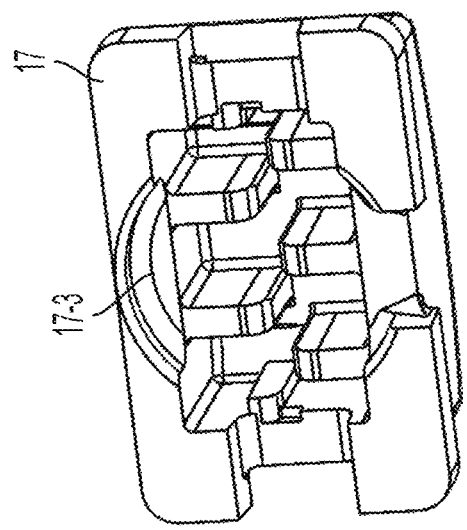
FIG. 3C is a perspective bottom view of a reset button component of an embodiment.

Turning to FIG. 3A, a perspective partial exploded view of the protective electrical wiring device 10 of an embodiment of the present invention is shown. Starting from the top portion of the device, the test button 18 and reset button 17 are shown lined up to be positioned through apertures in the front cover 12. Dual tamper resistant mechanisms 25 are shown, and are ultimately positioned in the front cover 12, as shown, for example, in FIGS. 4A-B. The reset structure 17-1 (or catch) with shelf edges or shoulders 17-10 is shown positioned below the reset button 17 (and is actuatable by the reset button 17) followed by the reset break spring 17-2, which is positioned around the reset structure 17-1 in the assembled configuration. The top portion of reset break spring 17-2 sits in a recess 17-3 in the bottom portion of the reset button 17 (see also, FIG. 3B showing a close up top perspective view of the reset button 17); FIG. 3C showing a close up bottom perspective view of the reset button 17; and FIG. 3D showing a close up bottom perspective view of the reset button 17 and reset structure 17-1 assembly according to an embodiment), and the bottom portion of which sits in a recess 220-2 of the latch block 220 (see also, FIG. 4A) in an assembled configuration. Between their respective top and bottom portions, the reset structure 17-1 and the reset break spring 17-2 are each positioned through the aperture 2-4 of ground strap 2, and through the aperture 16-1 of the separator 16 in the assembled configuration. The light pipe 204-1 is positioned through an adjacent aperture 16-2 in the separator 16. Hot receptacle terminal 22-1, and neutral receptacle terminal 22-2 are positioned on or in recessed portions of the top side of the separator 16 in the assembled configuration. The load terminal hot 202-1, load terminal neutral 202-2 and portions of a line input interface assembly 100 and an electromechanical assembly 200 are positioned on PCB 201, the latch 230 and latch spring 230-1 are positioned and moveable within the latch block 220 (and are collectively positioned on top of the latch guide 140), and the PCB 201 is positioned on the inner floor surface 14-1 of the back body portion 14 in the assembled configuration.

In FIG. 3A, a dashed line shows an "assembly interface" to show the approximate interface between the line interface assembly 100 and the electromechanical assembly 200 (which is not a hard and fast dividing line, just a line to assist with description of the components). This "assembly interface" and separation of elements/parts into line interface assembly 100 and an electromechanical assembly 200 is used as a tool to segregate and describe certain elements—similar to that used in U.S. Pat. No. 9,437,386. However, as noted above, there are many differences between the U.S. Pat. No. 9,437,386 disclosure and the instant disclosure, which are further detailed herein. The line interface assembly 100 can include, but is not limited to, the toroidal housing 110, toroidal sensor assembly 120, hot line terminal 102-1, neutral line terminal 102-2, and the line hot contact arm 104-1 and line neutral contact arm 104-2 (at least one of which, preferably both, being routed through the toroidal sensor assembly 120 and having terminal portions configured to be electrically connected to the hot line terminal 102-1 and the neutral line terminal 102-2, respectively) mounted and/or electromechanically connected (e.g., soldering) to PCB 201 (see FIGS. 9E-J). The protective device 10 is implemented using the line input interface assembly 100, which includes PCB 201, as should be understood by a person of ordinary skill in the art in conjunction with a review of this disclosure. As described herein, the line input interface assembly 100 provides device 10 with an interface to the line side of the electrical distribution circuit (i.e., to the AC power source). The line input interface assembly 100 may therefore include surge protection, filtering, AC/DC conversion (i.e., power supply circuitry) and other conditioning circuitry (as should be understood by a person of ordinary skill in the art in conjunction with a review of this disclosure). The toroidal sensors 120 which are mounted on and electrically connected to circuits on the electromechanical PCB 201 such that the line hot and line neutral conductors, along with an optional automatic test conductor, can be routed through a central aperture of the toroids. The electromechanical PCB 201 can include small signal voltage processing components such as the GFI detector, the microprocessor, etc. (not shown). The solenoid bobbin assembly 210 is also mechanically mounted to PCB 201. The solenoid bobbin assembly 210 includes at least one solenoid coil 212. The solenoid coil is mechanically attached to PCB 201 as part of bobbin assembly 210. Load terminals 202 are shown not being mechanically or electrically connected to electromechanical PCB 201 (but could be). MOV 108 can be part of a signal conditioning circuit 254 (See, U.S. Pat. No. 9,437,386 at FIG. 14) that also includes an RLC circuit that further protects the solenoid during surge conditions. The inductor portion of this circuit may be implemented using the solenoid coil 212.

The electromechanical assembly 200 can include, but is not limited to, solenoid bobbin assembly 210, solenoid frame 212-1, solenoid coil 212, coil spring 214-1, armature plunger 214, test button 18, test blade 18-1, reset button 17, reset structure 17-1, reset break spring 17-2, test latch guide 140, load terminal hot 202-1, and load terminal neutral 202-2, hot line terminal 102-1, neutral line terminal 102-2, latch block 220, latch 230, latch spring 230-1, latch guide 140, auxiliary contacts 234, and auxiliary spring 204.

Still referring to FIG. 3A, the hot receptacle terminal 22-1 including the hot outlet receptacle contacts 22-10, the neutral receptacle terminal 22-2 including the neutral outlet receptacle contacts 22-20, and the ground strap 2 including the ground contacts 2-2 form two sets of contacts (2-2, 22-10 and 22-20) that accommodate the blades of a corded plug via apertures 12-1 formed in the front cover 12. The hot receptacle terminal 22-1 also includes hot fixed contacts 22-14 and 22-16 positioned on fixed contact bridge 22-12 that are configured to mate with the line/hot-side contact 104-3 of the line hot contact arm 104-1 (which is electrically connected to the hot line terminal 102-1 through the PCB 201) and the load/hot-side contact 202-3 of the load terminal hot 202-1, respectively, in a reset position (see, e.g., FIG. 20B-D). Similarly, the neutral receptacle terminal 22-2 also includes neutral fixed contacts 22-24 and 22-26 positioned on fixed contact bridge 22-22 that are configured to mate with the line/neutral-side contact 104-4 of the line neutral contact arm 104-2 (which is electrically connected to the neutral line terminal 102-2 through the PCB 201) and the load/neutral-side contact 202-4 of the load terminal neutral 202-2, respectively, in a reset position (see, e.g., FIGS. 20A, C-D).

Figure 4A:
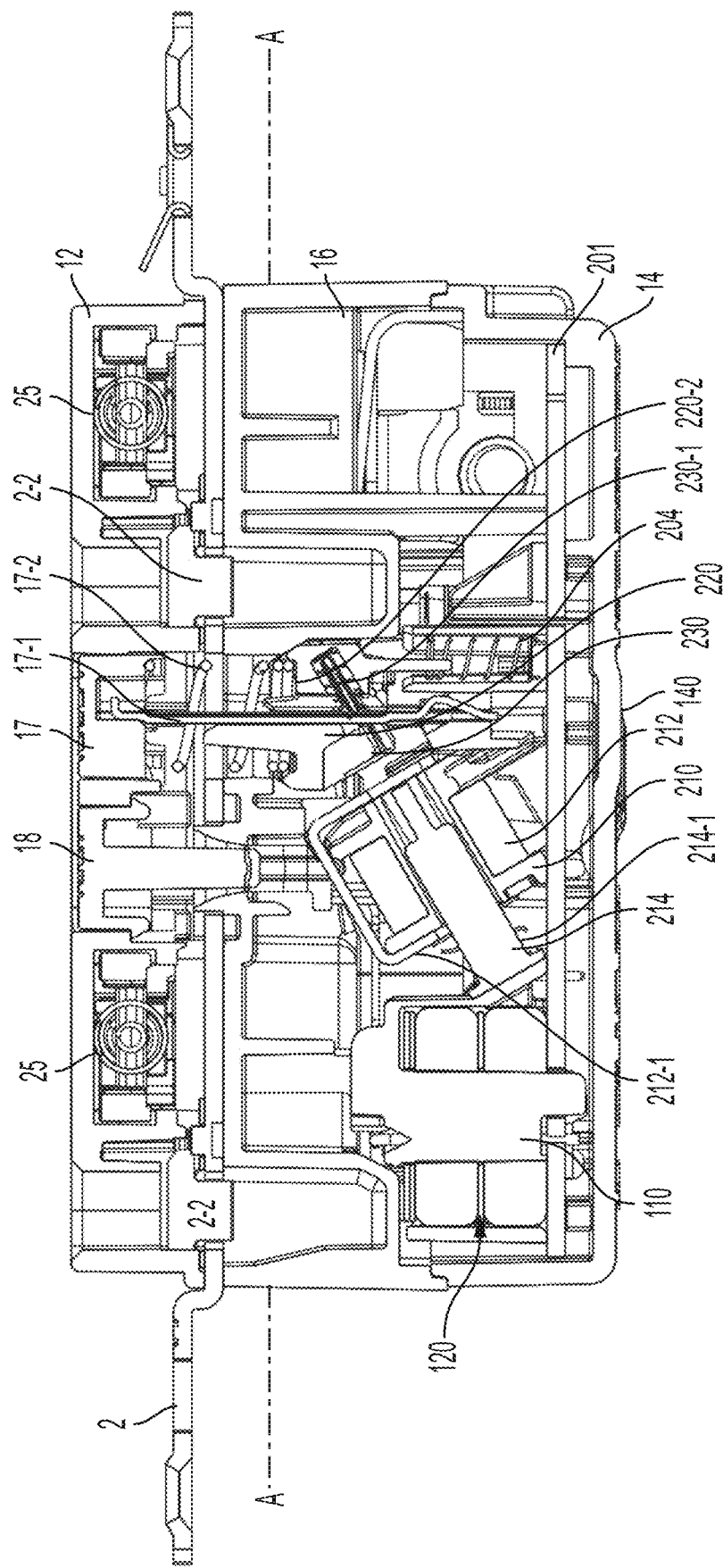
FIG. 4A is a sectional side view of assembled protective electrical wiring device taken along central axis "A-A" of FIG. 1A of an embodiment.

Turning to FIG. 4A, a sectional side view of assembled protective electrical wiring device 10 taken along central axis "A-A" of FIG. 1A of an embodiment of the present invention is shown. FIG. 4A shows how and where many of the parts/elements are positioned in the protective electrical wiring device 10. Highlighted parts/elements include front cover 12, test button 18, reset button 17, reset structure 17-1, reset break spring 17-2, ground strap 2 with ground contacts 2-2, separator 16, latch block 220, toroidal housing 110, toroidal sensor assembly 120, solenoid bobbin assembly 210, solenoid frame 212-1, solenoid coil 212, coil spring 214-1, armature plunger 214, latch 230, latch spring 230-1, an auxiliary contact 234, auxiliary spring 204, auxiliary spring auxiliary contact portion 204-1, PCB 201 and back body member 14. An example tamper resistant mechanism 25 is also shown in FIG. 4A. The illustrated tamper resistant mechanism 25 is exemplary, and is not required to be present. As described further below, the test button 18, reset button 17, reset structure 17, latch block 220, and auxiliary spring 204 are configured to move (with respect to non-movable elements of the device 10, including the front cover 12, separator 16 and back body portion 14) along a plane that is perpendicular to the central longitudinal axis A-A. In addition, the armature plunger 214, latch 230 and latch spring 230-1 are configured to move (with respect to non-movable elements of the device 10) at an angle to the central longitudinal axis A-A.

Turning to FIG. 4B, a top perspective view of an assembled protective electrical wiring device of an embodiment of the present invention is shown. The front cover 12 is transparent to show several parts/elements that are positioned closest to or within the front cover 12. For example, the test button 18 and reset button 17 are shown positioned through apertures in the front cover 12. Dual tamper resistant mechanisms 25 are shown positioned within the front cover just under the user accessible plug apertures. The light pipe 204-1, line screw terminals 102 and load screw terminals 202 are also shown.

FIGS. 5-7 collectively show the protective electrical wiring device 10 of an embodiment separated into the front cover 12, the separator 16 and the back body portion 14 with certain additional accompanying elements. In addition, elements of the protective electrical wiring device 10 are shown assembled in conjunction with PCB 201 without the front cover 12, the separator 16 and the back body portion 14.

Figure 5A:
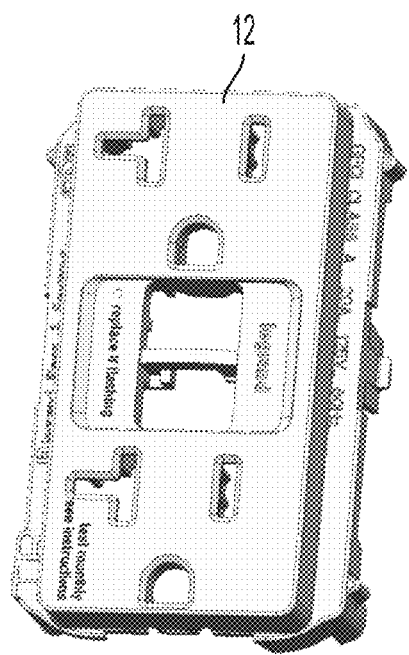
FIG. 5A is a top perspective view of a front cover component of an embodiment.
Figure 5B:
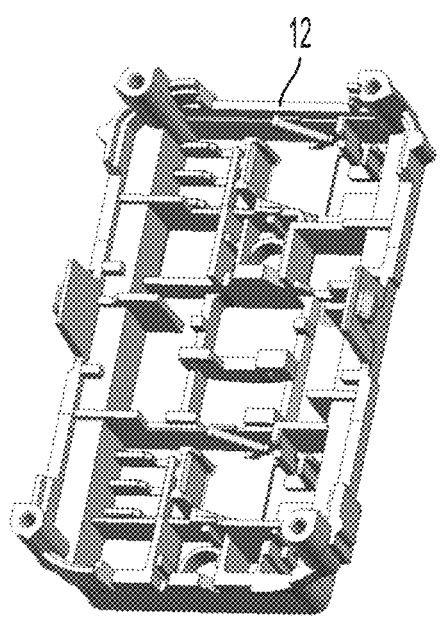
FIG. 5B is a bottom perspective view of a front cover component of an embodiment.

Referring to FIGS. 5A-B, top side and bottom side perspective views of the front cover 12, respectively, are shown in accordance with an embodiment.

Figure 6C:
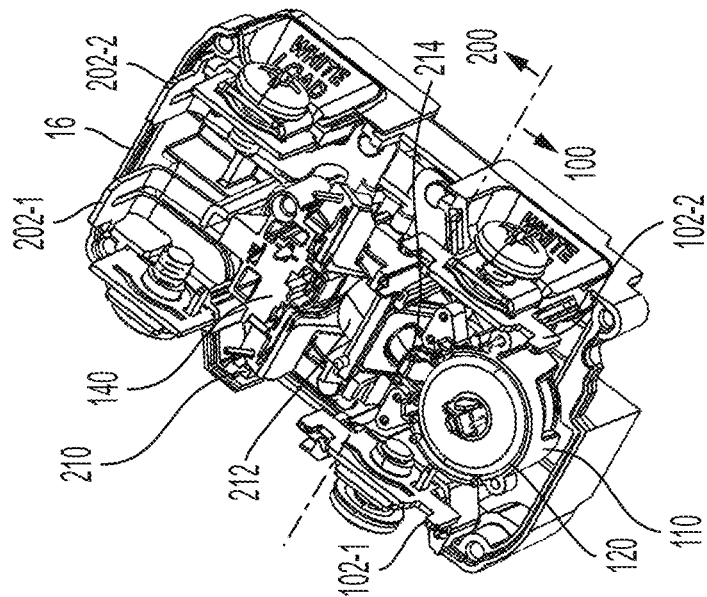
FIG. 6C is a bottom perspective view of a separator component populated with certain elements of a line interface assembly and an electromechanical assembly of an embodiment.
Figure 6B:
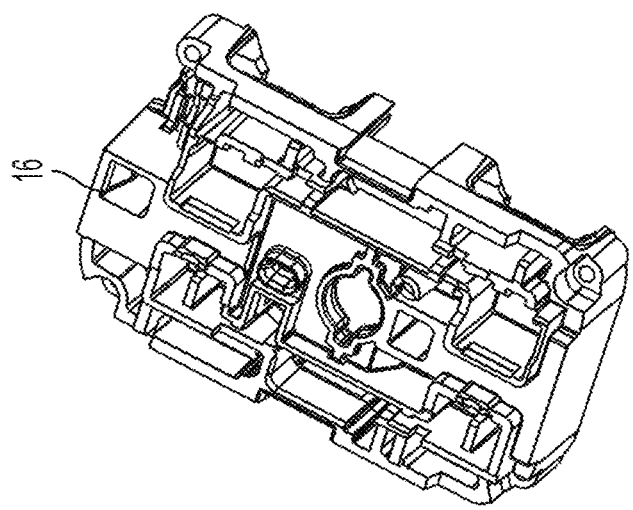
FIG. 6B is a top perspective view of a separator component of an embodiment.
Figure 6A:
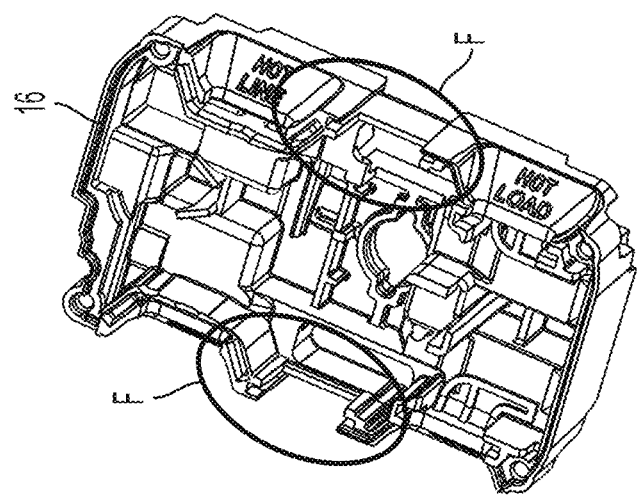
FIG. 6A is a bottom perspective view of a separator component of an embodiment.

Referring to FIGS. 6A-B, bottom side and the top side perspective views, respectively, of the separator 16 are shown in accordance with an embodiment. FIG. 6C shows the bottom side of the separator 16 populated with certain elements of the line interface assembly 100 and the electromechanical assembly 200. For example, the toroidal housing 110, toroidal sensor assembly 120, hot line terminal 102-1, neutral line terminal 102-2, solenoid coil 212, armature plunger 214, solenoid bobbin assembly 210, latch guide 140, load terminal hot 202-1, and load terminal neutral 202-2 are shown positioned in the bottom side of the separator 16 in FIG. 6C.

Figures 7A, 7B, 7C:
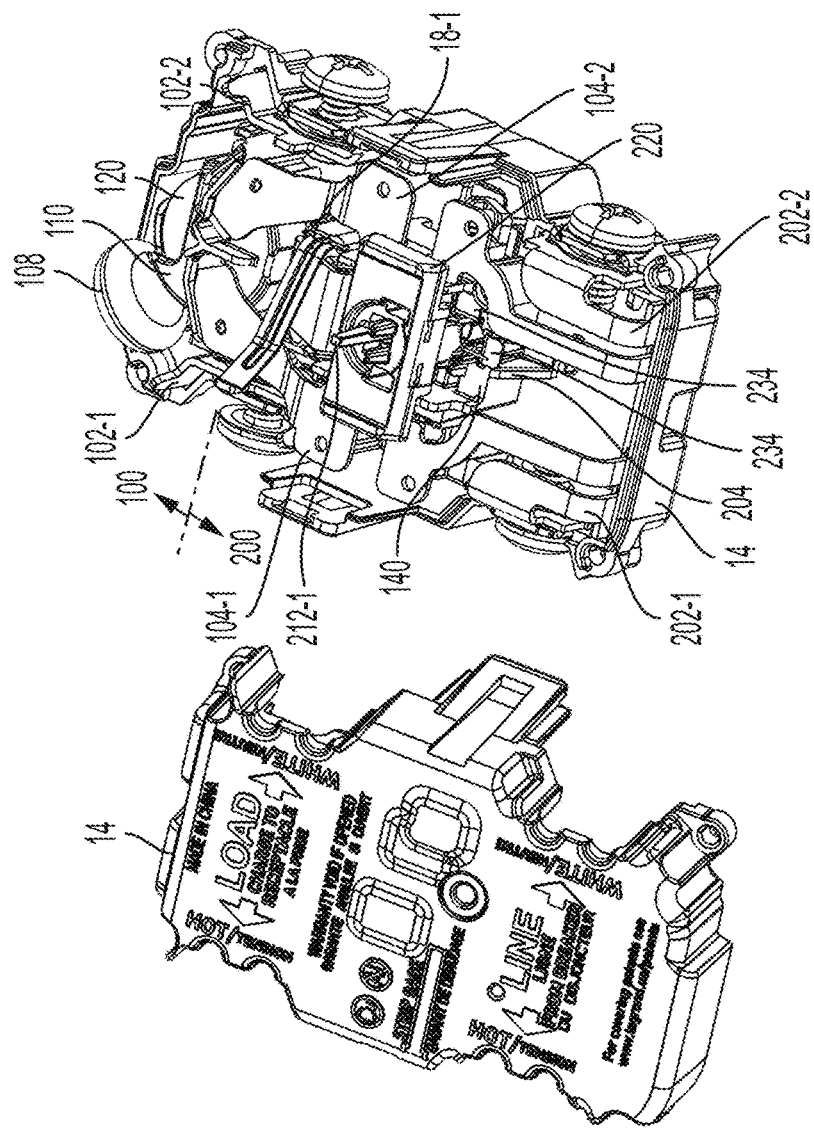
FIG. 7A is a top perspective view of a back body portion component of an embodiment.
FIG. 7B is a bottom perspective view of a back body portion component of an embodiment.
FIG. 7C is a top perspective view of a back body portion component populated with certain elements of a line interface assembly and an electromechanical assembly of an embodiment.

Referring to FIGS. 7A-B, top side and the bottom side perspective views, respectively, of the back body portion 14 are shown in accordance with an embodiment. FIG. 7C shows the top side of the back body portion 14 populated with certain elements of the line interface assembly 100 and the electromechanical assembly 200. For example, MOV 108, toroidal housing 110, toroidal sensor assembly 120, hot line terminal 102-1, neutral line terminal 102-2, test blade 18-1, line hot contact arm 104-1, line neutral contact arm 104-2, latch block 220, latch guide 140, auxiliary contacts 234, auxiliary spring 204, load terminal hot 202-1, and load terminal neutral 202-2 are shown positioned in the top side of the back body portion 14 in FIG. 7C. MOV 108, e.g., 12 mm, is connected between the line hot terminal 102-1 and the line neutral terminal 102-2 in order to, for example, condition the AC power input signal provided by a source of AC power.

FIGS. 7D-E are top perspective views of elements of the protective electrical wiring device 10 assembled in conjunction with PCB 201 without the front cover 12, the separator 16 and the back body portion 14 according to an embodiment. In particular, PCB 201 is populated with certain elements of the line interface assembly 100 and the electromechanical assembly 200. For example, FIG. 7D shows toroidal housing 110 with toroidal sensor assembly 120, hot line terminal 102-1, neutral line terminal 102-2, line hot contact arm 104-1 with contact 104-3, line neutral contact arm 104-2 with contact 104-4, and MOV 108. The solenoid frame 212-1, solenoid coil 212, latch block 220, latch guide 140, auxiliary contacts 234, and auxiliary spring 204, load terminal hot 202-1 with contact 202-3, and load terminal neutral 202-2 with contact 202-4 are also shown.

FIG. 7E includes the addition of the hot receptacle terminal 22-1 including hot outlet receptacle contacts 22-10 and fixed contact bridge 22-12 with fixed contacts 22-14 and 22-16, and the neutral receptacle terminal 22-2 includes neutral outlet receptacle contacts 22-20 and fixed contact bridge 22-22 with fixed contacts 22-24 and 22-26. Hot receptacle terminal 22-1 is positioned over hot line terminal 102-1 and load terminal hot 202-1, and neutral receptacle terminal 22-2 is positioned over line neutral contact arm 104-2 and load terminal neutral 202-2. This positioning allows (i) the fixed contacts 22-14 and 22-16 to be connected to line/hot-side contact 104-3 and load/hot-side contact 202-3, respectively; and (ii) fixed contacts 22-24 and 22-26 to be connected to line/neutral-side contact 104-4 and load/neutral side contact 202-4, respectively, in the reset position/condition (as should be understood by those of ordinary skill in the art in conjunction with a review of this disclosure). The line hot contact arm 104-1, line neutral contact arm 104-2, and the contacts arms of load terminal hot 202-1 and load terminal neutral 202-2 are cantilevered biasing members, each of which is biased up toward the respective receptacle fixed contact structure/terminal. In a tripped condition, the latch block 220 moves down toward the line and load contact structures/terminals (via biasing force of the reset break spring 17-2) and each "foot" 220-1 of the latch block 220 pushes a separate line and load contact structure/terminal away from a respective load contact structure/terminal (as described in further detail below). Additional particulars of connections of certain specific contacts in the reset state vs. the breaking of such connections are discussed further below.

Figure 8A:
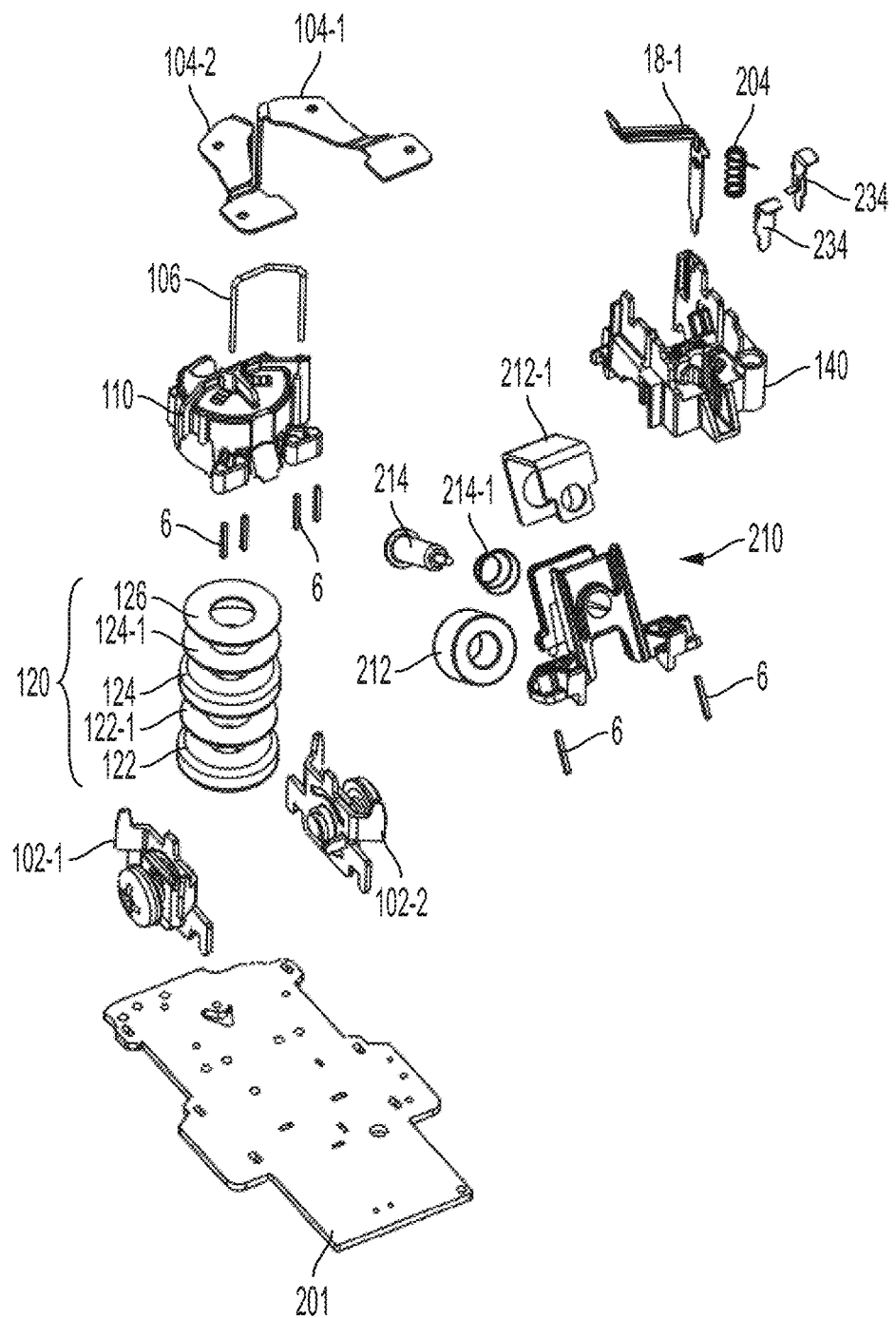
FIG. 8A is an exploded perspective view of a line interface assembly and portions of a electromechanical assembly of an embodiment.
Figure 8B:
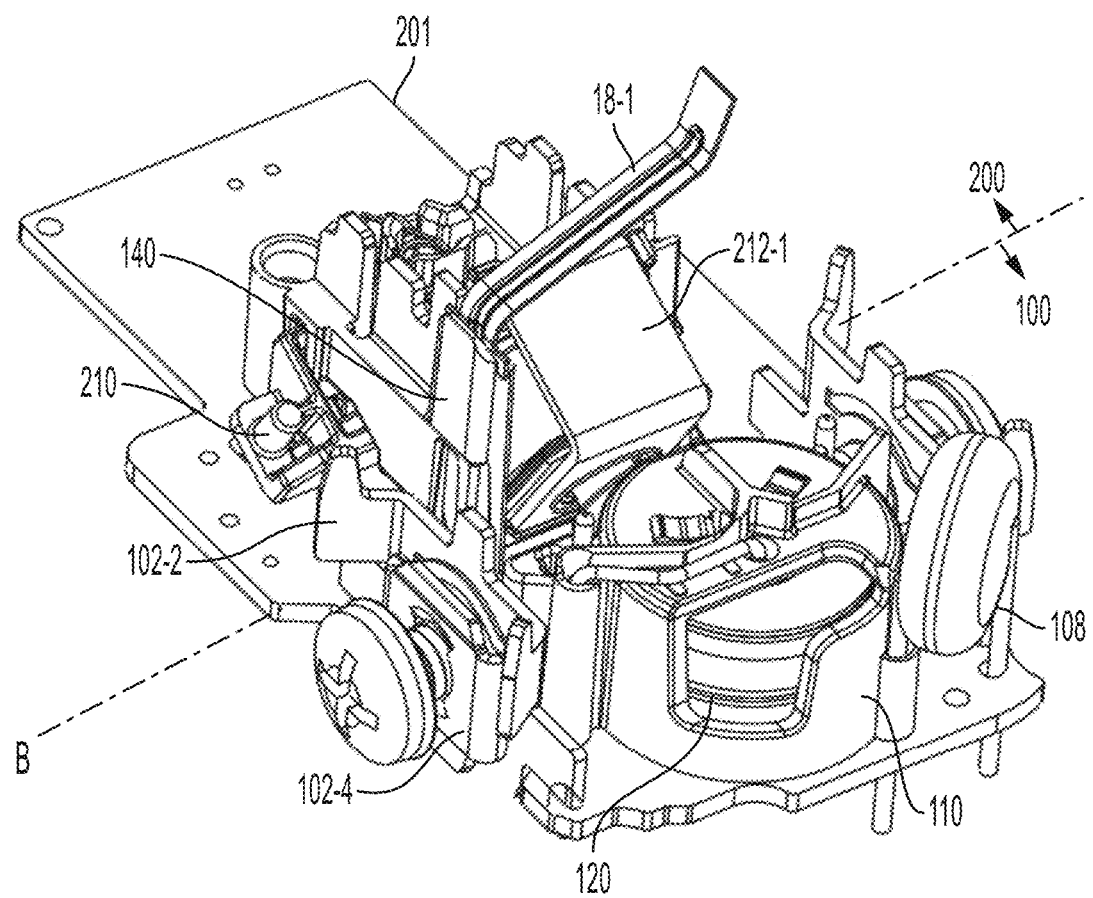
FIG. 8B is an assembled perspective view of a line interface assembly and portions of a electromechanical assembly of an embodiment.

Turning to 8A-B, an exploded view and an assembled view of the line interface assembly 100 and portions of the electromechanical assembly 200, respectively, are shown in accordance with an embodiment. FIGS. 8A-B provide a closer look at these elements. In brief, FIG. 8A shows the following elements of the line interface assembly 100—line/neutral-side contact 104-4 of the line neutral contact arm 104-2, self-test wire 106, and toroidal sensor assembly 120 including a grounded neutral sensor 122, an insulator 122-1, a differential sensor 124, another insulator 124-1, and a shield portion 126 prior to being positioned within the toroidal housing 110 and prior to being mounted to the PCB 201; and hot line terminal 102-1 and neutral line terminal 102-2 are shown prior to being mounted to the PCB 201. FIG. 8A also shows following elements of the electromechanical assembly 200—test blade 18-1, auxiliary contacts 234, and auxiliary spring 204 prior to being positioned within the latch guide 140 and prior to being mounted to the PCB 201; and solenoid bobbin assembly 210, solenoid frame 212-1, solenoid coil 212, coil spring 214-1, armature plunger 214 prior to being mounted to the PCB 201. FIG. 8B shows some of these elements in assembled form and mounted to the PCB 201.

Figure 9A:
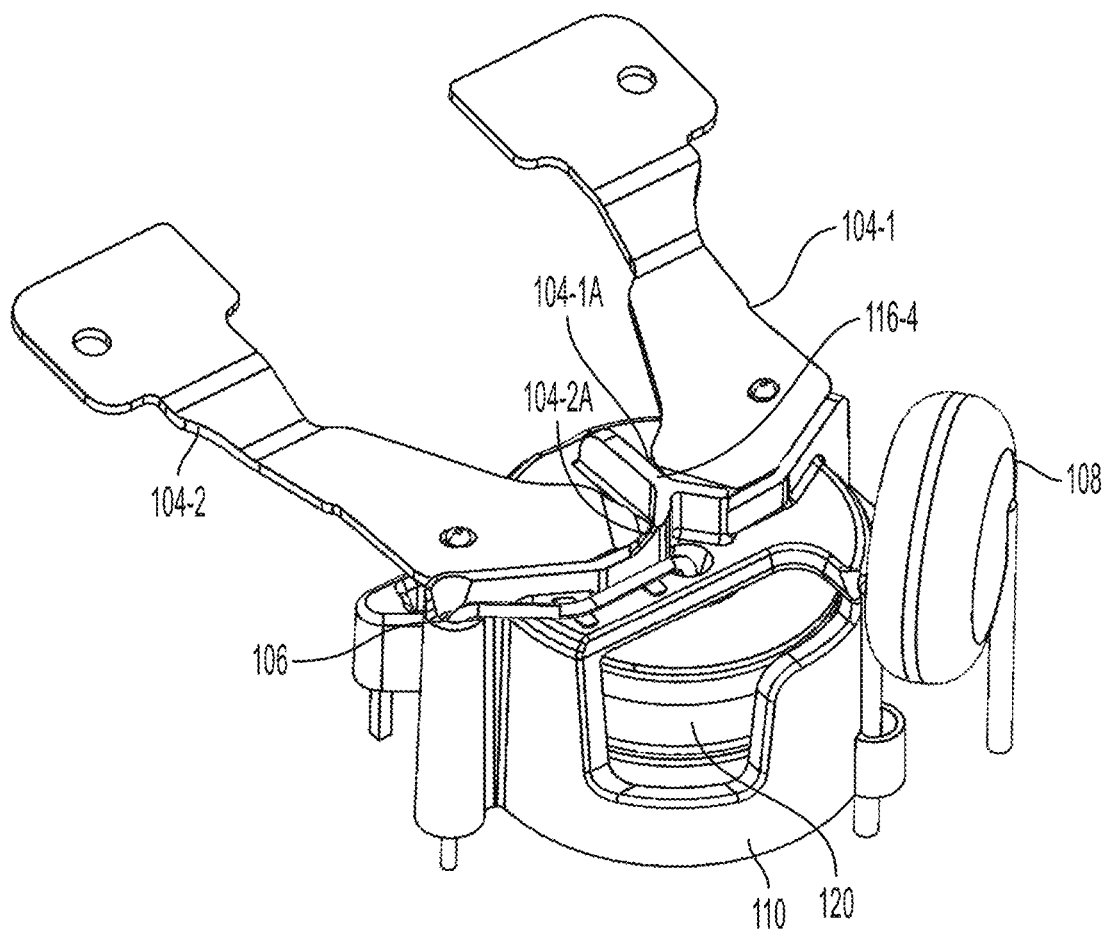
FIG. 9A is a top assembled perspective view of a line interface assembly of an embodiment.
Figure 9B:
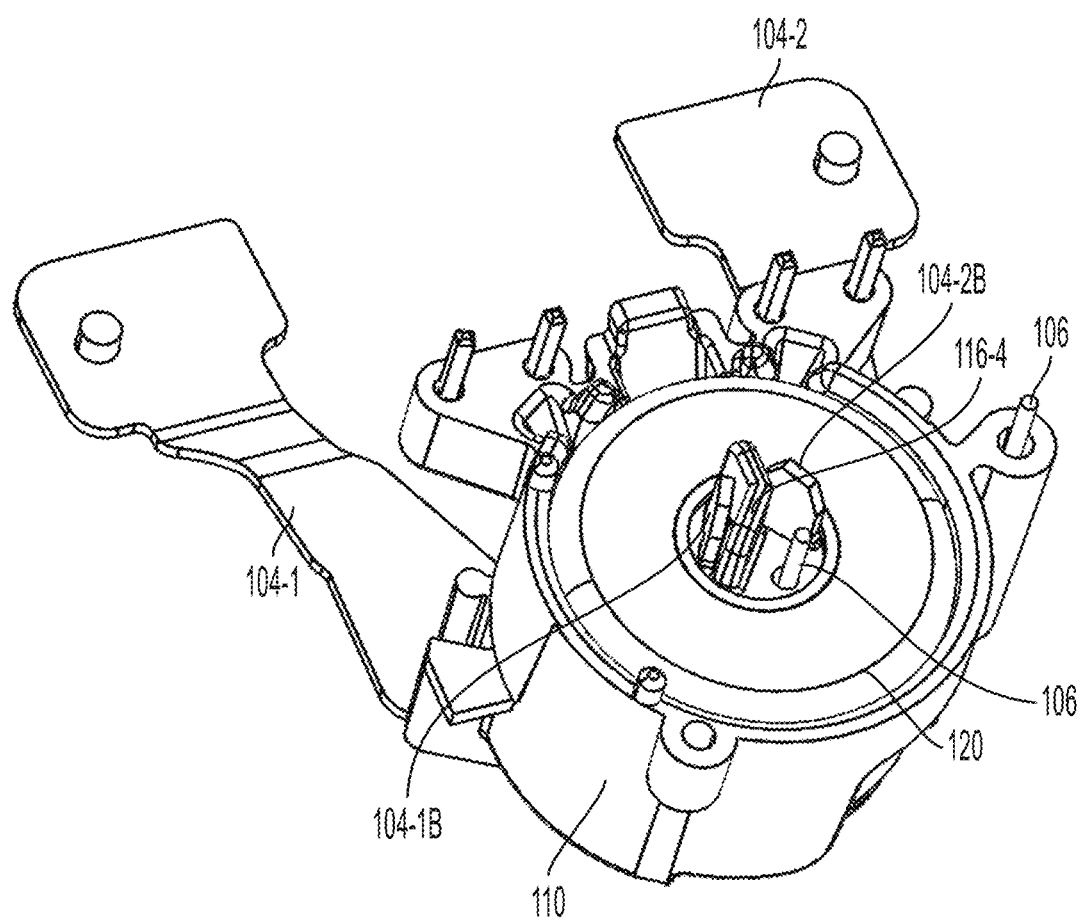
FIG. 9B is a bottom assembled perspective view of a line interface assembly of an embodiment.
Figure 9C:
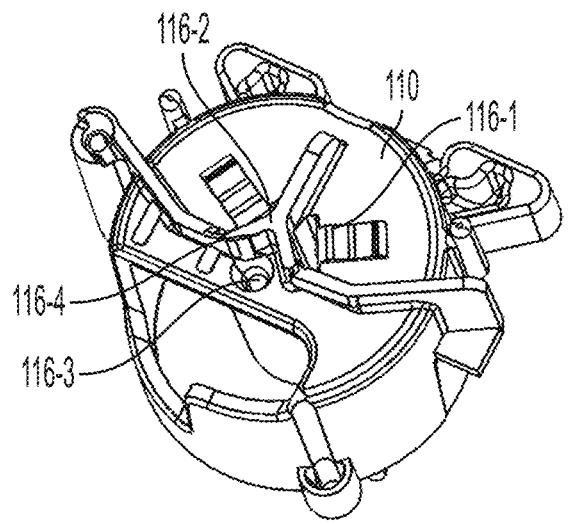
FIG. 9C is a bottom perspective view of a toroidal housing component of an embodiment.
Figure 9D:
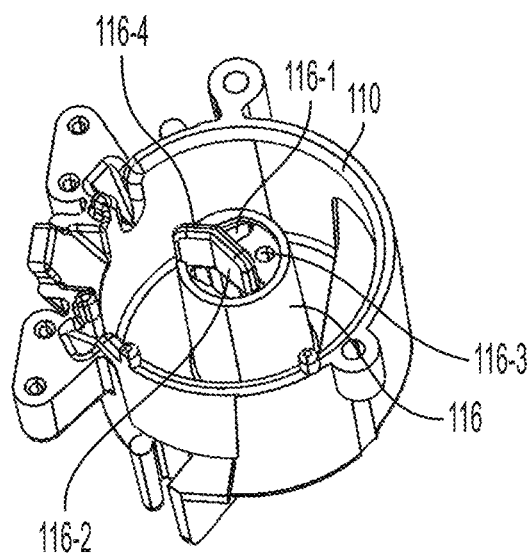
FIG. 9D is a top perspective view of a toroidal housing component of an embodiment.
Figure 9E:
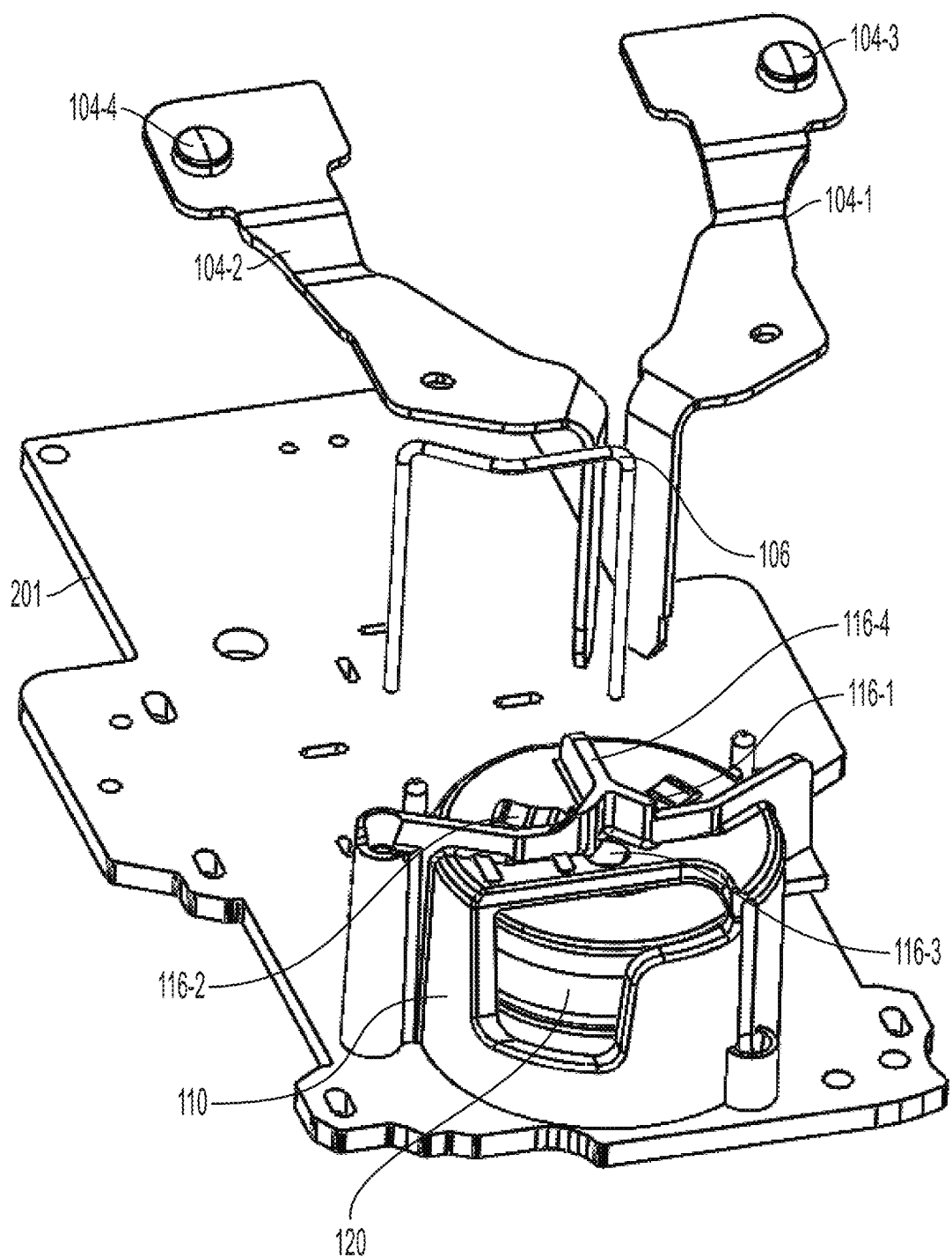
FIG. 9E is a top partially exploded perspective view of the line interface assembly shown in FIG. 9A and positioned on a PCB of an embodiment.
Figure 9F:
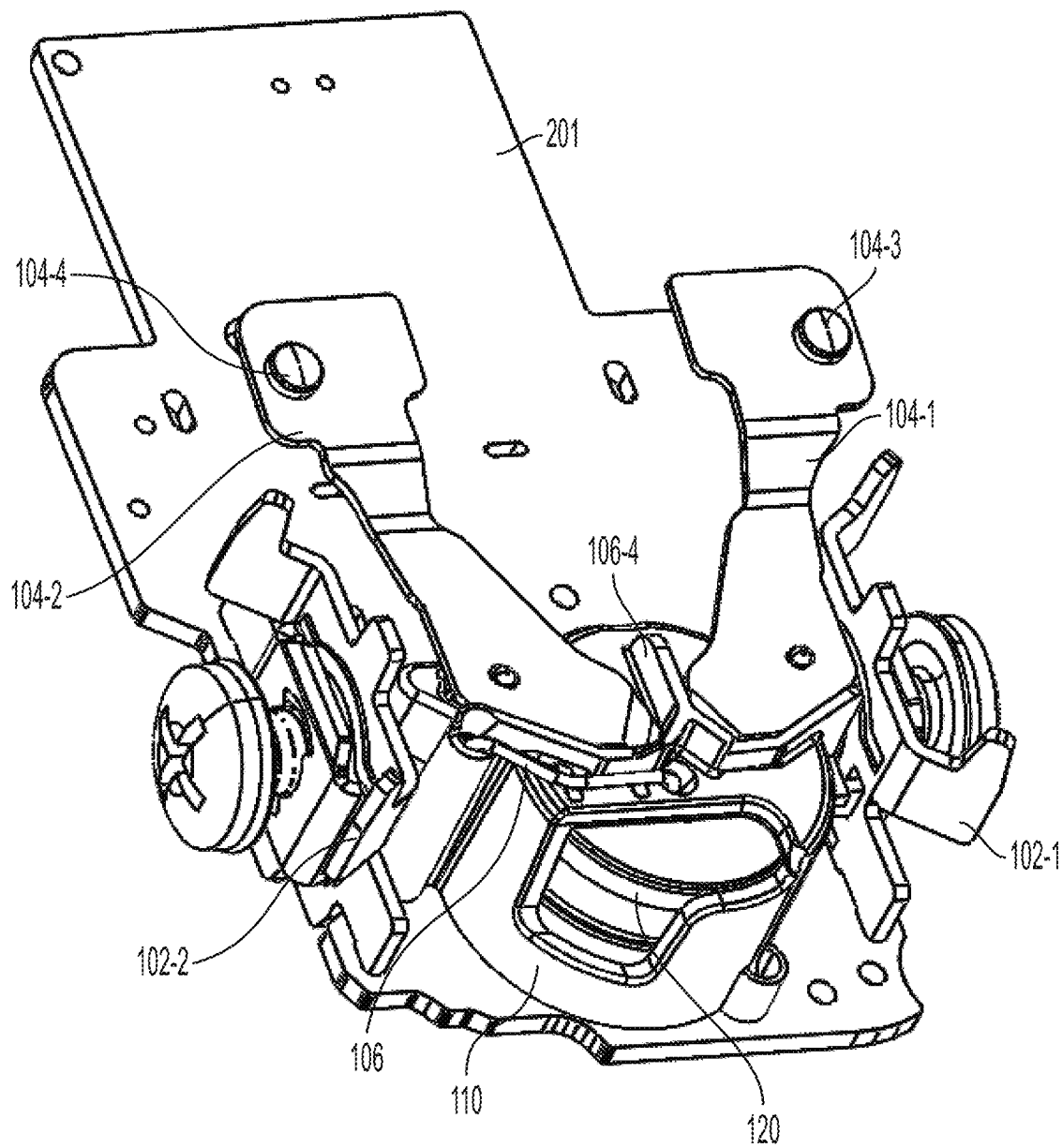
FIG. 9F is a top assembled perspective view of the line interface assembly shown in FIG. 9A and positioned on a PCB of an embodiment.
Figure 9G:
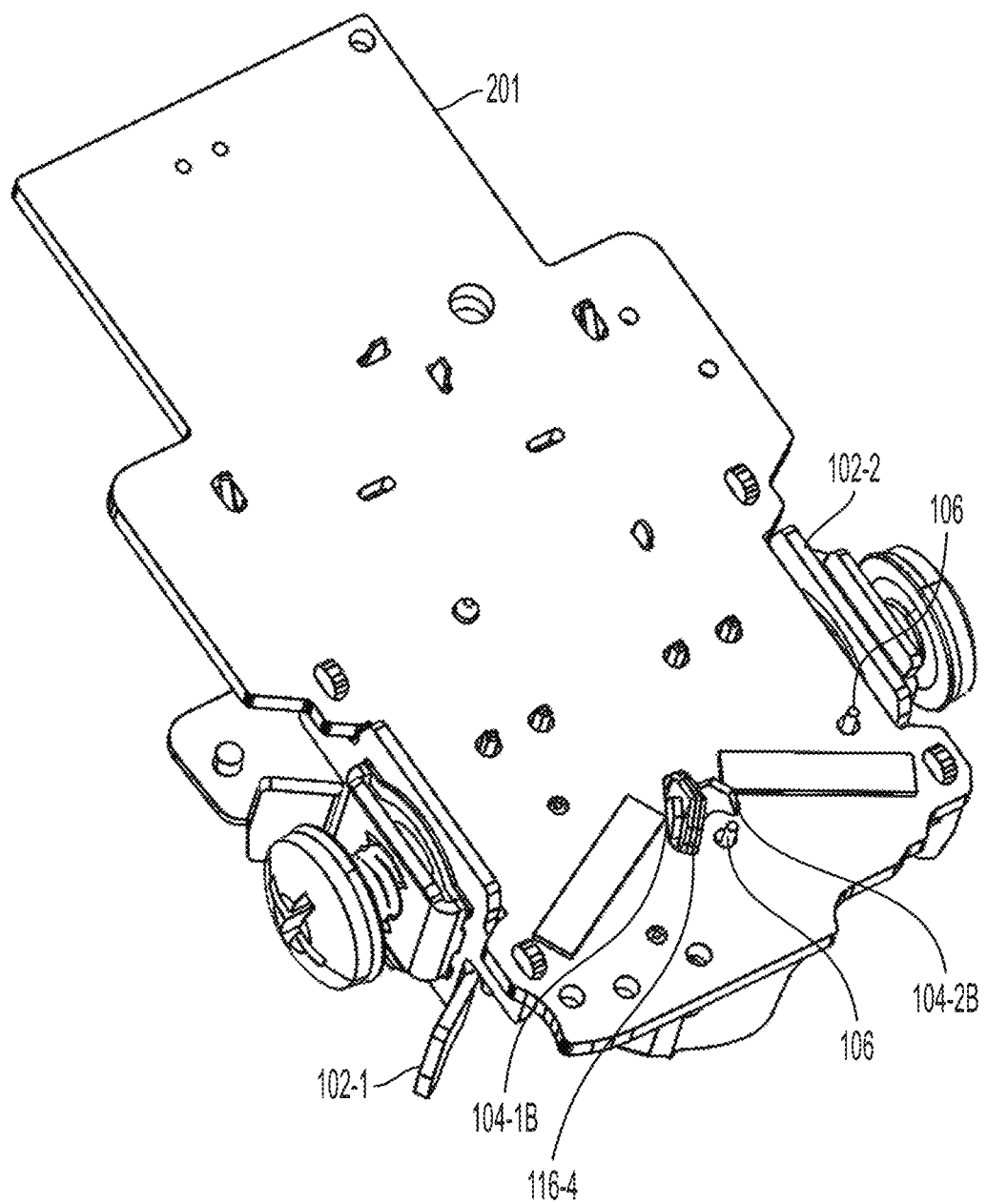
FIG. 9G is a bottom perspective view of the line interface assembly shown in FIG. 9A and positioned on a PCB of an embodiment.
Figure 9H:
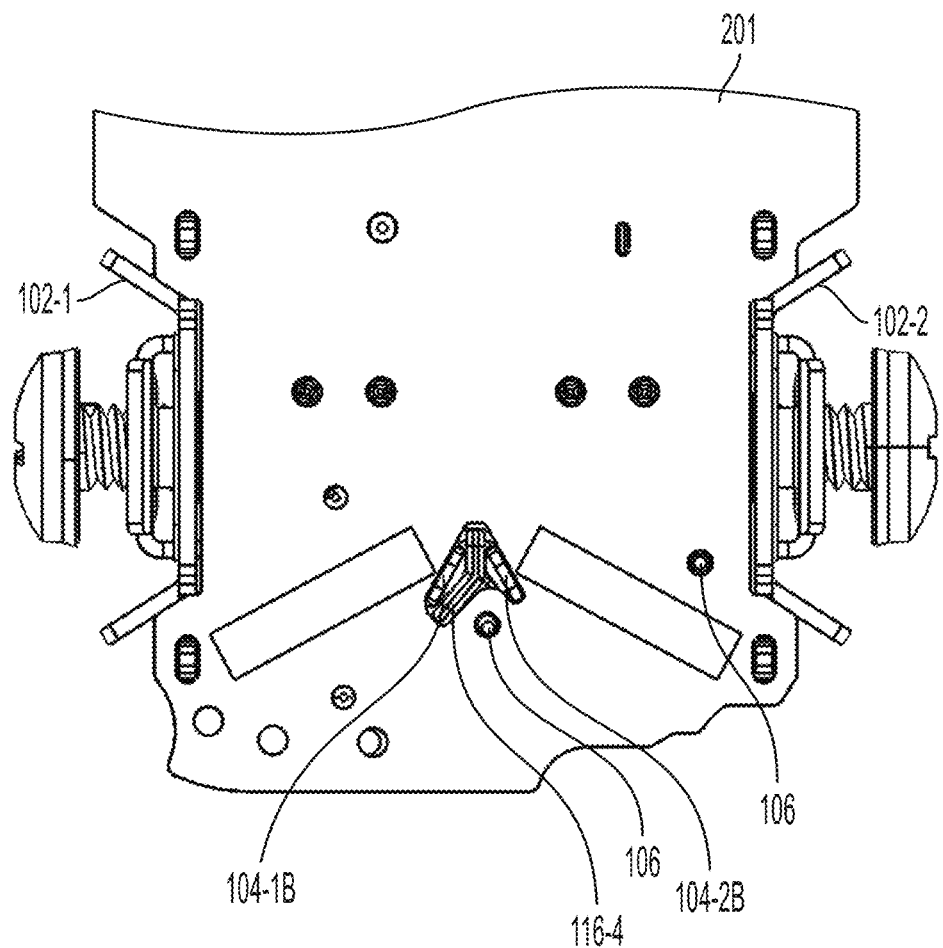
FIG. 9H is a bottom perspective view of the line interface assembly shown in FIG. 9A and positioned on a PCB of an embodiment.
Figure 9I:
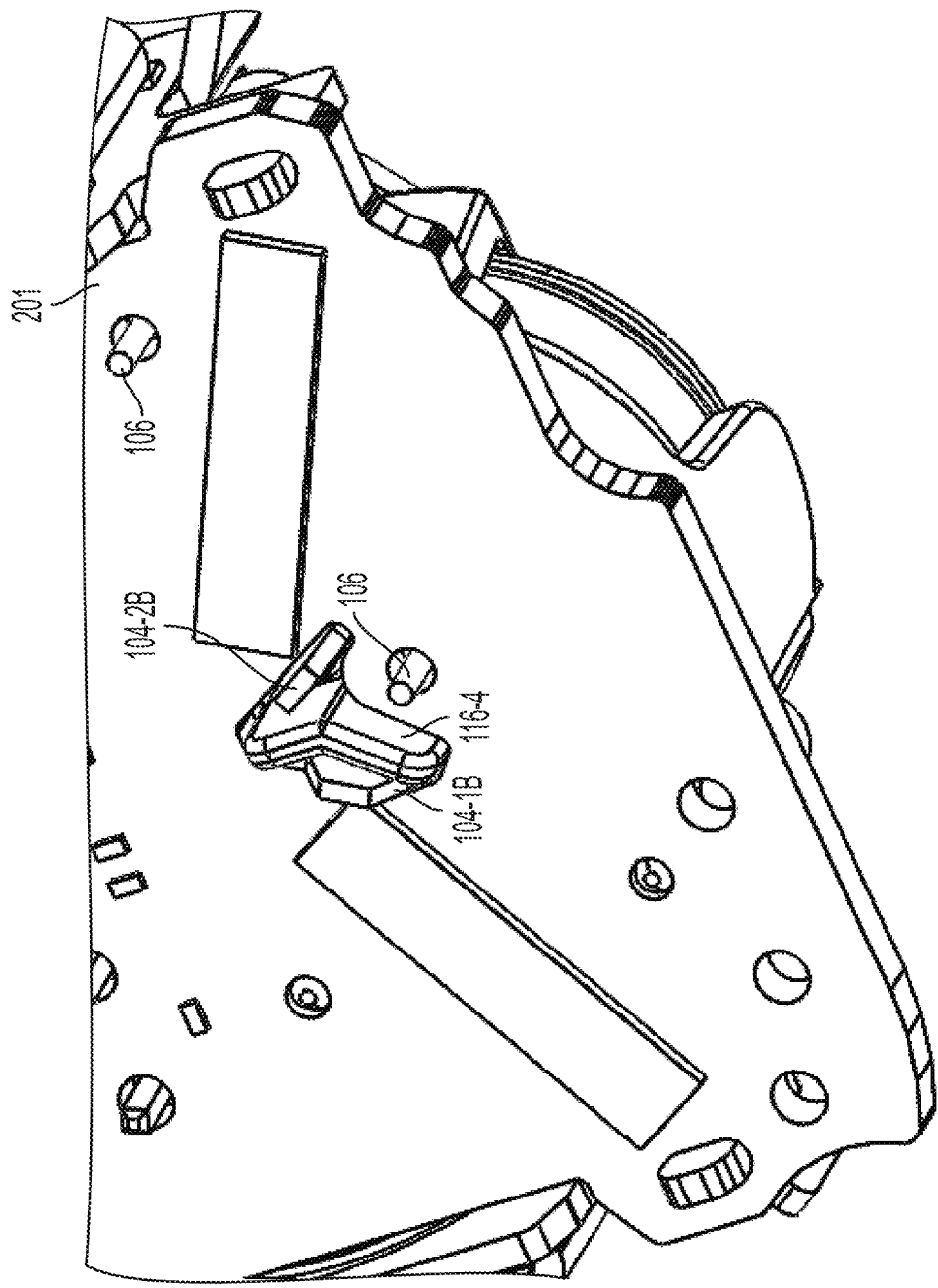
FIG. 9I is a bottom perspective view of the line interface assembly shown in FIG. 9A and positioned on a PCB of an embodiment.
Figure 9J:
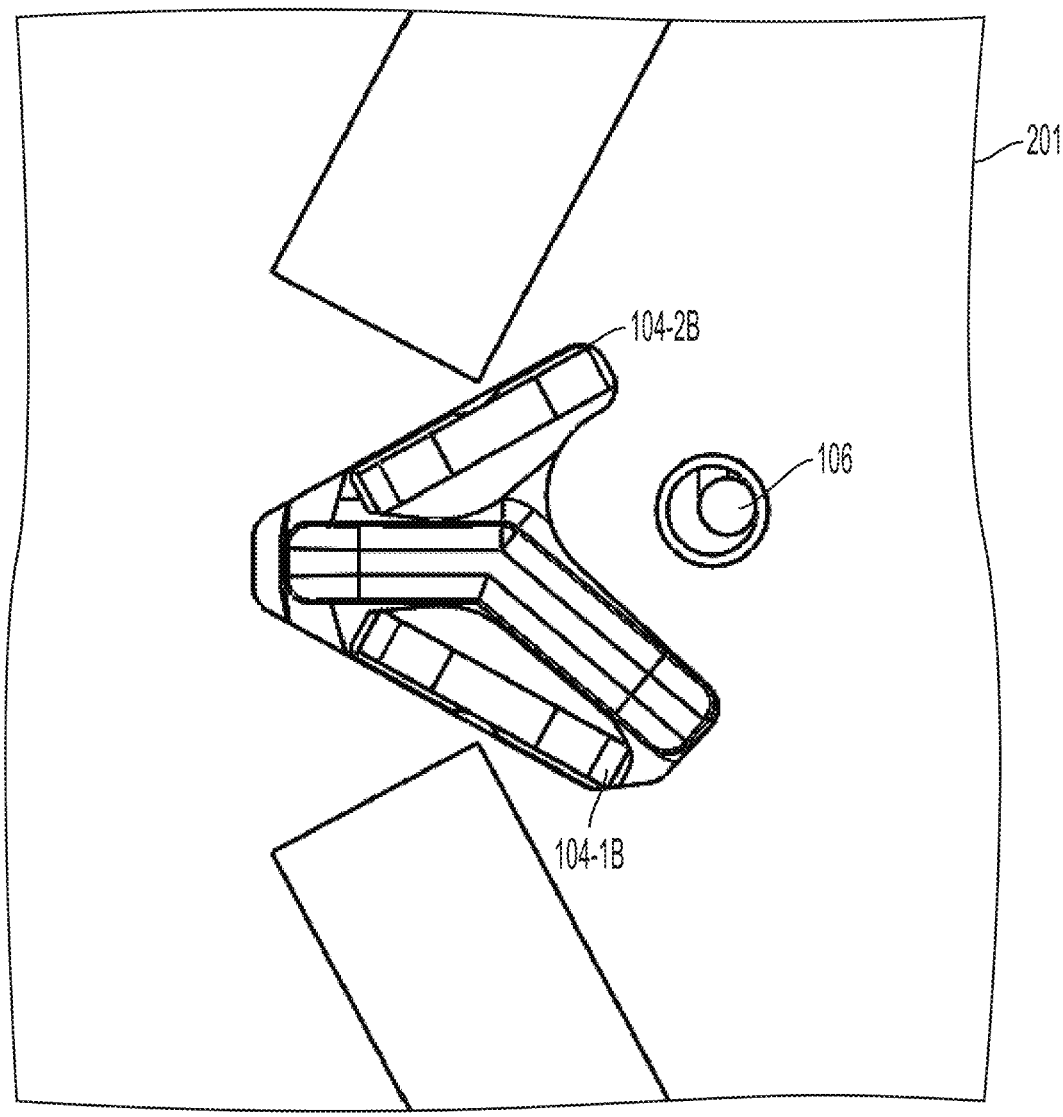
FIG. 9J is a bottom perspective partial view of the line interface assembly shown in FIG. 9A and positioned on a PCB of an embodiment.

Turning to FIGS. 9A-B, perspective views of the line interface assembly 100 are disclosed in accordance with an embodiment. FIG. 9A shows the top side of the line interface assembly 100. The line interface assembly 100 includes a dielectric, or electrically insulative, toroidal housing 110. The toroidal housing 110 includes a guide channel 116 (see FIG. 9B) that is mounted in the PCB 101 such that it follows the central cylindrical axis of the toroidal housing 110 from base to base. The central portion of the housing 110 houses (and substantially shields) the toroidal sensor assembly 120. The guide channel 116 includes three passages (116-1, 116-2, and 116-3) that accommodate the hot contact arm 104-1, the neutral contact arm 104-2, and a test circuit conductor (or self-test grounded neutral wire) 106, respectively (See FIGS. 9B-9D). As shown in FIG. 9E-F, the contact arms 104-1 and 104-2 include contacts 104-3 and 104-4, respectively, which form the line portion of the interrupting contact set described below. Furthermore, contact arms 104-1 and 104-2 include portions (104-1A, 104-2A; and 104-1B, 104-2B—see FIG. 9B) respectively that are electrically isolated by a "Y-shaped" or "V-shaped" structural component 116-4 (at least a portion of which can extend from the top surface of the housing 110 through the toroidal sensor assembly 120 and the PCB 201 to or through the bottom surface of the PCB 201). The components that are positioned through the central portion of the toroidal sensor assembly 120—hot contact arm 104-1, the neutral contact arm 104-2, and a test circuit conductor 106—need to be positioned in fairly close arrangement. The Y-shaped/V-shaped structure provides a 120 degree index (instead of a 90 degree index, as is sometimes conventionally done) to give the most clearance between the hot contact arm 104-1, the neutral contact arm 104-2, and the test circuit conductor 106 and still allow these components to be positioned through the central portion of the toroidal sensor assembly 120. In addition, the hot contact arm 104-1, the neutral contact arm 104-2, and the test circuit conductor 106 are each soldered to the PCB 201 and connected to other elements via a trace on the board (as should be understood by a person of ordinary skill in the art in conjunction with this disclosure). The unique Y-shaped/V-Shaped structural component 116-4 provides an inventive configuration sufficient to allow the close arrangement between these elements as they pass through the toroidal sensor assembly 120 while keeping the elements separated to prevent arcing. Y-shaped/V-shaped structural component 116-4 is also configured to protect MOV 108 when abnormally high energy lightning surges are present. The Y-shaped/V-shaped structural component 116-4, therefore, represents a line voltage conditioning element disposed within the interface assembly 100. In addition, in the embodiment shown, the self-test grounded neutral wire 106 is uninsulated and thicker and stiffer (e.g., two times as compared with conventional designs) by virtue of it being uninsulated. This thicker and stiffer self-test ground neutral wire 106 assists in the manufacture of device 10 (assists with "pick and place" assembly and a decrease in expense associated therewith).

FIGS. 9E-J show various additional full and partial perspective assembled views and a perspective exploded view of the line interface assembly 100 shown in FIG. 9A, and positioned on the PCB 201. In particular, FIG. 9E shows a top perspective exploded view of the line interface assembly 100, according to an embodiment. FIG. 9F shows a top perspective assembled view of the line interface assembly 100, according to an embodiment. FIGS. 9F-J each show a bottom perspective assembled view of the line interface assembly 100 with increasing magnification, according to an embodiment.

Figure 10B:
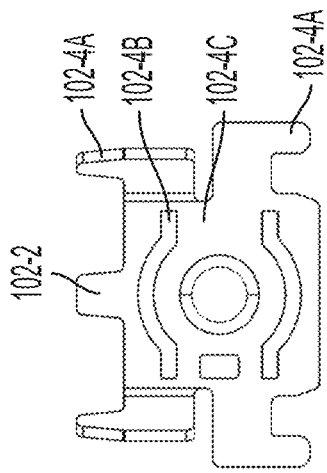
FIG. 10B is a perspective view of a neutral line terminal component of an embodiment.
Figure 10C:
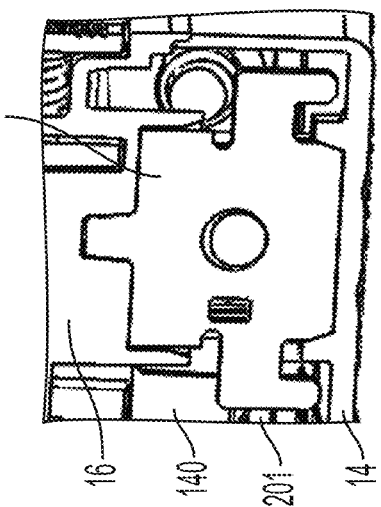
FIG. 10C is a perspective view of a neutral line terminal component positioned with respect to certain other elements of a protective electrical wiring device of an embodiment.
Figure 10A:
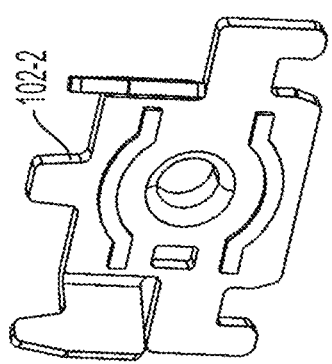
FIG. 10A is a perspective view of a neutral line terminal component of an embodiment.

Turning to FIGS. 10A-B, perspective views of the neutral line terminal 102-2 (which is similar in shape and structural configuration to the hot line terminal 102-1) is shown in accordance with an embodiment. The inside (and/or outside) surface 102-4C of the neutral line terminal 102-2 includes at least one protrusion and/or stamped rib 102-4B (which can be sharp or dull) extending a distance from the inside surface 102-4C. Neutral line terminal 102-2 also includes a plurality of posts or legs 102-4A, which can be bent towards or away from the direction the inside surface 102-4C faces. FIG. 10C shows a close-up/magnified view of the neutral line terminal 102-2 positioned with respect to other elements of device 10 including the body portion 14, PCB 201, latch guide 140, and separator 16.

Figure 11A:
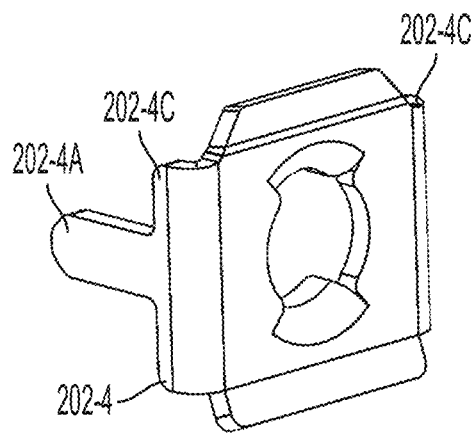
FIG. 11A is a perspective front view of a load terminal neutral pressure plate component of an embodiment.
Figure 11B:
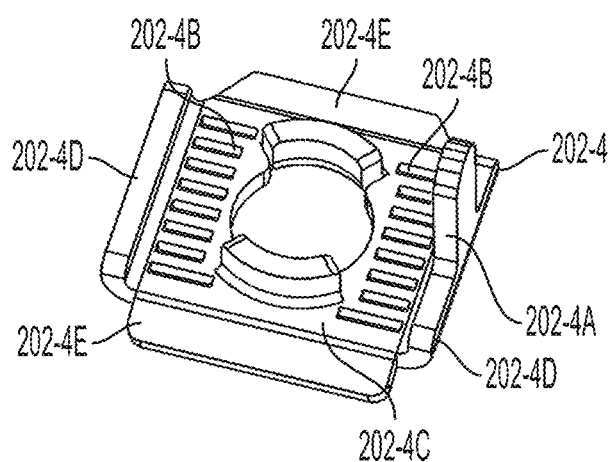
FIG. 11B is a perspective back view of a load terminal neutral pressure plate component of an embodiment.
Figure 11C:
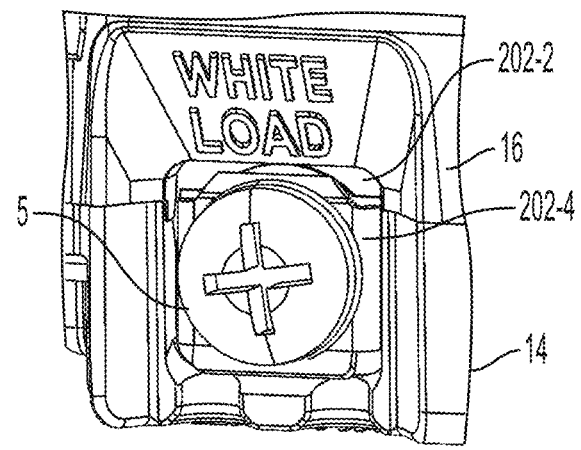
FIG. 11C is a perspective front view of a load terminal neutral pressure plate component positioned with respect to certain other elements of a protective electrical wiring device of an embodiment.
Figures 11D, 11E:
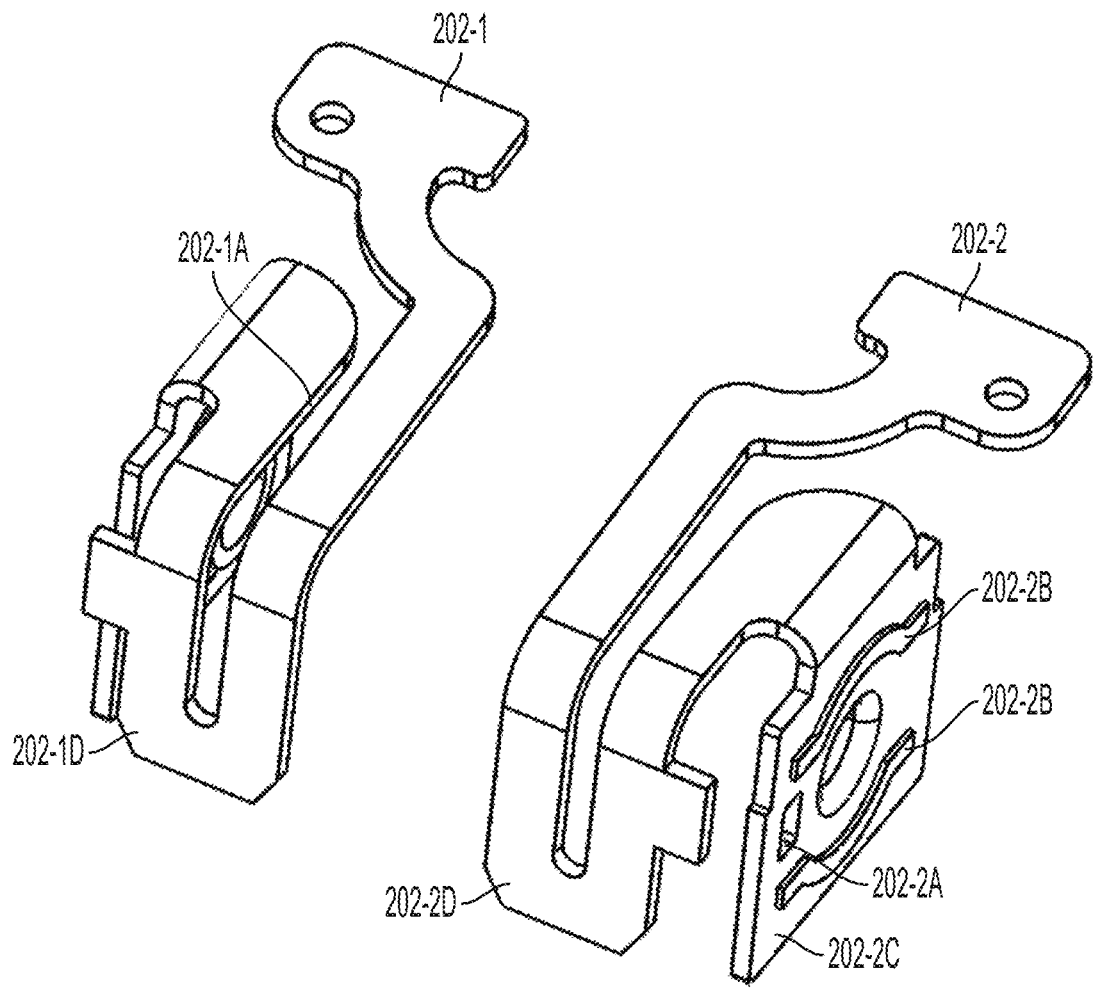
FIG. 11D is a perspective view of a load terminal hot component of an embodiment.
FIG. 11E is a perspective view of a load terminal neutral component of an embodiment.

Turning to FIGS. 11A-B, perspective views of the load terminal neutral pressure plate 202-4 (which is similar in shape and structural configuration to the load terminal hot pressure plate 202-3) is shown in accordance with an embodiment. The inside surface 202-4C of the load terminal neutral pressure plate 202-4 includes at least one protrusion and/or stamped rib 202-4B (which can be sharp or dull) extending a distance from the inside surface 202-4C. At least one leg 202-4A extends from either inside surface 202-4C or from side 202-4D (which can be bent toward or away from the direction the inside surface 202-4C faces). Other side surfaces 202-4E can be straight or bent (shown slightly bent in separate directions in these figures). FIG. 11C is a perspective magnified view of load terminal neutral pressure plate 202-4 positioned on load terminal neutral 202-2 on an assembled device 10 via a screw 5. FIGS. 11D-E are perspective views of the load terminal hot 202-1 and load terminal neutral 202-2. Load terminal neutral 202-2 includes an aperture 202-2A, protrusions 202-2B and/or stamped ribs (similar to protrusions, discussed below with reference to FIGS. 12-14, which assists with holding a wire 50) outside facing surface 202-2C, and bent u-shaped arm portion 202-1D. In an assembled configuration, the pressure plate 202-4 is positioned against face 202-2C and leg 202-4A of pressure plate 202-4 is positioned through aperture 202-2A. Similarly, load terminal hot 202-1 includes an aperture 202-1A, protrusions 202-1B and/or stamped ribs (not shown), outside facing surface 202-1C (not shown), and bent u-shaped arm portion 202-1D.

Referring to FIGS. 12A-C, a single wire 50 is shown being connected to neutral line terminal 102-2 (which is similar to a wire being connected to the hot line terminal 102-1). FIGS. 12A-B are perspective views of pressure plate 202-4 being used to connect a single wire 50 to neutral line terminal 102-2 via screw 5. Side 202-4D is slightly bent toward the outside surface 102-4C of the neutral line terminal 102-2, in order to accommodate and assist with holding wire 50 in place. FIG. 12C is a side sectional view taken along A-A of FIG. 12B showing at least one protrusion 202-4B of the load terminal neutral pressure plate 202-4, and at least one protrusion 102-4B of neutral line terminal 102-2 biting into wire 50 as the screw is turned and tightened. These protrusions assist with resisting a pull force exhibited on the wire—shown by arrow A. Additionally, a lead in angle (preferably greater than 0 and less than 90) is formed by one of the side surfaces 202-4E to assist with insertion of the wire 50 between the pressure plate 202-4 and the neutral line terminal 102-2.

Referring to FIGS. 13A-C, two wires 50 are shown being connected to neutral line terminal 102-2 (which is similar to wires being connected to the hot line terminal 102-1) in accordance with an embodiment. These figures are very similar and show the same elements as FIGS. 12A-C, other than the difference in the number of wires 50.

Turning to FIGS. 14A-C, a single wire 50 is shown in a wrapped configuration and connected to neutral line terminal 102-2 (which is similar to a wire being in a wrapped configuration and connected to the hot line terminal 102-1). These figures are very similar and show the same elements as FIGS. 12A-C, other than the wire 50 being in a wrapped configuration in FIGS. 14A-C. Lead in side surface 202-4E becomes an edge pointed toward the wire 50 that bites into the wire 50 when the wire becomes wrapped as shown in FIG. 14C.

Figure 15A:
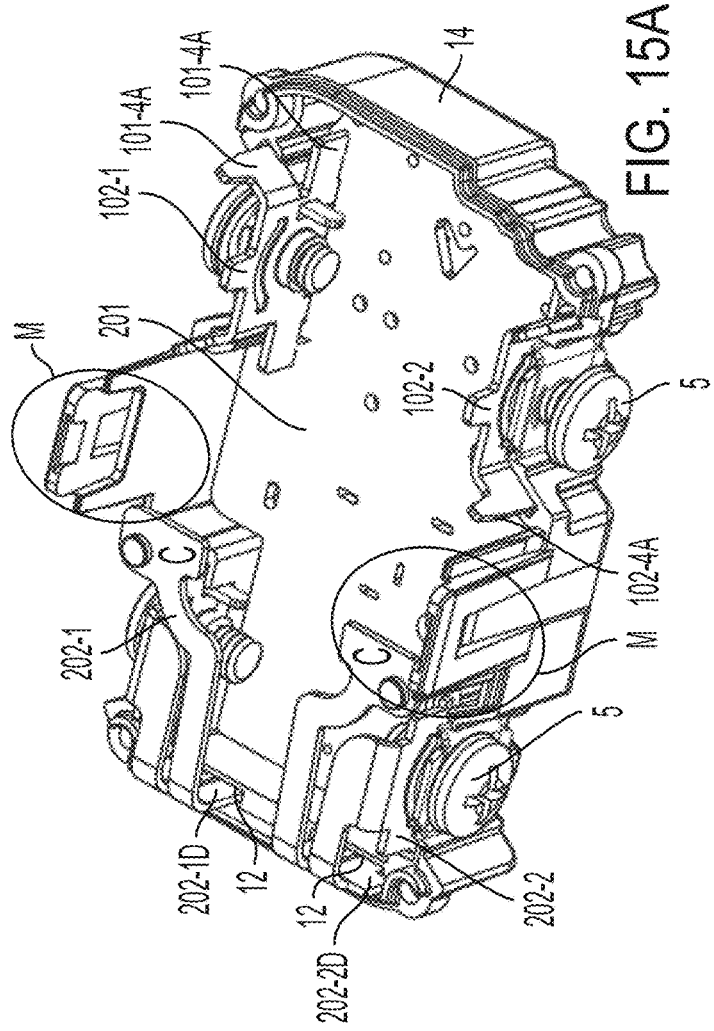
FIG. 15A is a perspective top view of a back body portion component with torque resistant structural assembly components of an embodiment.
Figure 15C:
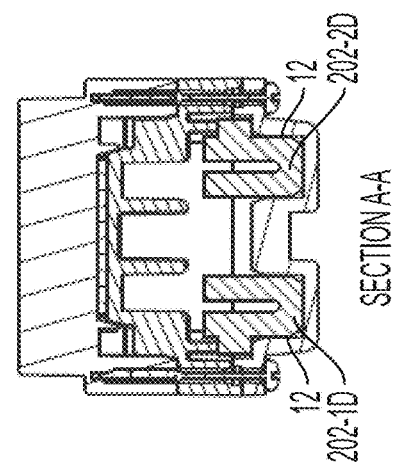
FIG. 15C is a sectional view taken along C-C of FIG. 15B of the protective electrical wiring device showing components of a torque resistant structural assembly of an embodiment.
Figure 15B:
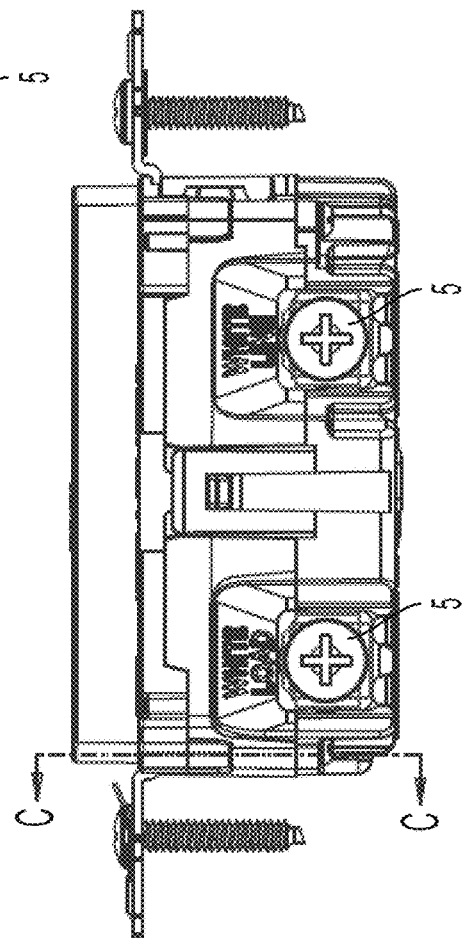
FIG. 15B is a perspective side view of a protective electrical wiring device showing components of a torque resistant structural assembly of an embodiment.

Referring to FIGS. 15A-C, illustrations of unique torque resistant constructions are provided, which utilize the previously described unique structural configurations of the hot line terminal 102-1, neutral line terminal 102-2, load terminal hot 202-1, and load terminal neutral 202-2. The torque resistant constructions relate to the structure/configuration of each of these elements when positioned in the device 10, which counters torque imparted by an installer on screws (and resultant side/side and up/down movement) when connecting a wire 50 (as shown and described above). The torque resistant constructions are structured, positioned and/or configured to maintain proper alignment of contact arms "C" of the load terminal hot 202-1, and load terminal neutral 202-2 and of the hot line terminal 102-1 and the neutral line terminal 102-2, respectively.

In brief, FIG. 15A is a perspective view of the interior of the back body portion 14 with the PCB 201, hot line terminal 102-1, neutral line terminal 102-2, load terminal hot 202-1, and load terminal neutral 202-2 positioned therein. The arm portion 202-1D of load terminal hot 202-1 and arm portion 202-2D of load terminal neutral 202-2 are each positioned in a separate pocket portion 202-1D formed in the back body portion 14. These pocket portions 12 isolate the arm portions 202-2D and 202-1D of the load terminals (see also FIG. 15C, which is a sectional view of FIG. 15B taken along C-C), such that when torque is imparted on screws 5 of the load terminals—proper alignment of contact arms C (and, thus, the contacts positioned thereon) of the load terminal hot 202-1 and load terminal neutral 202-2 is maintained. Similarly, the positioning of each of the hot line terminal 102-1 and the neutral line terminal 102-2 is maintained when a respective screw 5 is torqued based on the respective posts or legs 102-1A and 102-4A, which are received through receiving apertures formed through or are otherwise configured to fit in conjunction with the PCB 201, back body 14 and separator 16 (not shown). In addition, the protrusions/stamped ribs on the line and load terminals are configured and structured to strengthen the terminals to resist bending when the screw is turned and torqued by an installer. FIG. 15A also shows central tongue male structural portions "M" extending from the back body 14 toward the separator 16 (not shown). These male structural portions can extend from any portion of the back body portion 14 and/or any part of the separator 16, and there can be one or more. In the embodiment shown in FIG. 15A, these centralized portions extend toward corresponding female groove portions "F" shown in FIG. 6A. These female structural portions can extend from any portion of the separator 16 and/or any part of the back body portion 14, and there can be one or more. These "tongue" and "groove" structural configurations, collectively work as part of an overall torque resistant structural assembly.

Figure 16A:
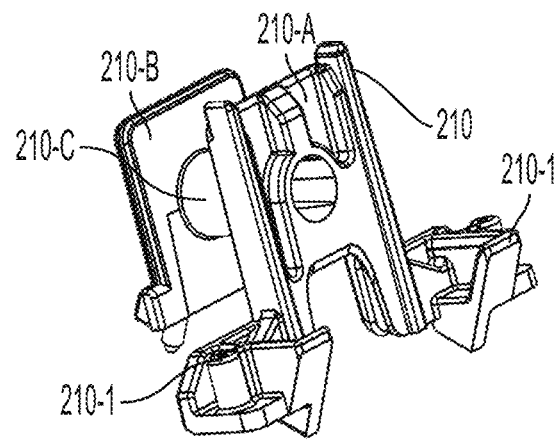
FIG. 16A is a perspective top view of a solenoid bobbin assembly component of an embodiment.
Figure 16B:
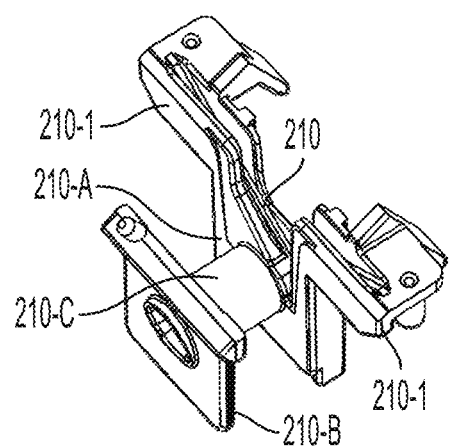
FIG. 16B is a perspective bottom view of a solenoid bobbin assembly component of an embodiment.
Figure 16C:
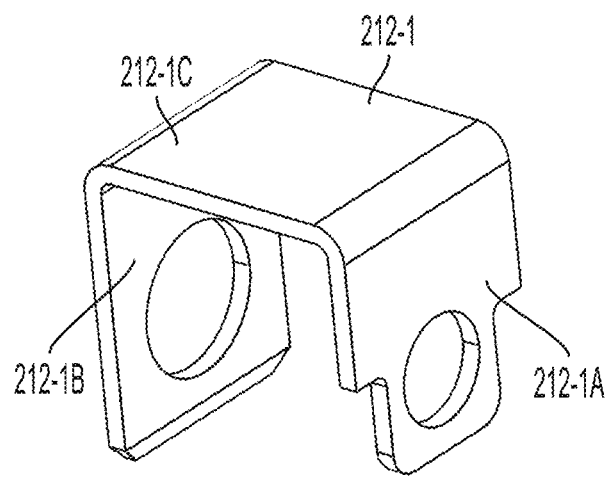
FIG. 16C is a perspective top view of a solenoid frame component of an embodiment.
Figure 16D:
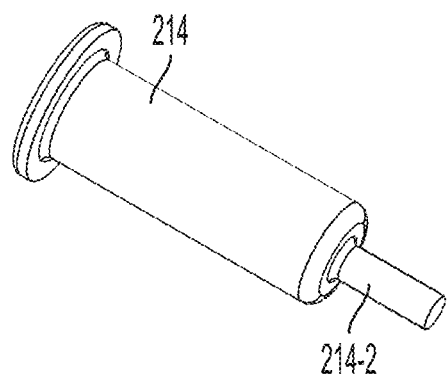
FIG. 16D is a perspective view of an armature component of an embodiment.
Figure 16E:
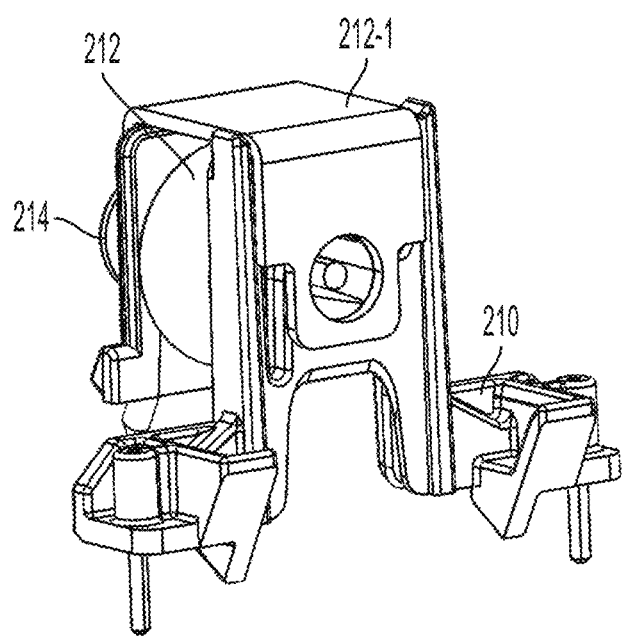
FIG. 16E is a top view of a solenoid bobbin assembly component with certain other elements of a protective electrical wiring device of an embodiment.

Portions of the electromechanical assembly 200 will now be discussed in further detail. Turning to FIG. 16A, a close up top side perspective view of the solenoid bobbin assembly 210 is shown in accordance with an embodiment of the present invention. FIG. 16B is an underside perspective view of the solenoid bobbin assembly 210 in accordance with an embodiment of the present invention. FIG. 16C provides a close up top side perspective view of solenoid frame 212-1, FIG. 16D is a close up top side perspective view of armature 214 with distal tip 214-2, and FIG. 16E is a close up top side perspective view of the solenoid bobbin assembly 210 assembled with the armature 214, solenoid coil 212, and solenoid frame 212-1. Solenoid bobbin assembly 210 includes a front plate portion 210-A with two front legs 210-1, and a back plate portion 210-B separated from the front plate portion 210-A by a hollow cylinder 210-C with two openings 210-3 positioned therethrough. Solenoid frame 212-1 includes a front plate portion 212-1A with an aperture, a back plate portion 212-1B with an aperture, and a top plate portion 212-1C. In the assembled configuration (as shown in FIG. 16E), solenoid frame 212-1 is positioned over the top of the solenoid bobbin assembly 210, where the apertures of the back plate portion 212-1B and the front plate portion 212-1A line up with openings 210-3. Further, solenoid coil 212 is positioned around cylinder 210-C, and armature 214 is positioned through the aperture in the back plate portion 212-1B and through the hollow cylinder 210-C and is positionable through the aperture in the front plate portion 212-1A in a tripped condition.

Figure 17A:
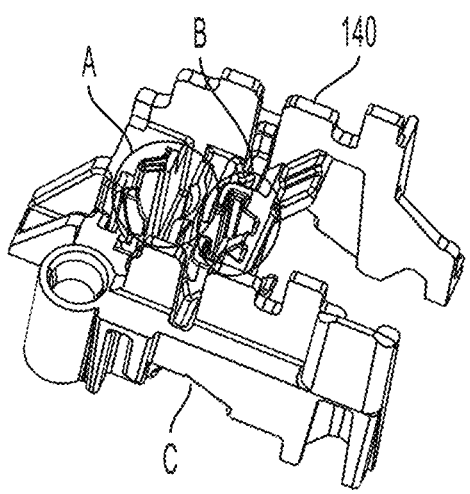
FIG. 17A is a top perspective view of a latch guide component of an embodiment.
Figure 17B:
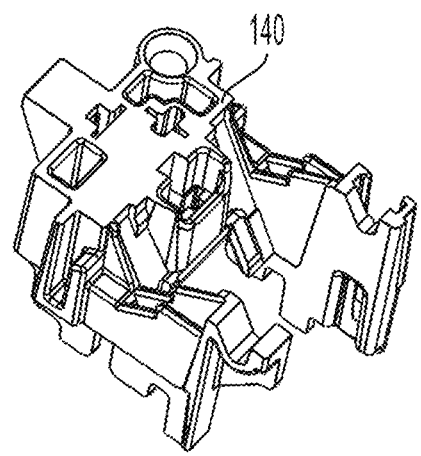
FIG. 17B is a bottom perspective view of a latch guide component of an embodiment.
Figure 17C:
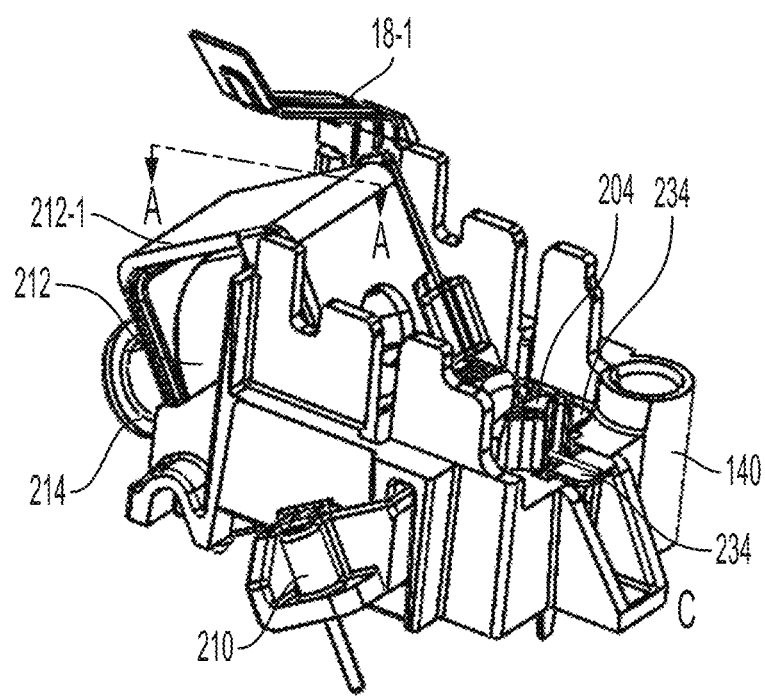
FIG. 17C is a top perspective view of a latch guide component with certain other elements of a protective electrical wiring device of an embodiment.
Figure 17D:
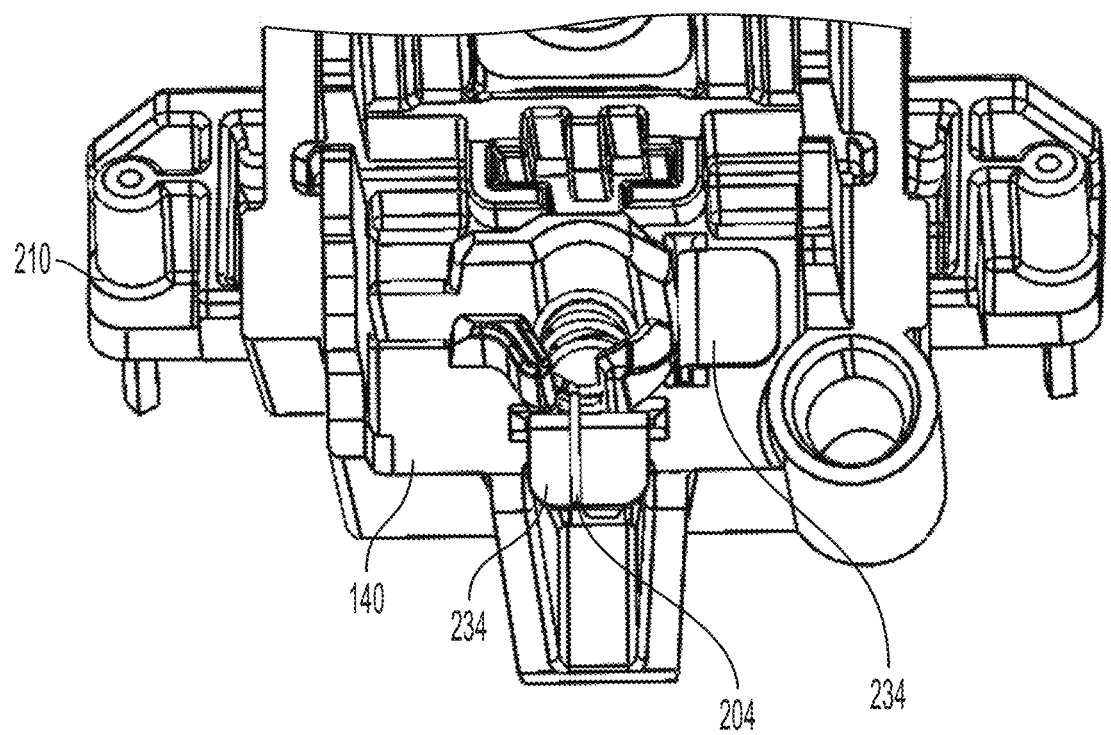
FIG. 17D is a top perspective partial view of a latch guide component with certain other elements of a protective electrical wiring device of an embodiment.

Turning to FIGS. 17A-B, top and bottom perspective views, respectively, of the latch guide 140 are shown in accordance with an embodiment. FIG. 17A shows opening "A" where the auxiliary contacts 234 and auxiliary spring 204 are positioned in an assembled configuration (see, e.g., FIG. 17C), opening "X" is where the solenoid bobbin assembly 210 etc. is positioned and cutout "C" is where front leg 210-1 is positioned in an assembled configuration (see, e.g., FIG. 17C). Opening A is also the location where leg 220-4 of latch block 220 is positioned in an assembled configuration. Opening "B" is the location where a distal portion of the reset structure 17-1 is positioned in an assembled configuration. FIG. 17C shows a top perspective view of the latch guide 140 with the solenoid bobbin assembly 210 etc. of FIG. 16E and auxiliary contacts 234 and the auxiliary spring 204 positioned therein. FIG. 17D is a close up perspective view of the front portion of the components shown in FIG. 17C according to an embodiment.

Figure 17E:
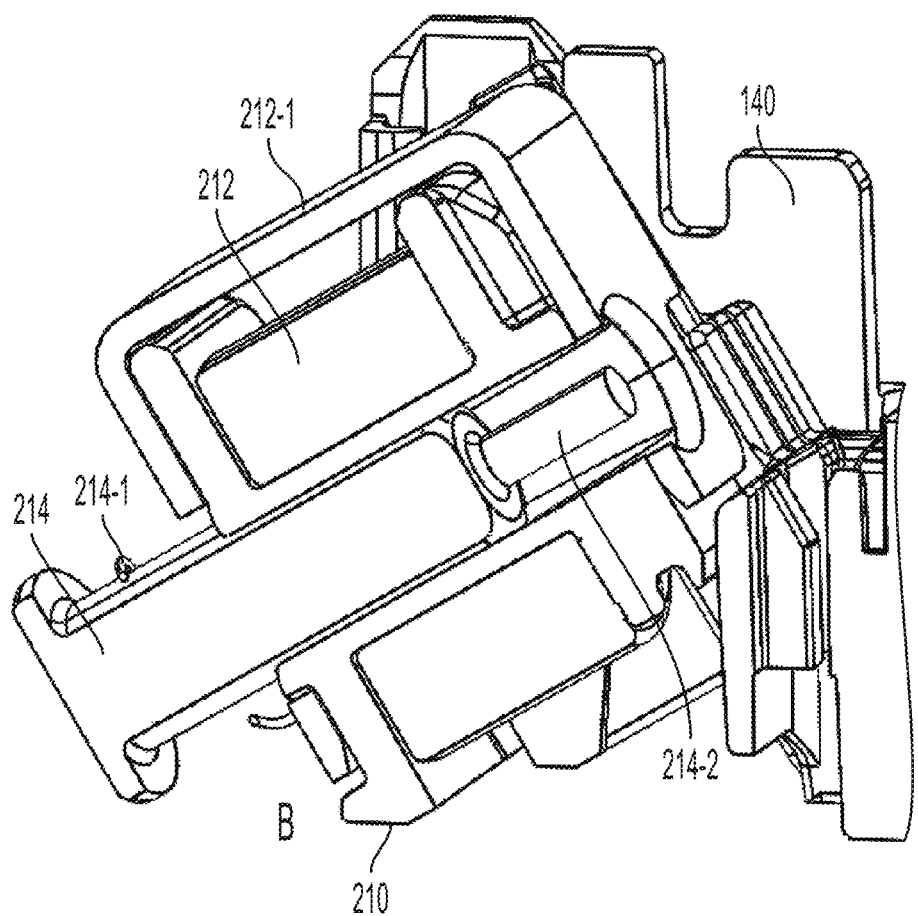
FIG. 17E is sectional view of a portion of the latch guide component with certain other elements of a protective electrical wiring device or an embodiment taken along A-A of FIG. 17C.

FIG. 17E is a sectional view of a portion of the assembled configuration shown in FIG. 17C taken along section A-A. As shown, the solenoid bobbin assembly 210 etc. are placed at an angle to the central longitudinal axis A-A (see also FIG. 4A). This angle is effectuated by the configuration of the front legs 210-1 (angle positioning and/or length) vs. the back plate portion 210-B of the solenoid bobbin assembly 210, and/or a lift provided by a portion of the latch guide to the front end or legs 210-1 of the solenoid bobbin assembly 210. The angle of the latch 230 that is created to the central longitudinal axis by this structural configuration is unique in that it reduces the frictional force of the movement of the latch 230 when the device is tripped (as discussed further in conjunction with FIG. 23). In accordance with an alternative embodiment, the solenoid bobbin assembly 210 etc. does not need to be placed at an angle and the armature 214 and latch 230 and related springs can be positioned in a plane that is parallel or substantially parallel to the central longitudinal axis A-A (as shown, for example, on pages 33, 35-38, and 40-42 of U.S. Provisional Pat. App. 62/725,560, and in FIGS. 4, 8 and 12 of U.S. Pat. No. 9,437,386).

Figure 18A:
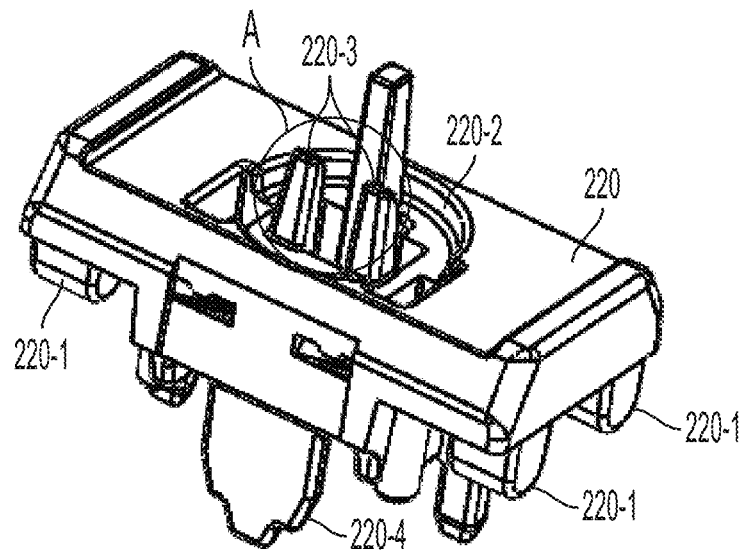
FIG. 18A is a top perspective view of a latch block component of an embodiment.
Figure 18B:
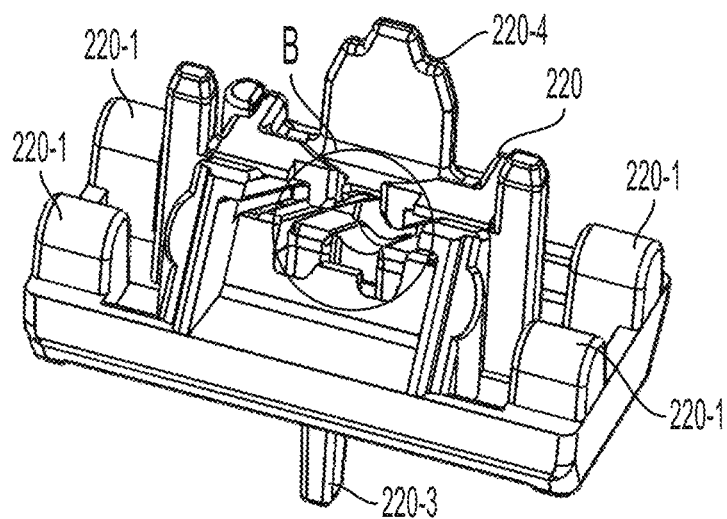
FIG. 18B is a bottom perspective view of a latch block component of an embodiment.

Turning to FIGS. 18A-B, top and bottom perspective views, respectively, of the latch block 220 are shown in accordance with an embodiment. FIG. 18A shows opening "A" through which the reset structure 17-1 is positioned (see, e.g., FIG. 18E), and recess 220-2 in which the bottom portion of the reset spring 17-2 sits in an assembled configuration (see, e.g., FIG. 4A). Also shown are legs 220-3, which assist with stabilizing and assisting with the aligned vertical movement (perpendicular to the central longitudinal axis A-A—see, e.g., FIG. 4A) of the reset structure 17-1. Latch block feet 220-1 are also shown, which are configured and positioned within the protective electrical wiring device 10 of an embodiment to move/push the line and load terminal contacts away from the fixed receptacle contacts (breaking the connection between the contacts) as further described herein below. FIG. 18B shows area "B" where the latch 230 and latch spring 230-1 are positioned in an assembled configuration (see. e.g., FIGS. 4A and 18D).

Figure 18C:
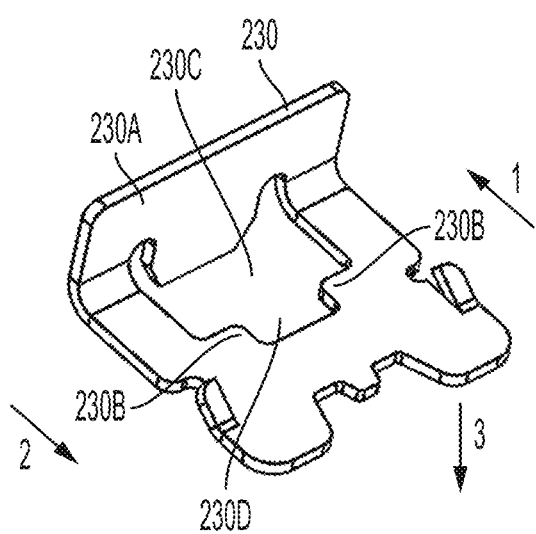
FIG. 18C is a top perspective view of a latch component of an embodiment.
Figure 18D:
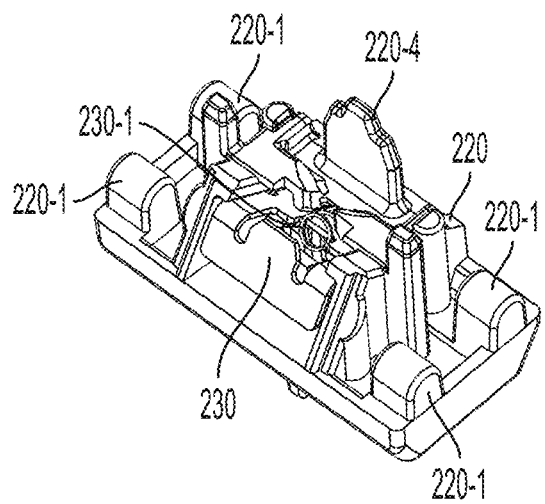
FIG. 18D is a bottom perspective view of a latch and spring assembly component positioned in a latch block of an embodiment.
Figure 18E:
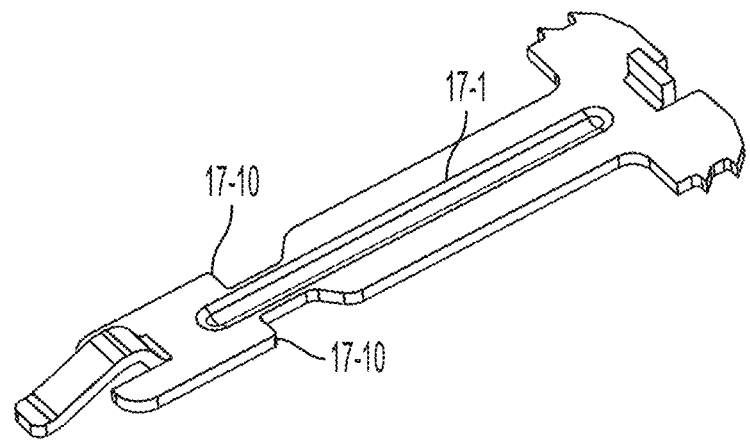
FIG. 18E is a perspective view of a reset structure component of an embodiment.
Figure 18F:
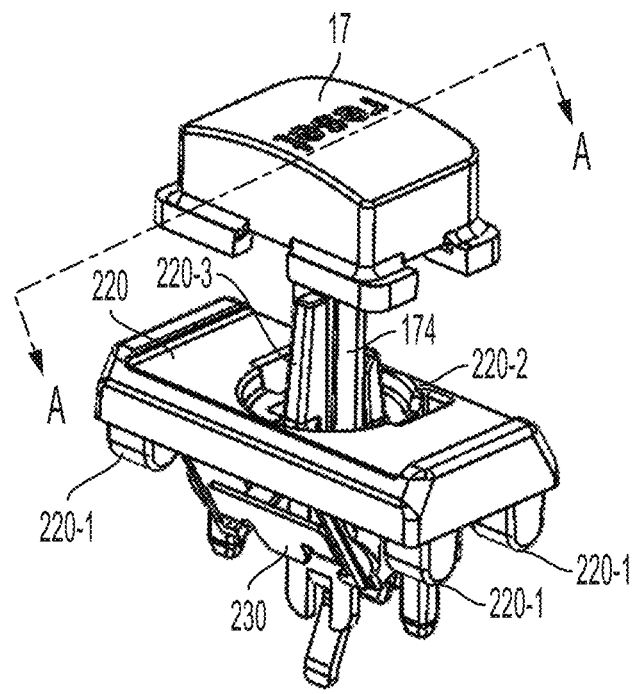
FIG. 18F is a top perspective view of a reset button and reset structure assembled with a latch block and a latch and spring assembly of FIG. 18D according to an embodiment.
Figure 18G:
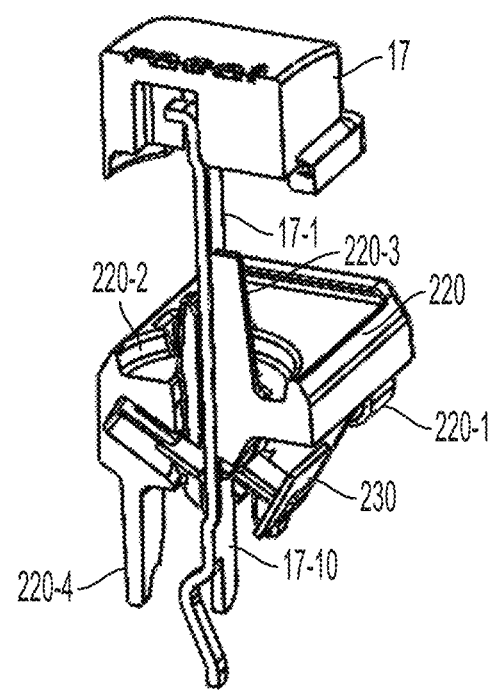
FIG. 18G is a perspective sectional view of the a reset button and reset structure assembled with a latch block and a latch and spring assembly taken along A-A of FIG. 18F according to an embodiment.

Referring to FIGS. 18C-D, perspective close up views of the latch 230 alone and of the latch 230 positioned in area B of the latch block 220 (see FIG. 18B) according to an embodiment are shown. The latch 230 is shown with a narrowed gap portion 230D with interface edges 230B and a larger main opening 230C. In a reset position/condition, the latch spring 230-1 biases the latch in the direction of arrow 1, and each shelf edge or shoulder 17-10 of the reset structure 17-1 (which can be an elongated flat stamped reset structure extending along a longitudinal axis from a proximal/first end (closest to the reset button 17 when in an assembled configuration) to a distal/second end, see, e.g., FIG. 18E; and can also be an elongated solid pin/cylindrical-shaped structure with a diameter) is positioned under and contacts (either directly or indirectly) each respective interference edge 230B. In a tripped state/position/condition, the armature 214 (shown in corresponding FIGS. discussed below) contacts the first wall 230A of the latch 230, overcomes the bias of the latch spring 230-1, moves the latch 230 in the direction of arrow 2, releases the resent pin 17-1 when the main opening moves over the shelf edges 17-10 of the resent pin 17-1 (the resent pin 17-1 no longer being locked in place by the latch/catch interface formed by the interference edges 230B and shelf edges 17-10), and the reset spring 17-2 (not shown) pushes the latch block/latch construct (shown in FIG. 18D) down in the approximate direction of arrow 3 to break the receptacle and line/load contacts. FIG. 18F shows a perspective top view of the reset button 17 and reset structure 17-1 assembled with the latch block 220 with latch spring 230-1 assembly of FIG. 18D according to an embodiment. FIG. 18G shows a perspective sectional view taken along A-A of FIG. 18F according to an embodiment.

Figure 19A:
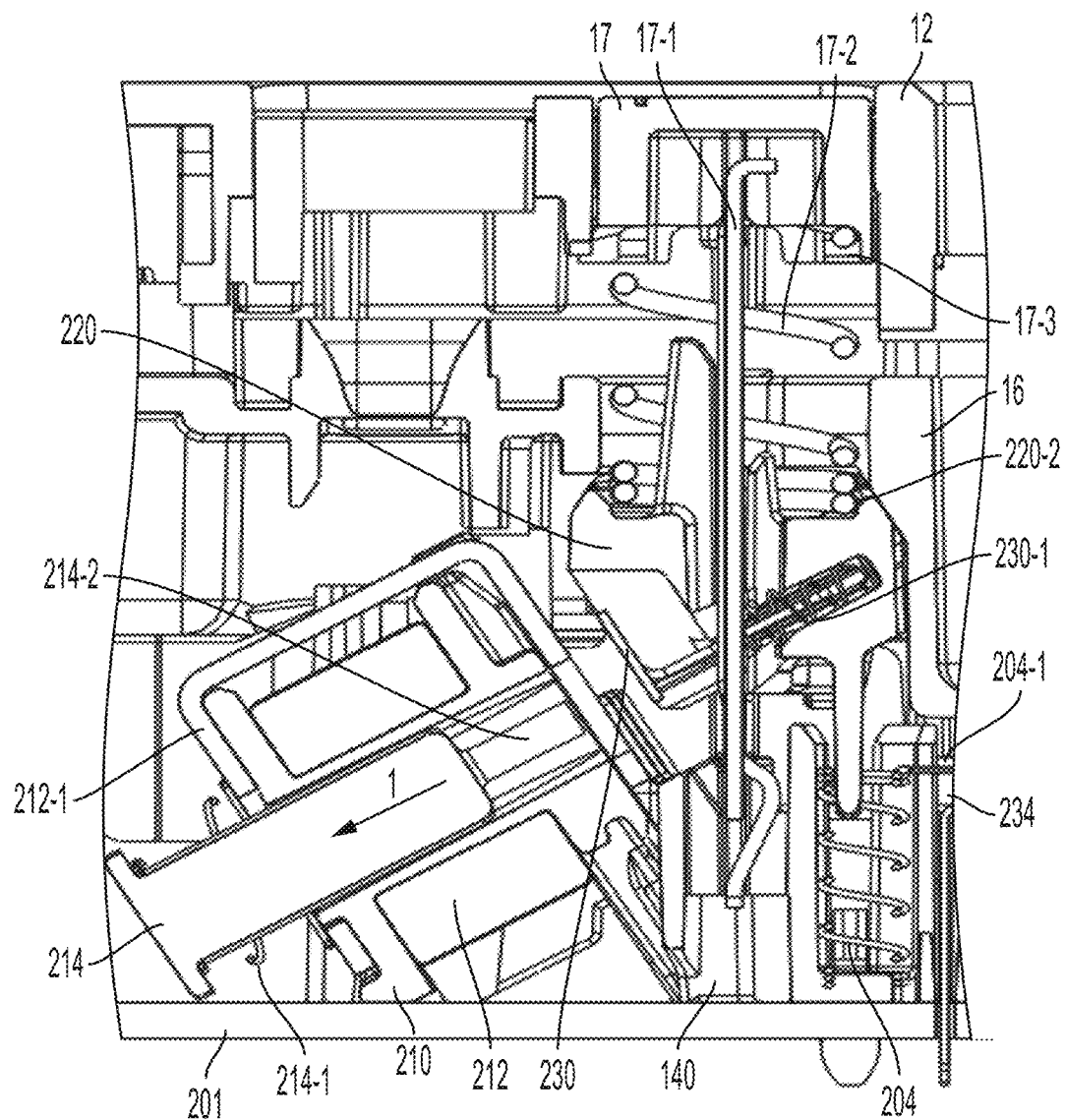
FIG. 19A is a partial sectional side view of assembled protective electrical wiring device taken along central axis "A-A" of FIG. 1A in the reset position/condition of an embodiment.
Figure 19B:
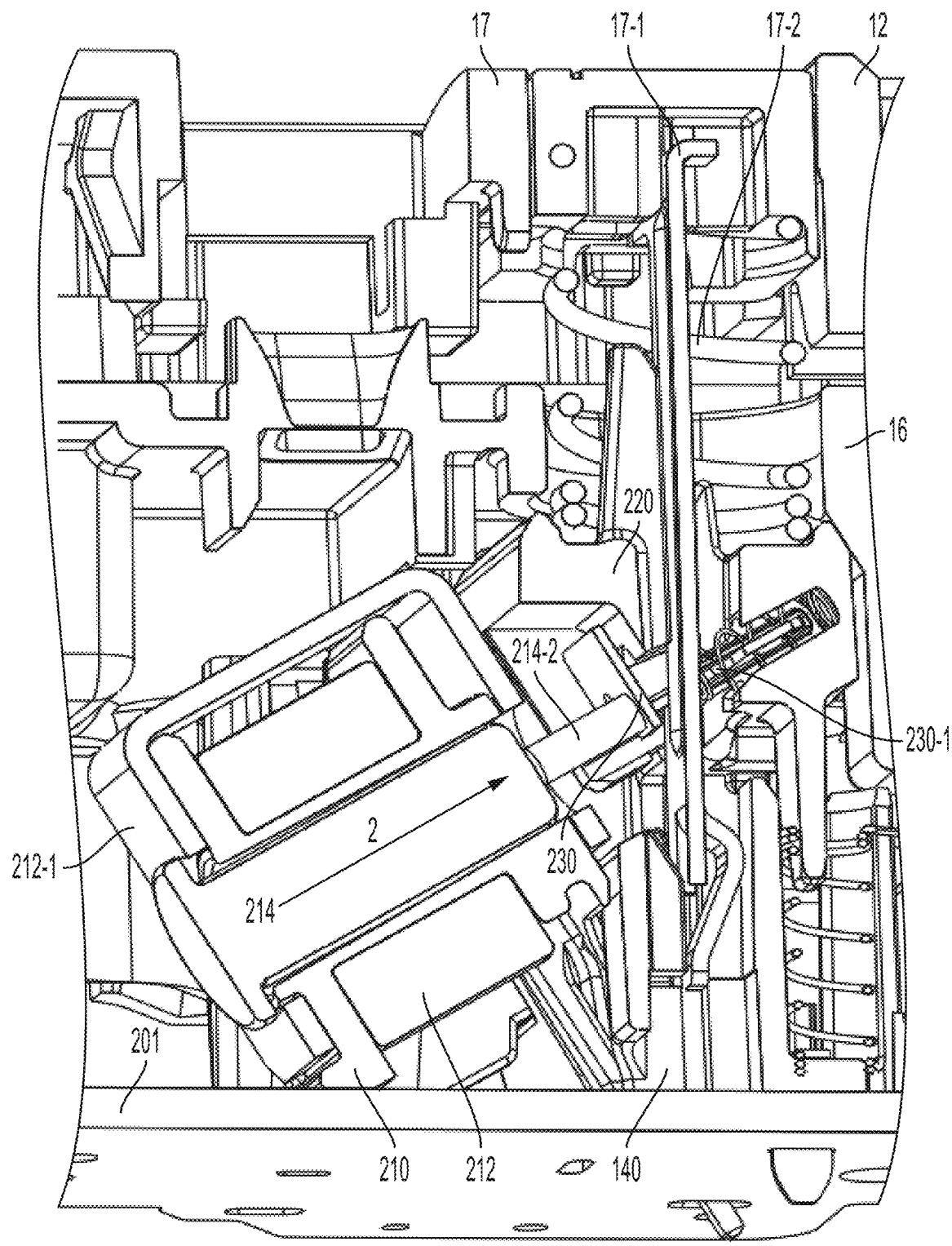
FIG. 19B is a partial sectional side view of assembled protective electrical wiring device taken along central axis "A-A" of FIG. 1A in the armature actuated position/condition of an embodiment.

Referring to FIGS. 19A-B, partial sectional side views of assembled protective electrical wiring device 10 taken along central axis "A-A" of FIG. 1A in the reset position/condition, and in the armature actuated position/condition, respectively, of an embodiment are shown. Turning to FIG. 19A, in the reset position/condition, the armature 214 is positioned at an angle from a central axis positioned through the device (as discussed above) and in a non-contacting position with respect to the latch 230. The latch spring 230-1 biases the latch 230 in the direction of arrow 1. This biasing force maintains the latch/catch interface configuration formed by the interference edges 230B and shelf edges 17-10, as discussed above with respect to FIGS. 18C and 18E and shown in FIG. 19C. Coil spring 214-1 biases armature 214 in the direction of arrow 1. Turning to FIG. 19B, a tripped condition has occurred, the armature 214 is illustrated as just having been fired/actuated, and is shown moving in the direction of arrow 2 at an angle to the central axis toward and at the start of contacting the first wall 230A of latch 230 by distal portion 214-2 of the armature 214.

Figure 19C:
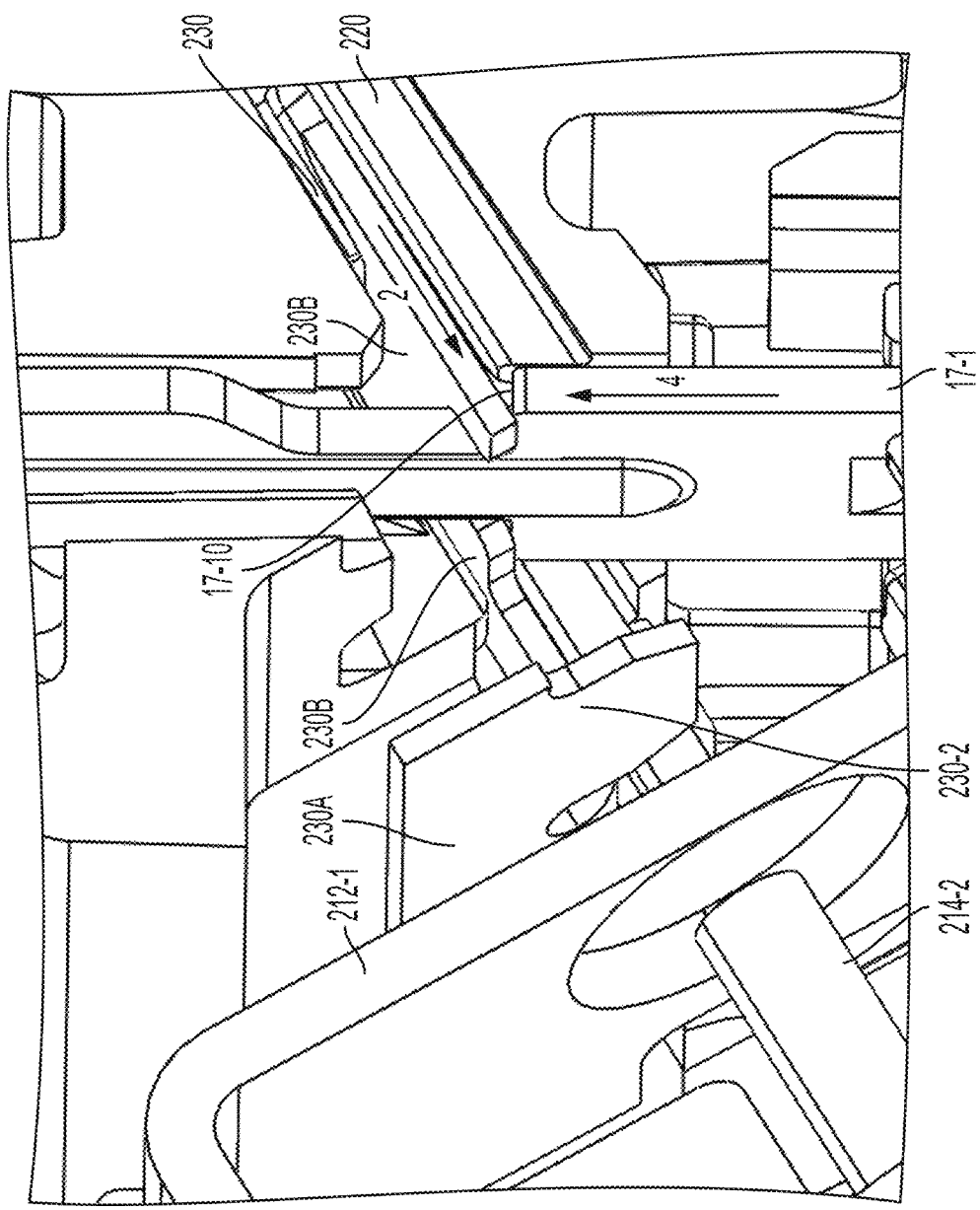
FIG. 19C is a latch/catch interface configuration of the protective electrical wiring device in the reset position/ condition according to an embodiment.

Turning to FIG. 19C, a close up view of the latch/catch interface configuration in the reset position/condition according to an embodiment is shown. As shown and described herein, this latch/catch interface is a unique structural configuration which yields a vibration tolerant structure/configuration. In brief, due to the reset break spring 17-2 (not shown) positioned on the reset structure/catch 17-1 and the latch spring 230-1 positioned on the latch 230 (not shown), the latch 230 is biased down and to the left in the direction of arrow 2, and the reset structure/catch 17-1 is biased up in the direction of arrow 4. These opposing forces assist with locking the construct in place—making the mechanism immune to certain movements of vibrations imparted on device 10. These movements and vibrations may in fact increase this locking function (as opposed, for example, to the latch 230 not being at an angle, but being straight and horizontal along a plane parallel or substantially parallel to the central axis "A-A" of FIG. 1A; in such a case, vibration may cause the latch 230 to move to the right and/or the reset structure/catch 17-1 move to the left, resulting in an undesired/unnecessary release of the reset structure/catch 17-1 from the latch 230 when an actual trip condition is not present).

Figure 20A:
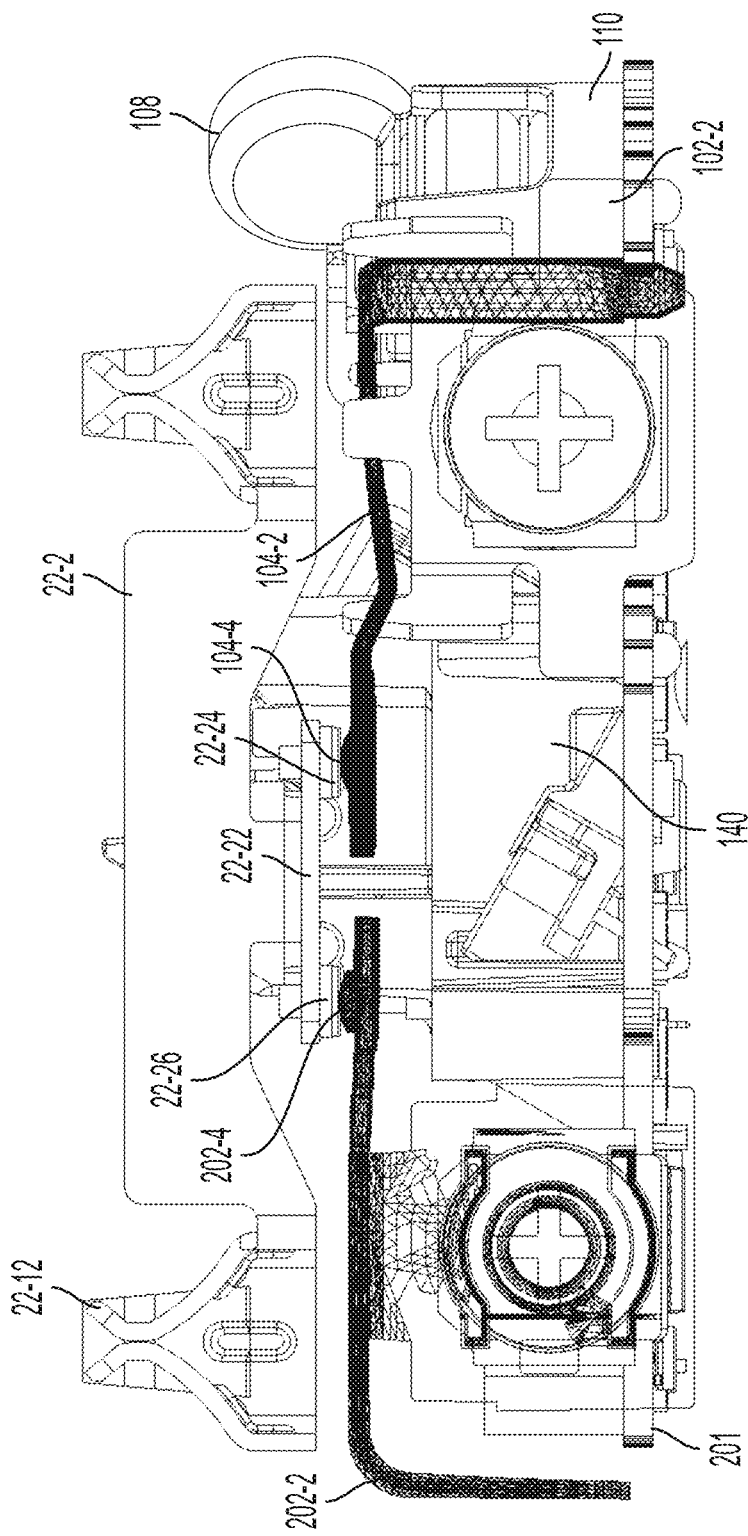
FIG. 20A is a neutral side open perspective view of the protective electrical wiring device in the reset position/ condition of an embodiment.
Figure 20B:
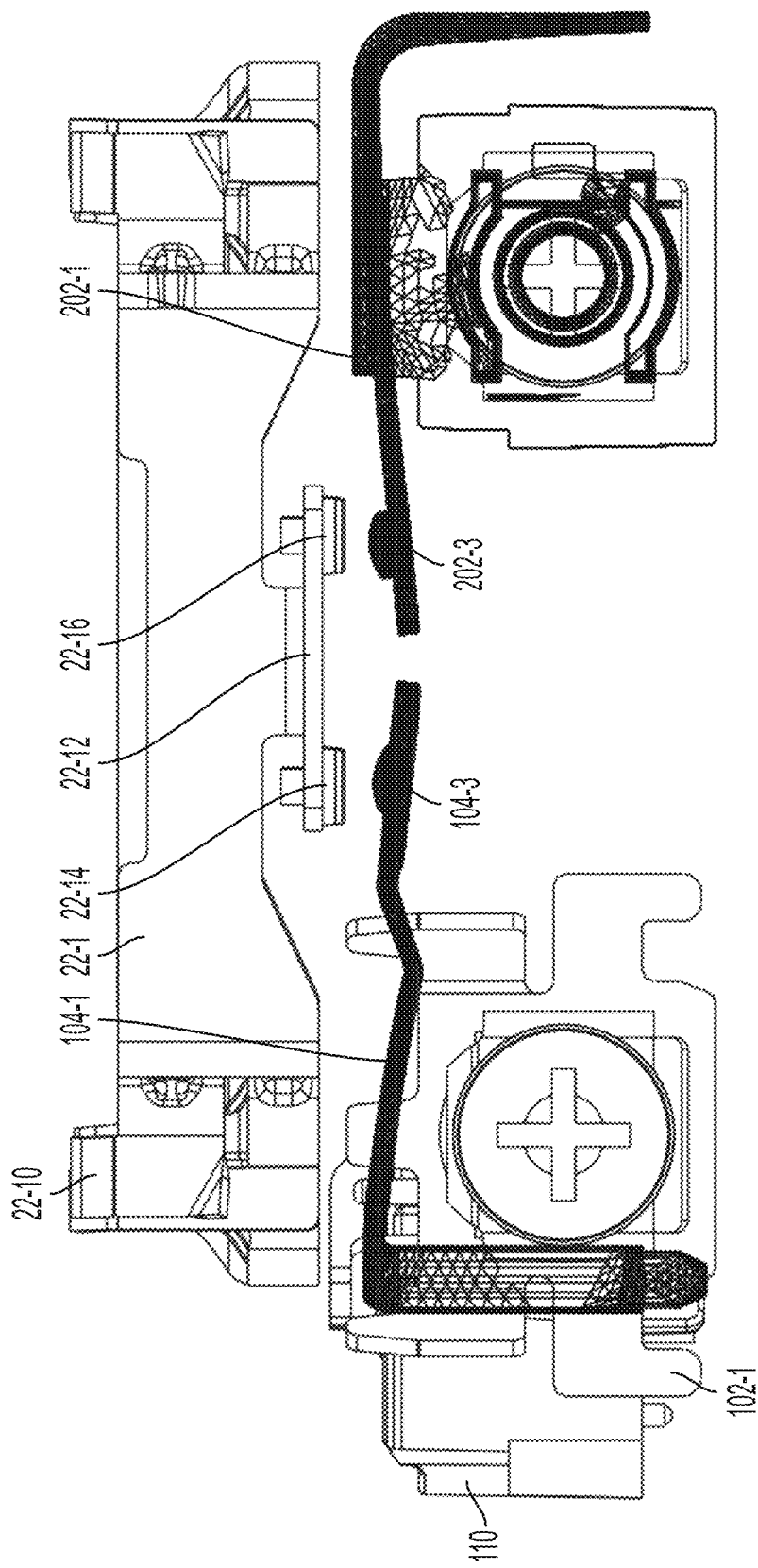
FIG. 20B is a hot side open perspective view of the protective electrical wiring device in the reset position/ condition of an embodiment.

Referring to FIG. 20A, a neutral side open (without the front cover 12, a back body member 14, separator 16 and some other elements) perspective view of the protective electrical wiring device in the reset position/condition according to an embodiment is shown. The latch block 220 is shown in a non-contacting position with respect to the line and load contact structures/terminals (i.e., positioned above and away from the line neutral contact arm 104-2 and arm of the load terminal neutral 202-2 in this view). The cantilevered structure of each line and load contact structures/terminals are biased "up" toward and contacting (to provide an electrical connection between the line/load contact structures/terminals and the receptacle contact structures/terminals) each receptacle contact structure/terminal (line/neutral-side contact 104-4 of the line neutral contact arm 104-2 contacting neutral fixed contact 22-24, and load/neutral-side contact 202-4 of the load terminal neutral 202-2 contacting neutral fixed contact 22-26 in this view). Similarly, FIG. 20B shows a hot side open (without the front cover 12, a back body member 14, separator 16 and some other elements) perspective view of the protective electrical wiring device in the reset position/condition according to an embodiment. In this view, the cantilevered structure of each line and load contact structures/terminals are biased "up" (with, e.g., 200 grams of force) toward and contacting (to provide an electrical connection between the line/load contact structures/terminals and the receptacle contact structures/terminals) each receptacle contact structure/terminal (line/hot-side contact 104-3 of the line hot contact arm 104-1 contacting hot fixed contact 22-14, and load/hot-side contact 202-3 of the load terminal neutral 202-1 contacting neutral fixed contact 22-16 in this view).

Figure 20C:
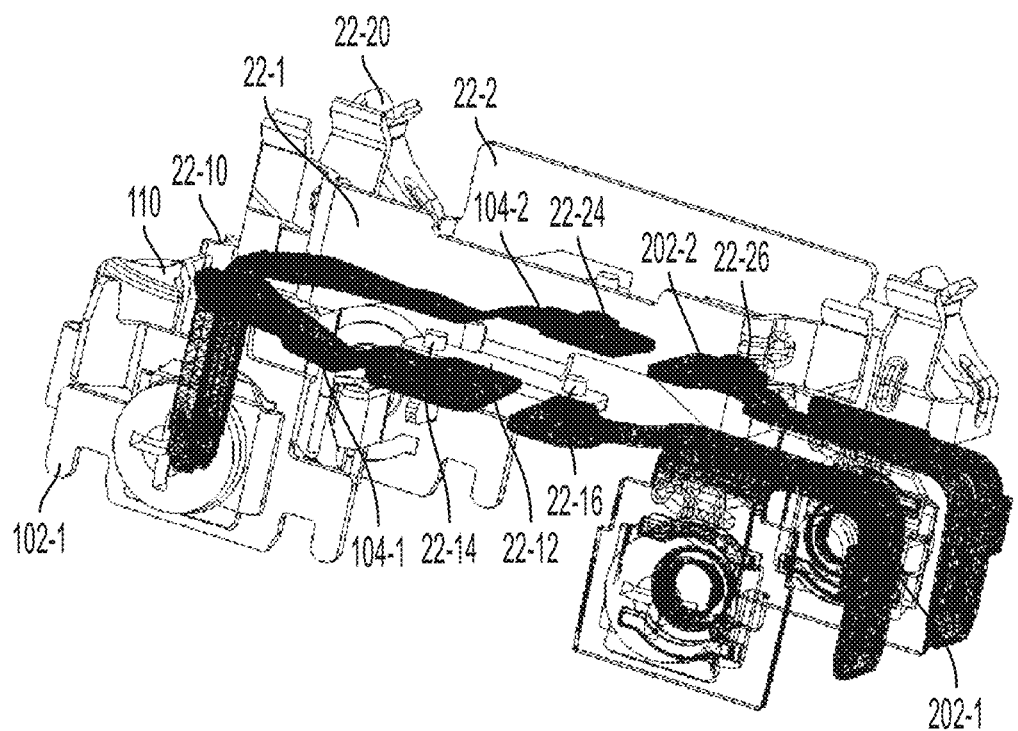
FIG. 20C is a perspective view of the partially assembled open configuration of the protective electrical wiring device in the reset position/condition shown in FIGS. 20A-B of an embodiment.
Figure 20D:
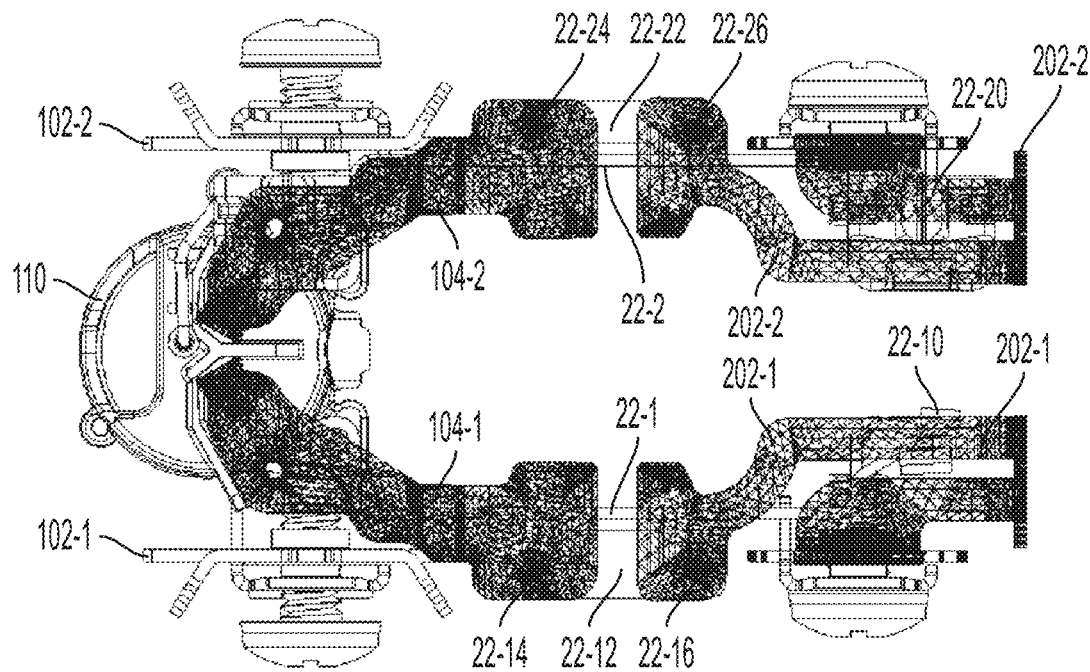
FIG. 20D is a top perspective view of the partially assembled open configuration of the protective electrical wiring device in the reset position/condition shown in FIGS. 20A-B of an embodiment.

FIGS. 20C-D are perspective and top perspective views, respectively, of the partially assembled open configurations of protective electrical wiring device 10 in the reset position/condition shown in FIGS. 20A-B in accordance with an embodiment. Most highlighted elements shown in FIGS. 20C-D have been previously discussed and illustrated. Each of the circled portions "A" through "D" ("push tabs") of the line and load contact structures/terminals shown in FIG. 20D is the area that is contacted by a foot 220-1 of latch block 220 in a tripped condition to push the line and load contact structures/terminals away from the receptacle contact structures/terminals and break the respective connections, which exist in the reset state (as discussed above).

Figure 21A:
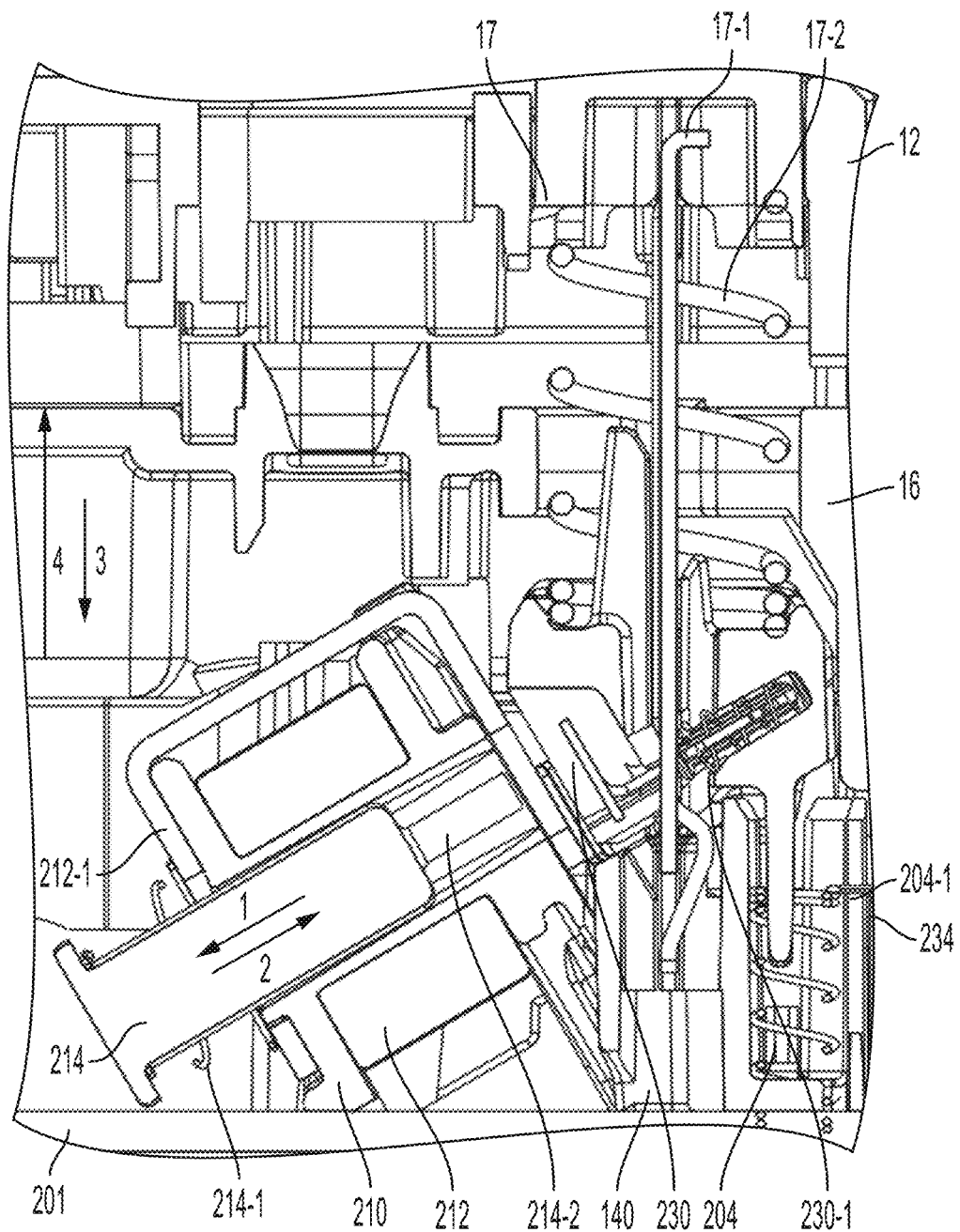
FIG. 21A is a partial sectional side view of an assembled protective electrical wiring device taken along central axis "A-A" of FIG. 1A in the tripped position/condition according to an embodiment.
Figure 21B:
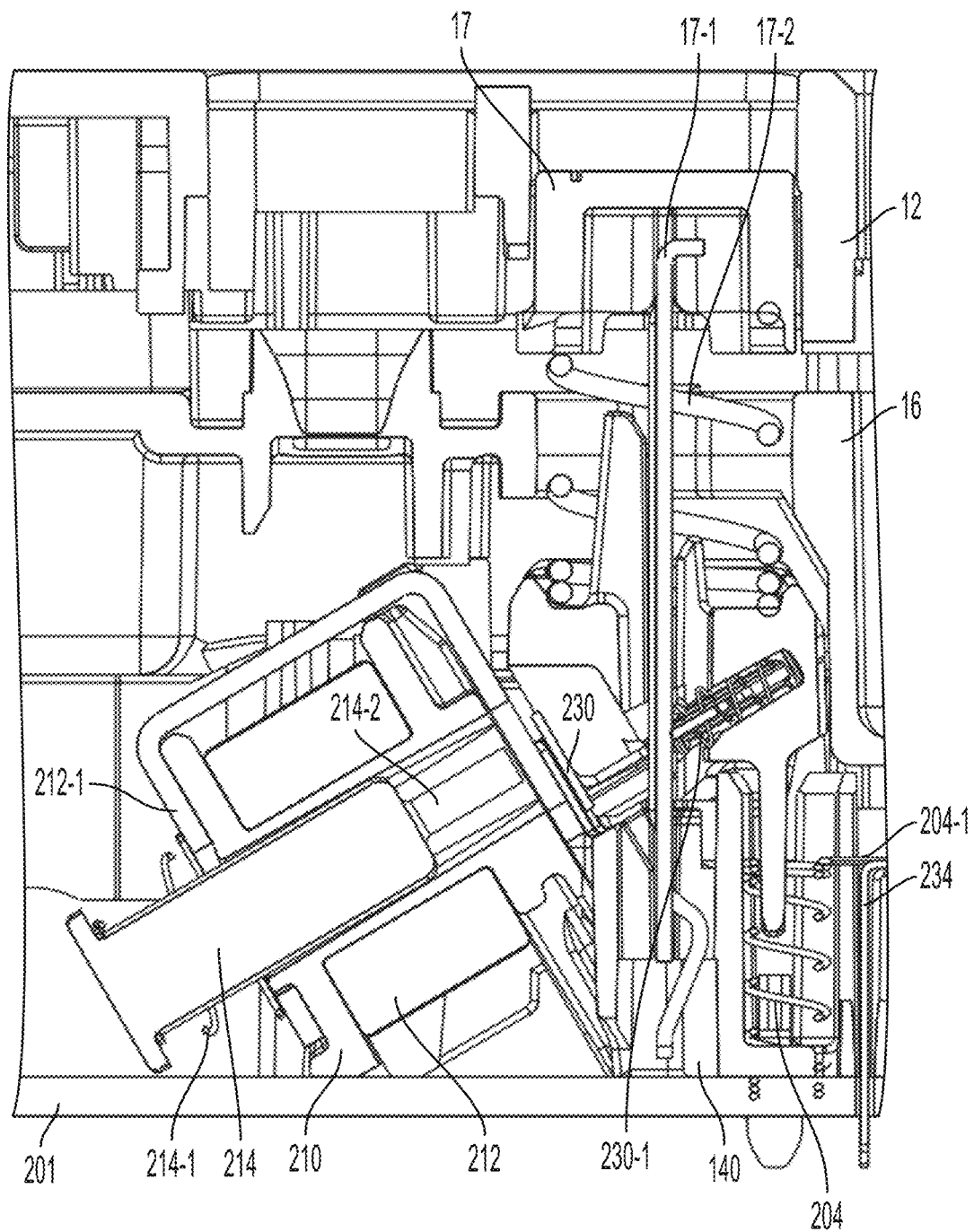
FIG. 21B is a partial sectional side view of an assembled protective electrical wiring device taken along central axis "A-A" of FIG. 1A in the tripped position/condition according to an embodiment.

Referring to FIGS. 21A-B, partial sectional side views of assembled protective electrical wiring device 10 taken along central axis "A-A" of FIG. 1A in the tripped position/condition, and in the reset button actuated position/condition according to an embodiment are shown. Turning to FIG. 21A, in the tripped position/condition, the latch/catch interface configuration has been broken by the armature's 214 actuation and movement in the direction of arrow 2 (as should be understood by a person of ordinary skill in the art in conjunction with a review of this disclosure), overcoming the bias of the latch spring 230-1 and coil spring 214-1 in the direction of arrow 1. The reset structure/catch 17-1, no longer being held in place by the latch/catch interface configuration (as described herein and shown, e.g., in FIG. 19C), imparts a force against the front cover 12 with the reset button 17 in the direction of arrow 4 (per its connection to the reset button) by the biasing force imparted on the reset button by one side of the reset spring 17-2 (which is positioned around a portion of the reset structure/catch 17-1). The other side of the reset spring 17-2 imparts a force on the latch block 220 in the direction of arrow 3 to move the latch block in the direction of arrow 3. This force imparted on the latch block 220 by the reset spring 17-2 overcomes the biasing force by the cantilevered line and load contact structures/terminals in the opposite direction—the direction of arrow 4, and the latch block is configured, structured and positioned to break the electrical connection between the line/load contact structures/terminals and the receptacle contact structures/terminals by pushing the line/load contact structures/terminals down in the direction of arrow 3 away from the receptacle contact structures/terminals. Turning to FIG. 21B, the reset button 17 has been pushed in the direction of arrow 3 by a user in order to return the device to the reset position/configuration. As the reset button 17 is pushed, reset structure 17-1 penetrates opening 230C with the help of a curved tongue portion on one end of reset structure 17-1, which slides through slot 230D, causing latch 230 to move in the direction of arrow 2, placing the wider body area of flat catch section against and to slide on latch sections 230B and eventually under all while compressing reset spring 17-2 (in a stored energy position) and ready for user to release reset button.

Figure 22A:
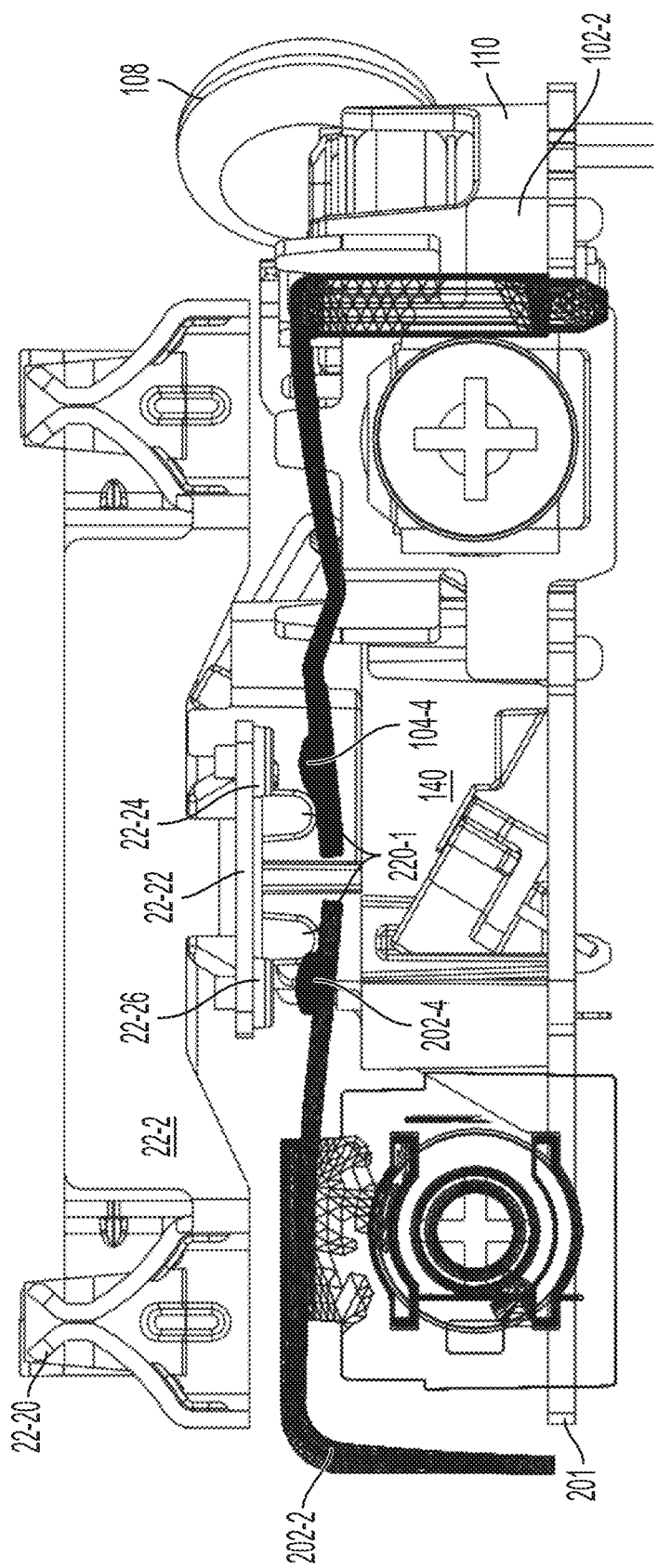
FIG. 22A is a neutral side open perspective view of the protective electrical wiring device in the tripped position/ condition according to an embodiment.

Referring to FIG. 22A, a neutral side open (without the front cover 12, a back body member 14, separator 16 and some other elements) perspective view of the protective electrical wiring device in the tripped position/condition according to an embodiment is shown. The latch block 220 is shown in a contacting and actuated position with respect to the line and load contact structures/terminals (i.e., positioned on the line neutral contact arm 104-2 and arm of the load terminal neutral 202-2 in this view, and "down" from the reset position/condition shown in FIG. 20A—non-contacting position), overcoming the biasing force of the cantilevered line and load contact structures/terminals and breaking the electrical connection between the line/load contact structures/terminals and the receptacle contact structures/terminals (the contacting relation between line/neutral-side contact 104-4 of the line neutral contact arm 104-2 and fixed contact 22-24, and between load/neutral-side contact 202-4 of the load neutral contact arm 202-2 and fixed contact 22-26 has been broken in this view by latch block 220).

Figure 22B:
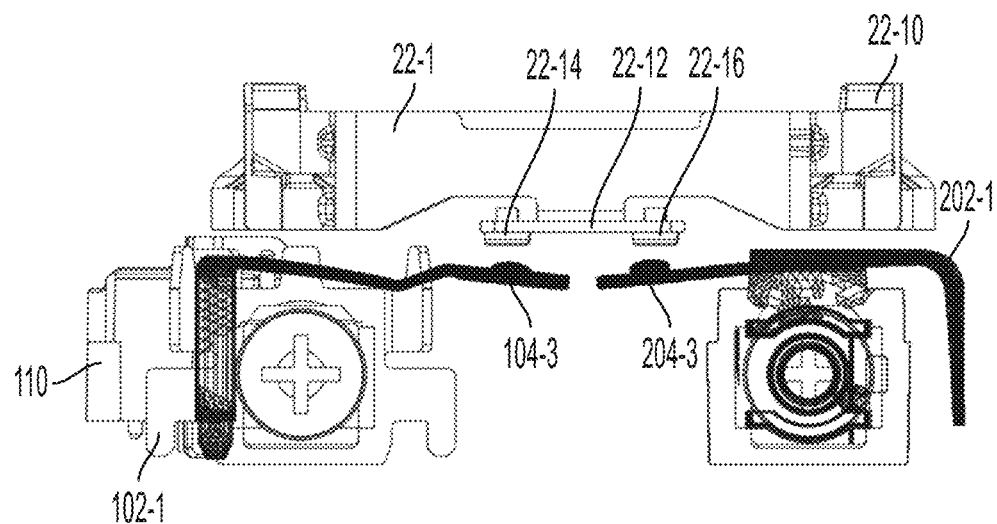
FIG. 22B is a hot side open perspective view of the protective electrical wiring device in the tripped position/ condition according to an embodiment.

FIG. 22B shows a hot side open (without the front cover 12, a back body member 14, separator 16 and some other elements) perspective view of the protective electrical wiring device in the tripped position/condition according to an embodiment. In this view, the cantilevered structure of each line and load contact structures/terminals are positioned "down" from the reset position/condition shown in FIG. 20B, overcoming the biasing force of the cantilevered line and load contact structures/terminals and breaking the electrical connection between the line/load contact structures/terminals and the receptacle contact structures/terminals (the contacting relation between line/hot-side contact 104-3 of the line hot contact arm 104-1 and hot fixed contact 22-14, and between load/hot-side contact 202-3 of the load terminal neutral 202-1 and neutral fixed contact 22-16 has been broken in this view by latch block 220, not shown).

Figure 22C:
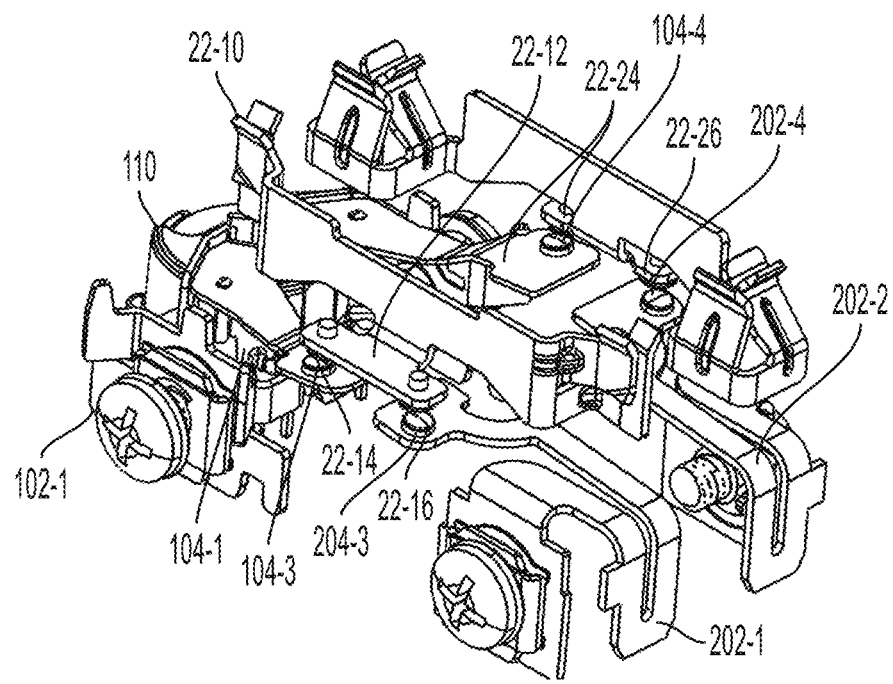
FIG. 22C is an open perspective view of the protective electrical wiring device in the tripped position/condition according to an embodiment.

Referring to FIGS. 22-C, an open (without the front cover 12, a back body member 14, separator 16 and some other elements) perspective view of the protective electrical wiring device 10 in the tripped position/condition is shown according to an embodiment.

Figure 23A:
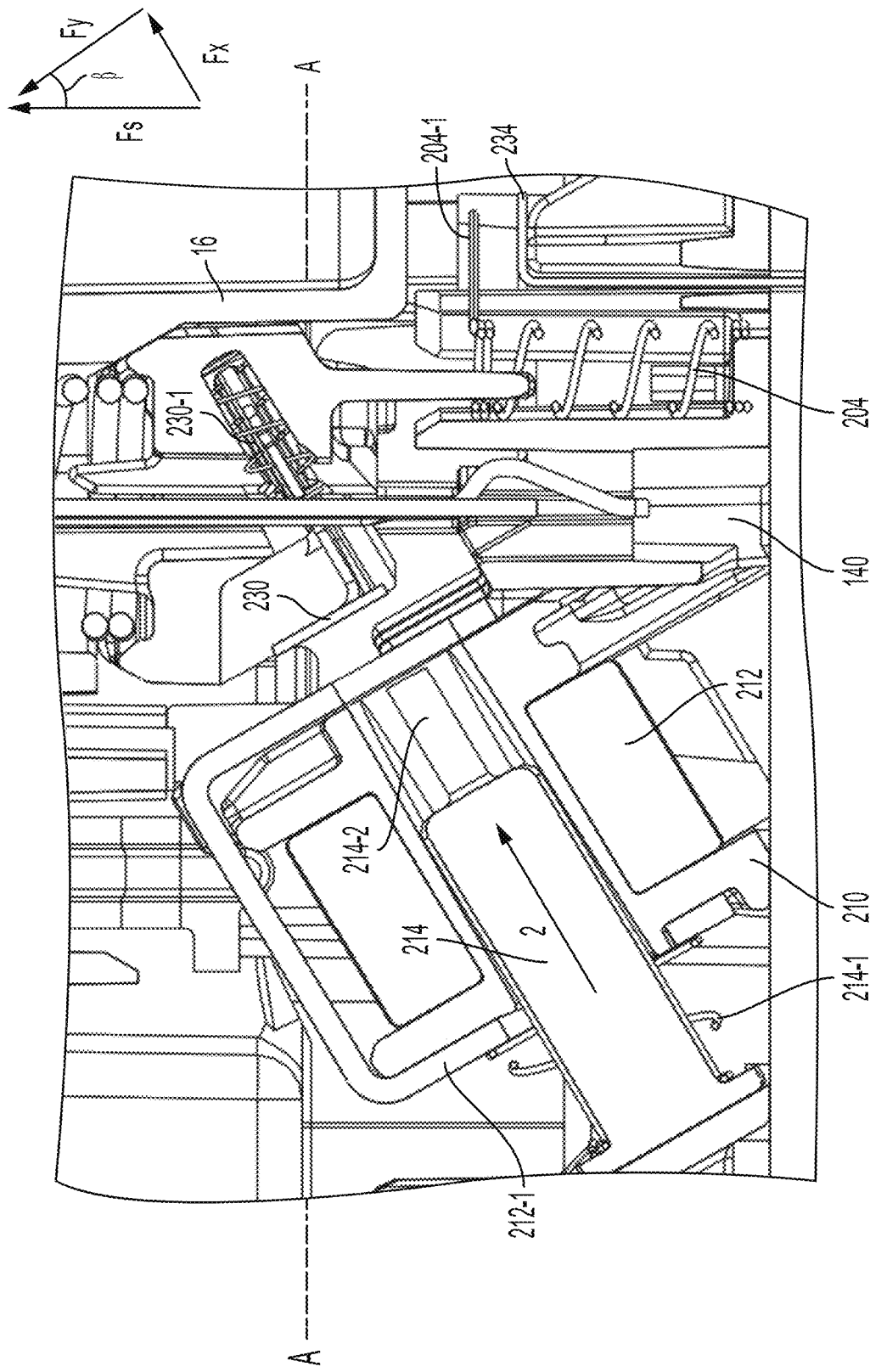
FIG. 23A is a partial sectional side view of assembled protective electrical wiring device taken along central axis "A-A" of FIG. 1A in the reset position/condition according to an embodiment.
Figure 23B:
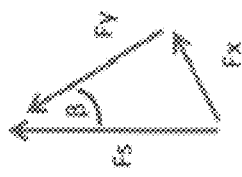
FIG. 23B provides a graphical illustration and a description of details why/how the angle in which the armature is positioned in the device reduces the frictional force of the latch travel in the direction of a particular arrow shown in FIG. 2A, according to an embodiment.

Referring to FIG. 23A, a partial sectional side view of assembled protective electrical wiring device 10 taken along central axis "A-A" of FIG. 1A in the reset position/condition is shown in accordance with an embodiment. FIG. 23B provides a graphical illustration and details why/how the angle in which the armature 214 is positioned in the device 10 reduces the frictional force of the latch 230 travel in the direction of arrow 2 shown in FIG. 23A. This reduction in frictional force is beneficial for a number of reasons including, but not limited to, reducing the size, and thus cost, of certain components (e.g., smaller armature, solenoid assembly, frame, bobbin, windings etc.).

Figure 24A:
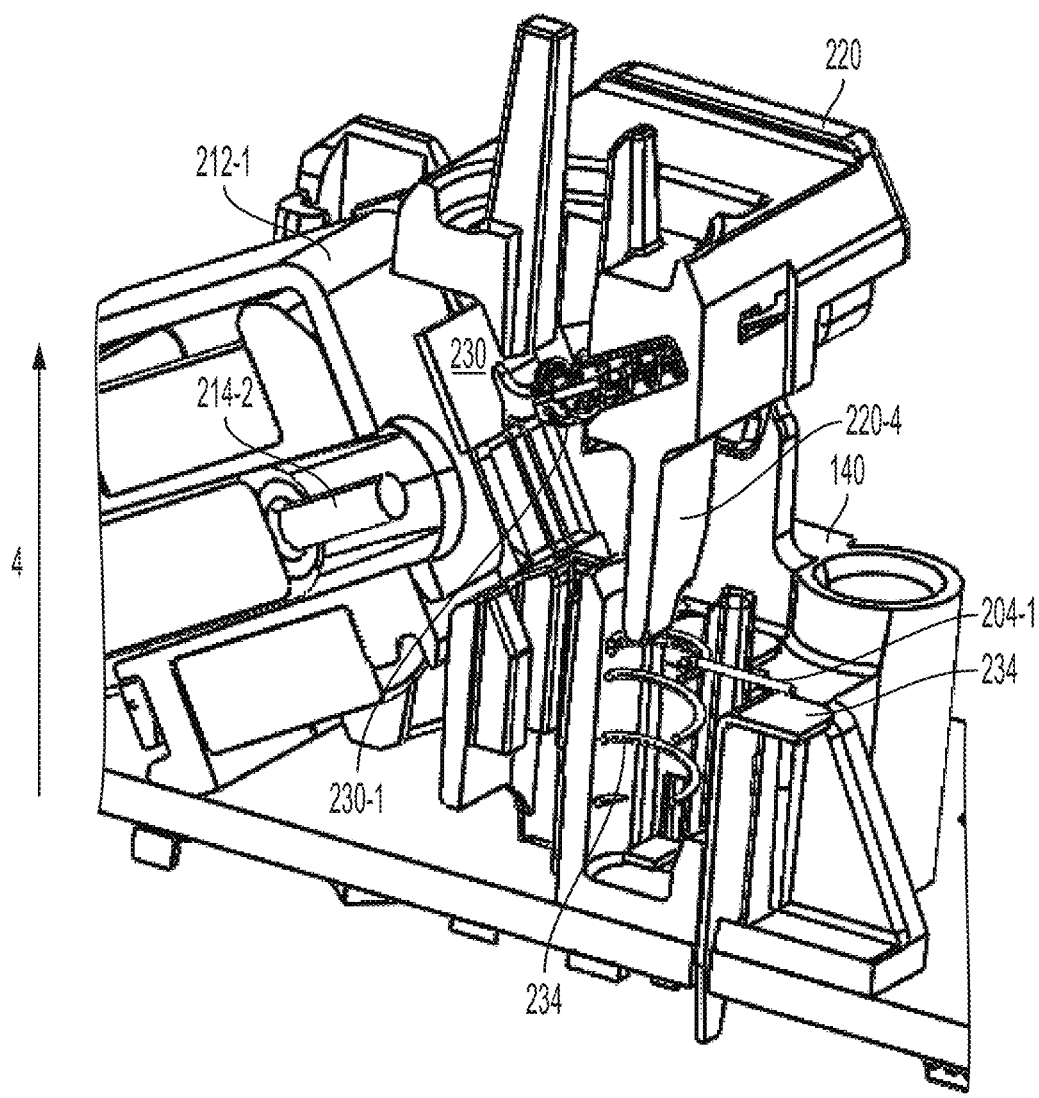
FIG. 24A is a partial sectional side view of an assembled protective electrical wiring device according to an embodiment.
Figure 24B:
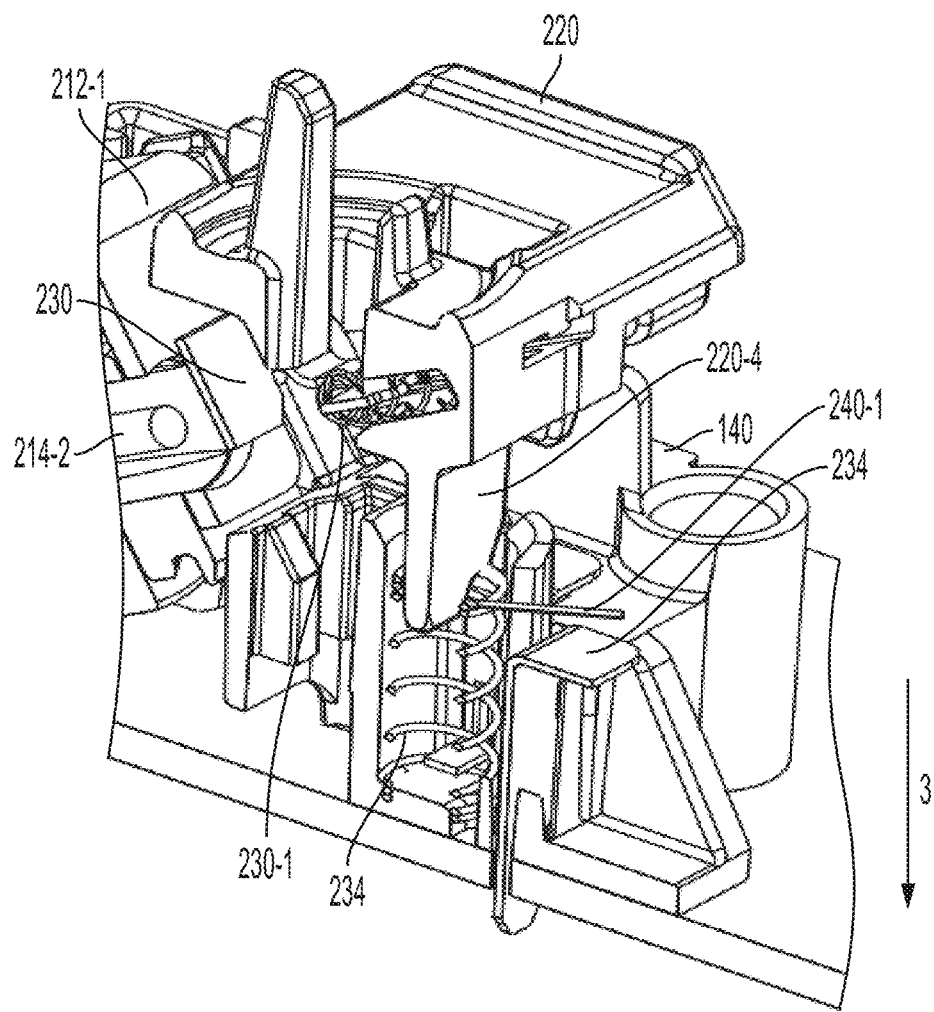
FIG. 24B is a partial sectional side view of an assembled protective electrical wiring device according to an embodiment.

Referring to FIGS. 24A-B, partial sectional side views of assembled protective electrical wiring device 10 are shown in accordance with an embodiment. These views are sectional and open to show unique configuration and relationship between the latch block 220 and the auxiliary (AUX) circuit, which includes the auxiliary contacts 234, auxiliary spring 204. FIG. 24A shows the device 10 in a reset configuration/position. The auxiliary spring (or return spring) 204 is shown exerting a force and pushing the latch block 220 "up" in the direction of arrow 4, and the AUX circuit is open in the reset position (the auxiliary/return spring 204 provides an upward force on the latch block 220, keeping the latch block 220 away from a contacting relation with the line and load contact arms assuring no force being exerted on the line and load contact arms in the reset position). In the tripped position, shown in FIG. 24B, the AUX circuit is closed (arm portion 204-1 contacts an auxiliary contact 234 due to the force exerted by leg 220-4 of latch block 220 in the direction of arrow 3), and a light on the device (not shown) can illuminate to indicate this situation (via micro amps of current). When the circuit is made in the reset position/condition, the indicator light (not shown) is off. When the circuit is made in the tripped position, as shown in FIG. 24B, a sensor on the PCB 201 and/or MCU (not shown—see electrical schematic) senses the connection and instructs an indicator light to turn on or blink or other indication of the tipped condition. The MCU can also sense the reset position/condition when the circuit is broken (as shown in FIG. 24A), and can instruct the indicator light to turn off. Stated differently, the MCU is provided with certain information (e.g., spring is in a contacting or non-contacting relation with the auxiliary contact/blade), and can make decisions and provide instructions based on this information (e.g., turn on/off indicator light).

The latch block 220 is biased up and reset button 17 up by the aux spring 204 in the direction of arrow 4.

Figure 25A:
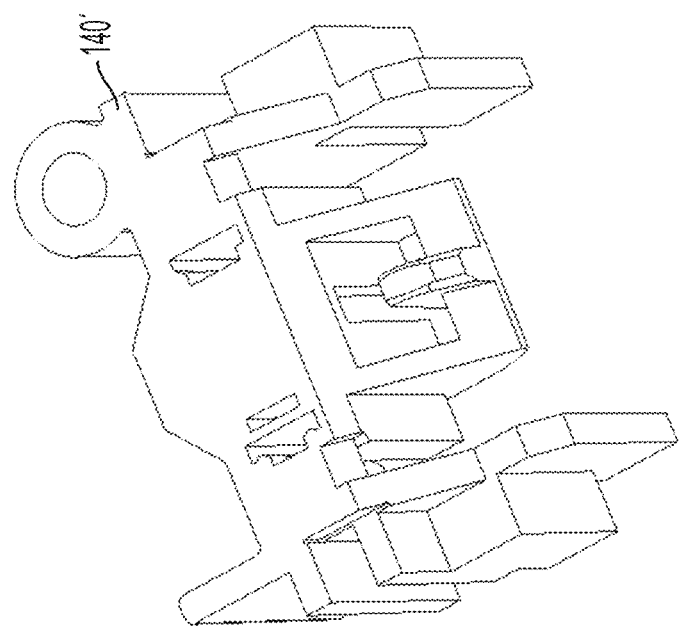
FIG. 25A is a top perspective view of an alternative embodiment of the latch guide component.
Figure 25B:
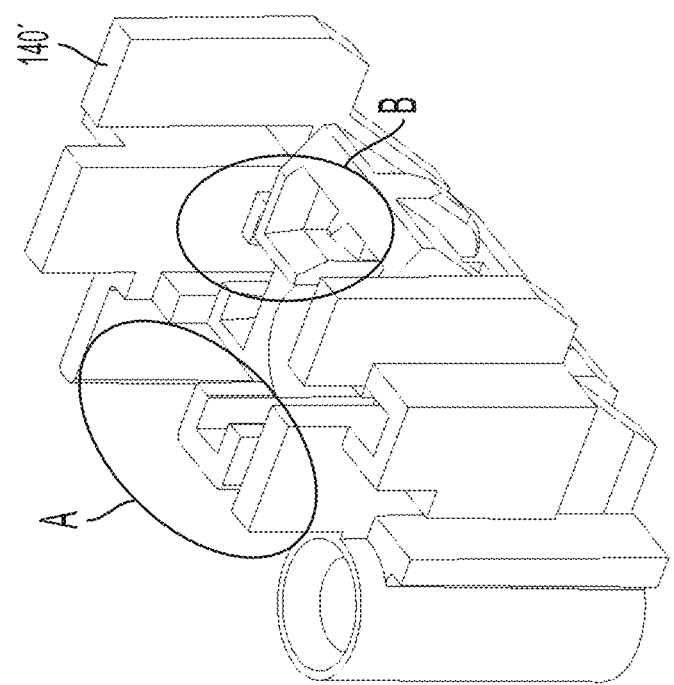
FIG. 25B is a bottom perspective view of an alternative embodiment of the latch guide component.
Figure 25C:
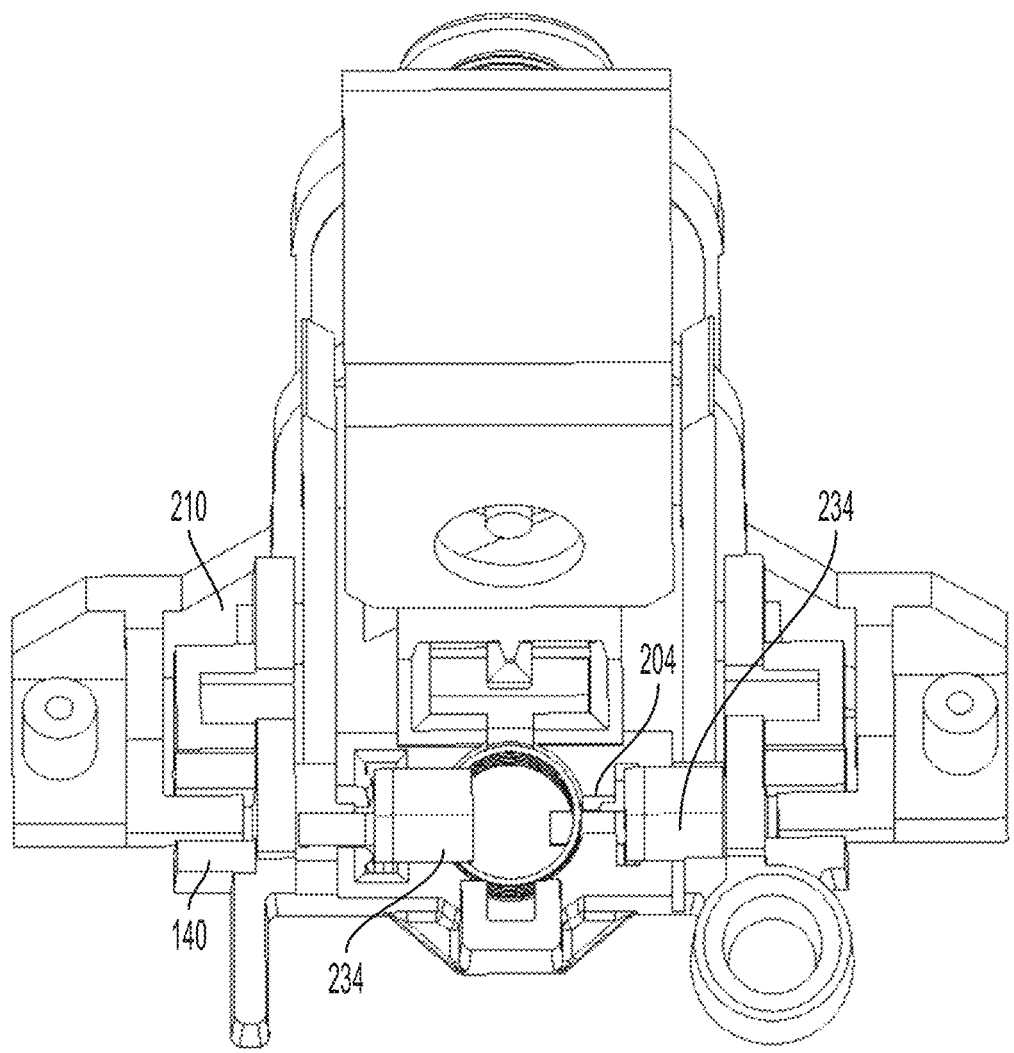
FIG. 25C is a bottom perspective view of an alternative embodiment of the latch guide component with other components positioned therein.

Referring to FIGS. 25A-B, top and bottom perspective views of an alternative embodiment of the latch guide 140' are shown. The structure of latch guide 140' is a bit different from the previously described and illustrated latch guide 140 including being shorter in length. However, similar to latch guide 140, latch guide 140' includes an opening or section "A" where the auxiliary contacts 234 and auxiliary spring 204 are positioned in an assembled configuration (see, e.g., FIG. 25C), and opening or section "B" through which a distal portion of the reset structure 17-1 is positioned in an assembled configuration. FIG. 25C is a close up perspective view of the front portion of the solenoid bobbin assembly 210 with the latch guide 140 positioned therein. Auxiliary contacts 234 and auxiliary spring 204 are shown positioned in opening or section "A" of the latch guide 140 (see FIG. 25A).

Figure 26A:
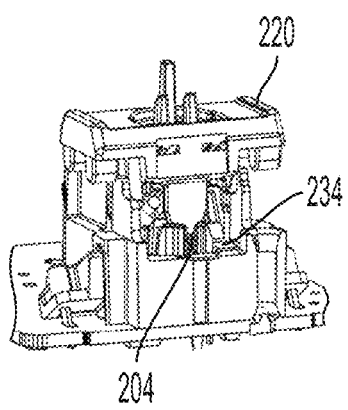
FIG. 26A is a partial sectional side view of an assembled protective electrical wiring device of an alternative embodiment.
Figure 26B:
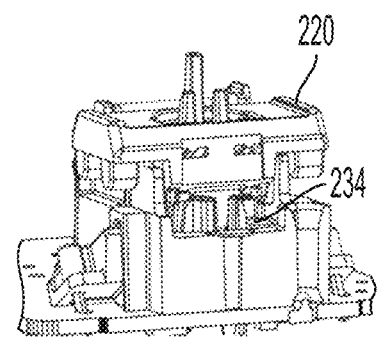
FIG. 26B is a partial sectional side view of an assembled protective electrical wiring device of an alternative embodiment.

Turning to FIGS. 26A-B, partial sectional side views of assembled protective electrical wiring device 10 are shown in accordance with an alternative embodiment are shown. These views are sectional and open to show unique configuration and relationship between the latch block 220 and the auxiliary (AUX) circuit, which includes the conductive auxiliary contacts 234, auxiliary spring 204. The configuration shown in this alternative embodiment is the opposite configuration as shown in FIGS. 24A-B (meaning that in the reset position/configuration—the circuit is closed, and in the tripped position/configuration—the circuit is open). In particular, FIG. 26A shows the device 10 in a reset configuration/position, and FIG. 26B shows device 10 in a tripped configuration/position. As shown in FIG. 26A, the auxiliary spring 204 biases the latch block 220 "up" in direction of arrow 4 (as shown in FIG. 24A), and contacts the bottom of one auxiliary contact/blade 234 and the top of the other auxiliary contact/blade 234 completing/making the circuit between the two contacts/blades in the reset position. In FIG. 26B, the auxiliary spring 204 is pushed down by the latch block 220 (per the biasing by the reset spring 17-2, as discussed above) and breaks the connection opening the circuit. When the circuit is made in the reset position/condition, the indicator light (not shown) is off. When the circuit is broken, as shown in FIG. 26B, a sensor on MCU board senses the disconnection and instructs the indicator light to turn on. The MCU can also sense the reset position/condition when the circuit is made, and can instruct the indicator light to turn off. Stated differently, the MCU is provided with certain information (e.g., spring is in a contacting or non-contacting relation with the auxiliary contact/blade), and can make decisions and provide instructions based on this information (e.g., turn on/off indicator light).

Figure 27A:
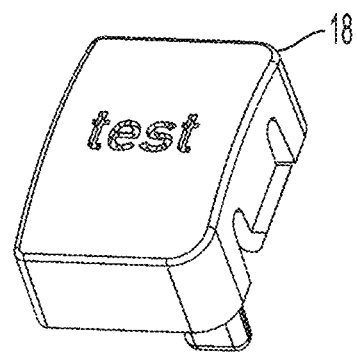
FIG. 27A is a top perspective view of a test button component of an embodiment.
Figure 27B:
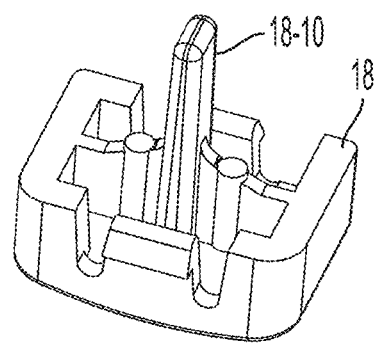
FIG. 27B is a bottom perspective view of a test button component of an embodiment.
Figure 27C:
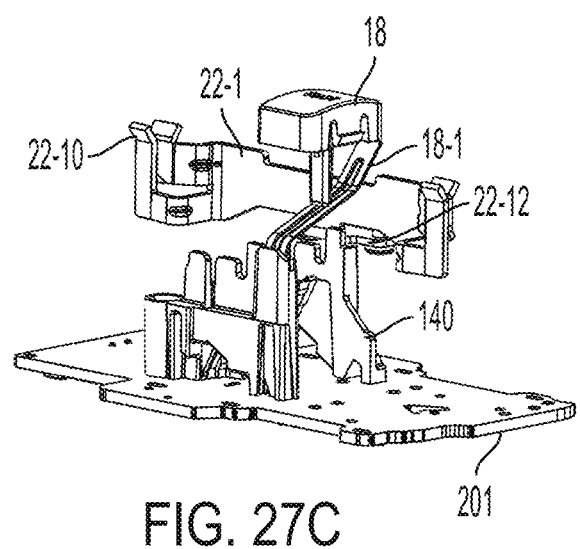
FIG. 27C is a perspective view of a test button component with certain other elements of a protective electrical wiring device according to an embodiment.
Figure 27D:
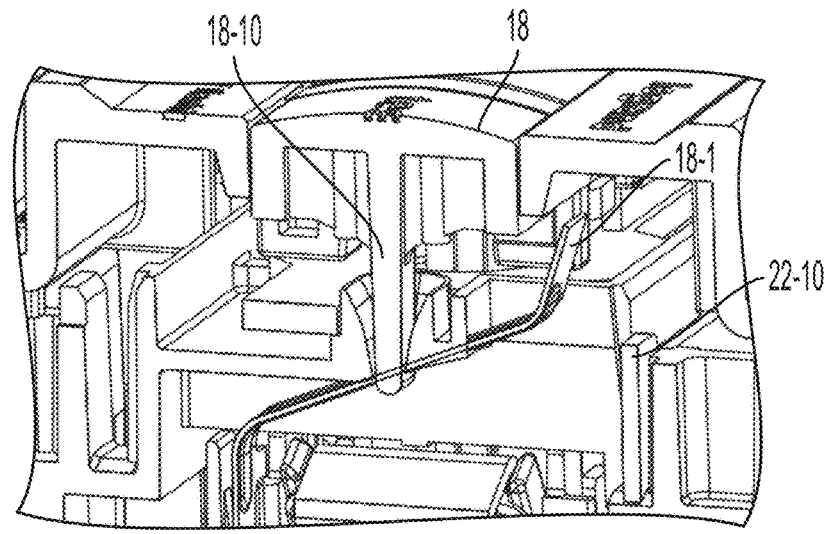
FIG. 27D is a sectional view of a portion of a protective electrical wiring device showing a test button and test blade in an unactuated configuration/position according to an embodiment.
Figure 27E:
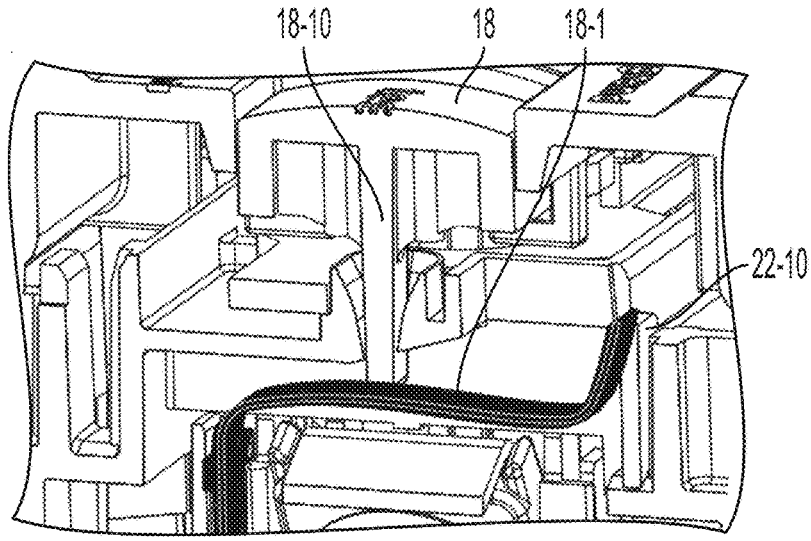
FIG. 27E is a sectional view of a portion of a protective electrical wiring device showing a test button component and a test blade component in an actuated configuration/position according to an embodiment.
Figure 27F:
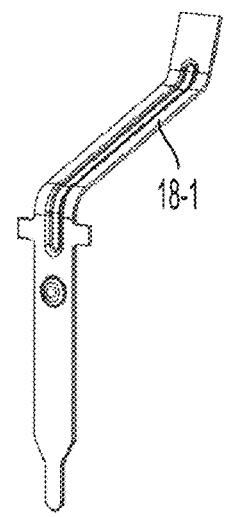
FIG. 27F is a perspective view of a test blade component of an embodiment.
Figure 28A:
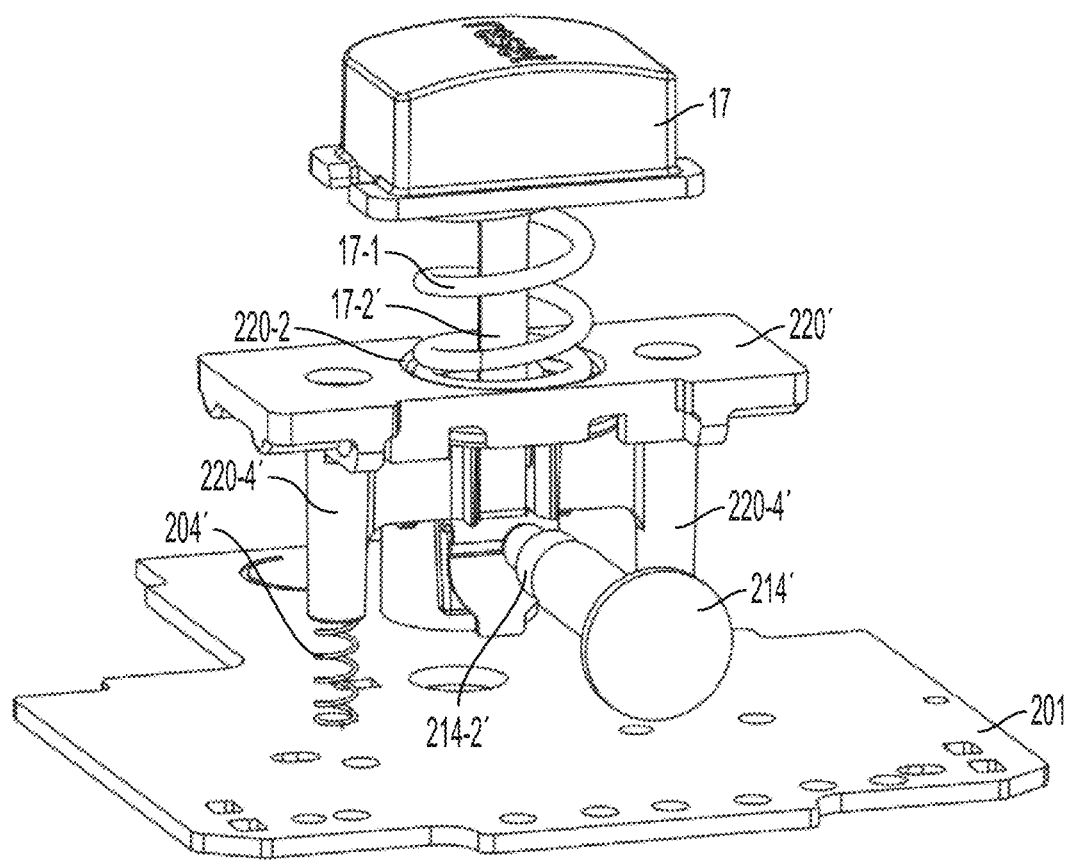
FIG. 28A is a perspective open view of various components of a protective electrical wiring device according to an alternative embodiment.
Figure 28B:
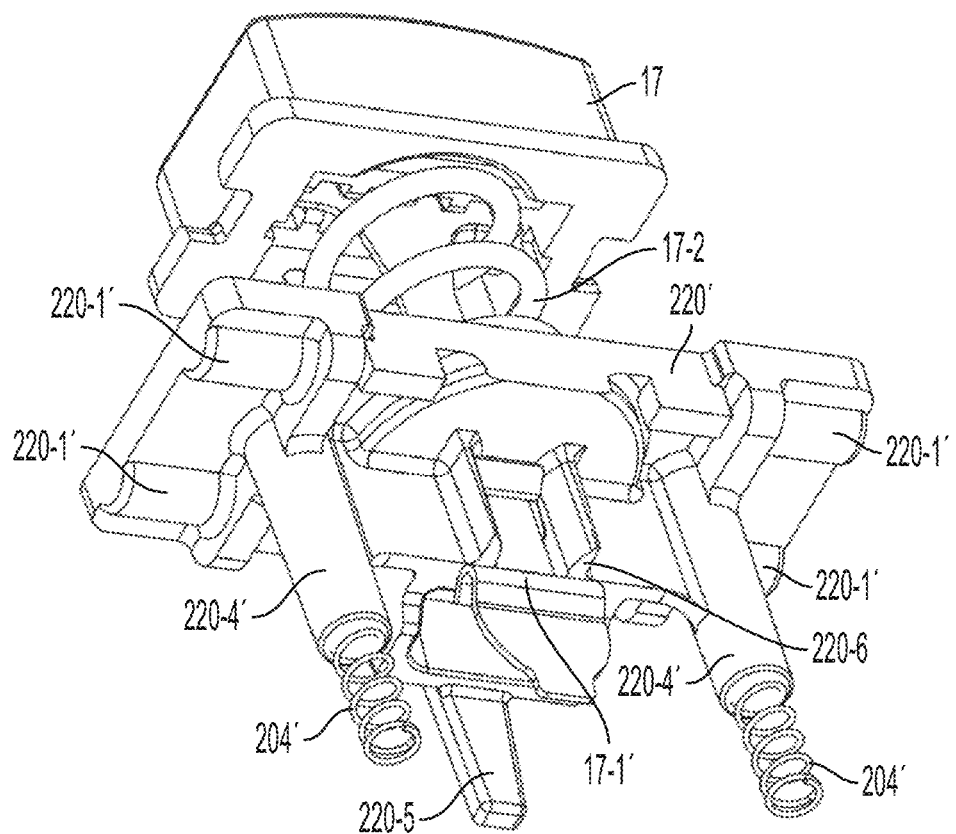
FIG. 28B is a perspective open view of various components of a protective electrical wiring device according to an alternative embodiment.
Figure 28C:
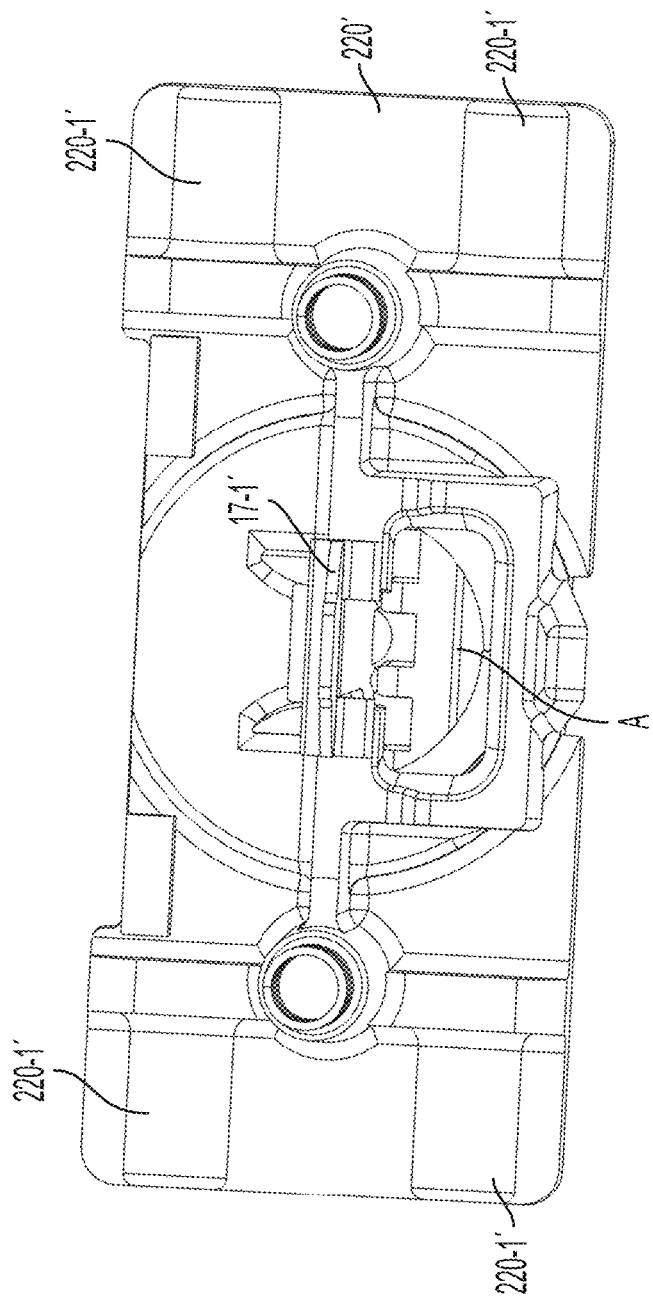
FIG. 28C is a bottom perspective open view of various components of a protective electrical wiring device according to an alternative embodiment.
Figure 28D:
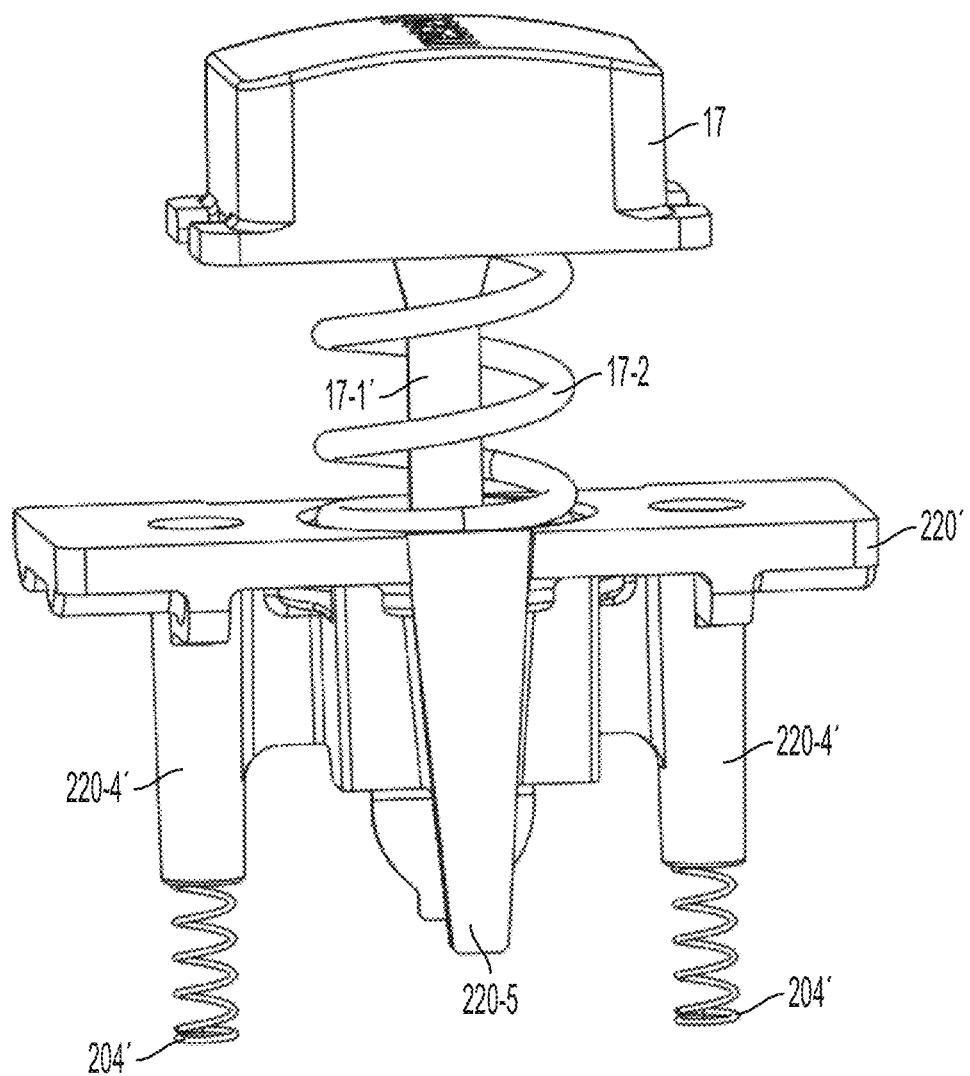
FIG. 28D is a perspective open view of various components of a protective electrical wiring device according to an alternative embodiment.
Figure 28E:
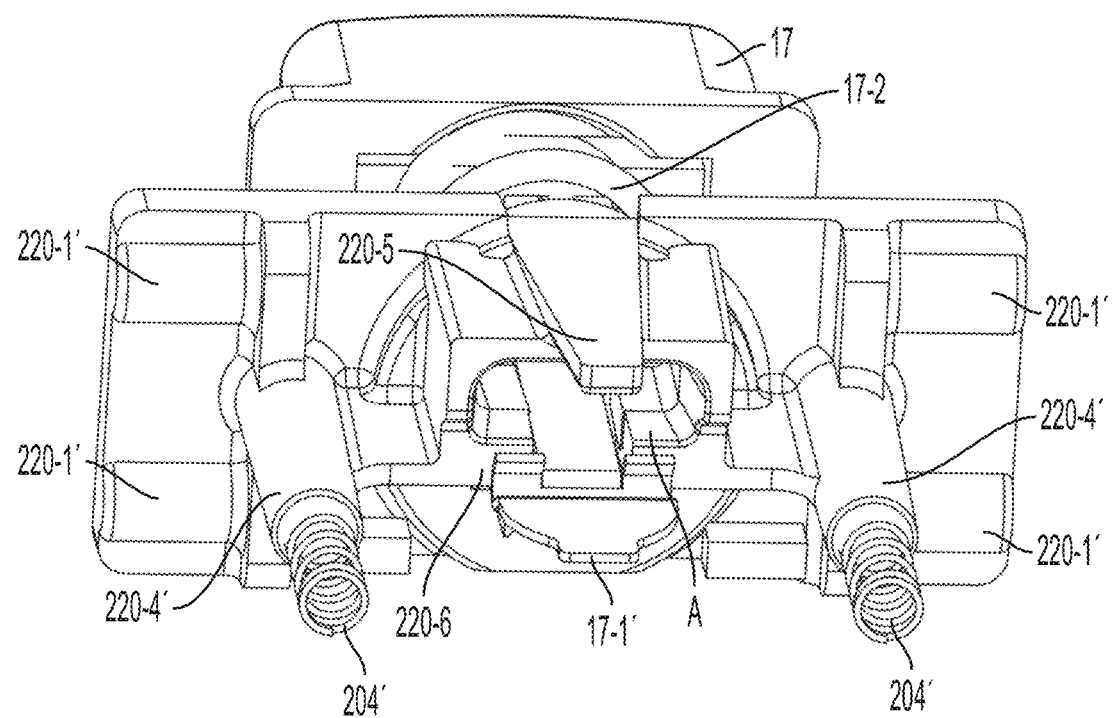
FIG. 28E is a perspective open view of various components of a protective electrical wiring device according to an alternative embodiment.
Figure 29A:
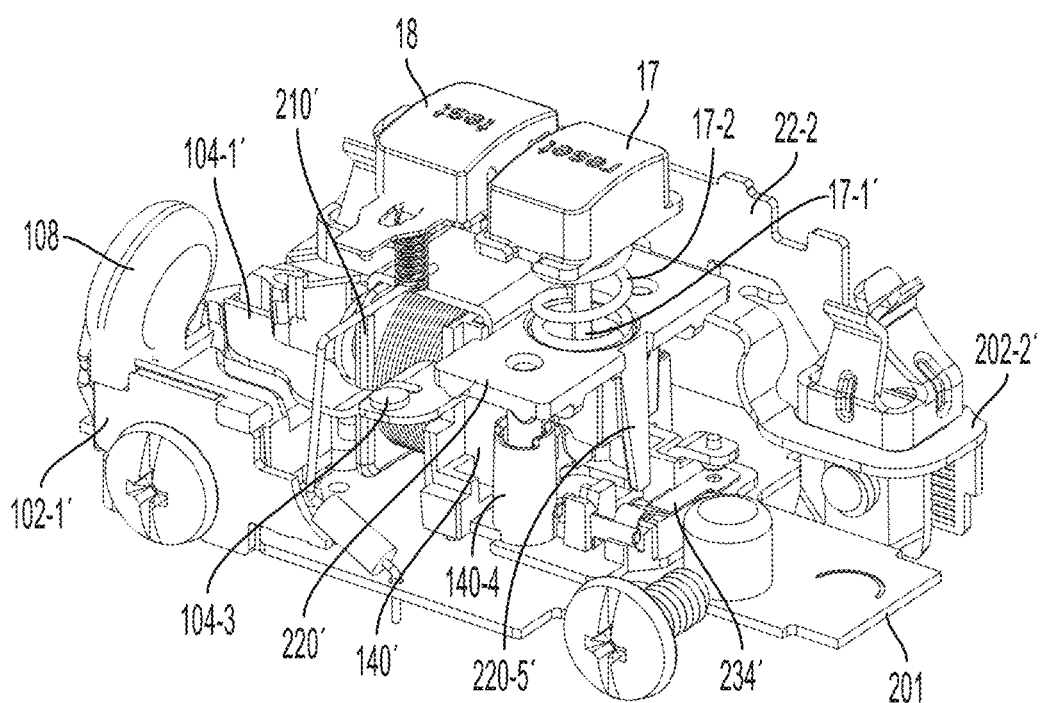
FIG. 29A is a perspective open view of various components of a protective electrical wiring device according to an alternative embodiment.
Figure 29B:
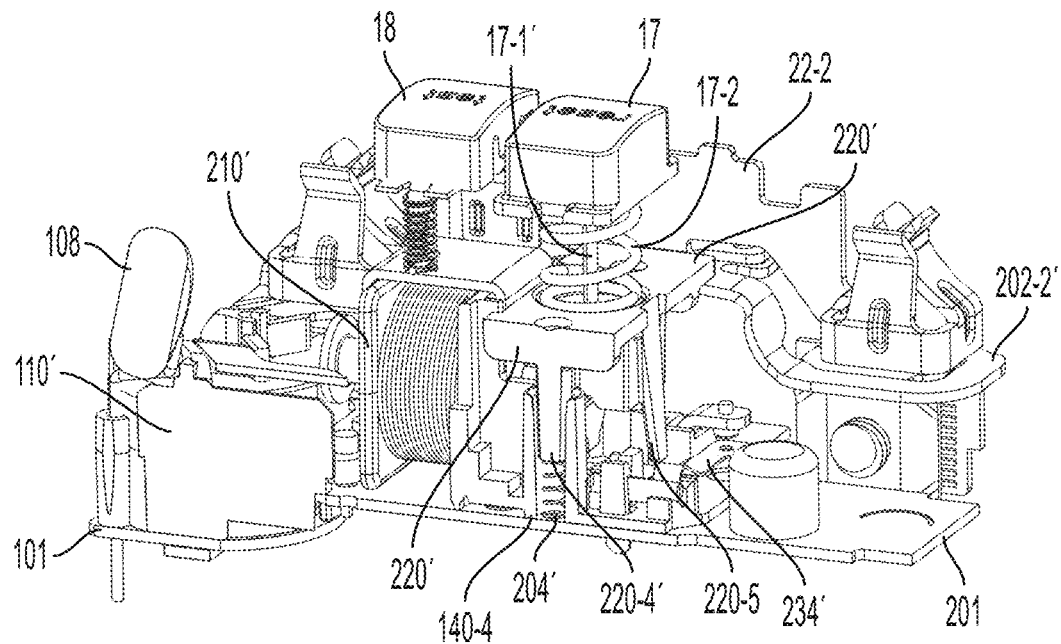
FIG. 29B is a perspective open view of various components of a protective electrical wiring device according to an alternative embodiment.
Figure 29C:
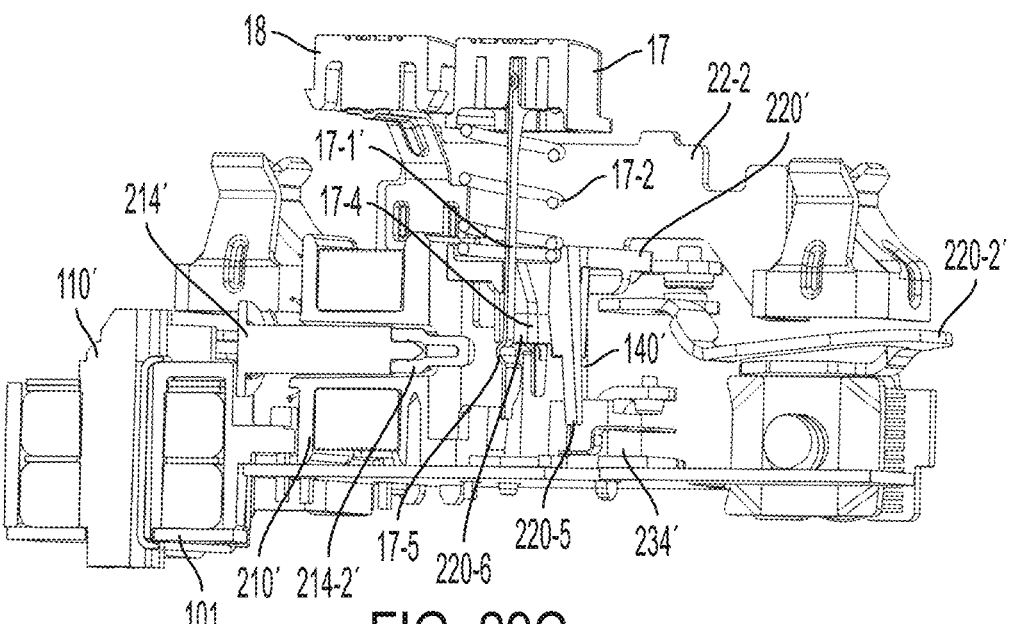
FIG. 29C is a perspective open view of various components of a protective electrical wiring device according to an alternative embodiment.
Figure 29D:
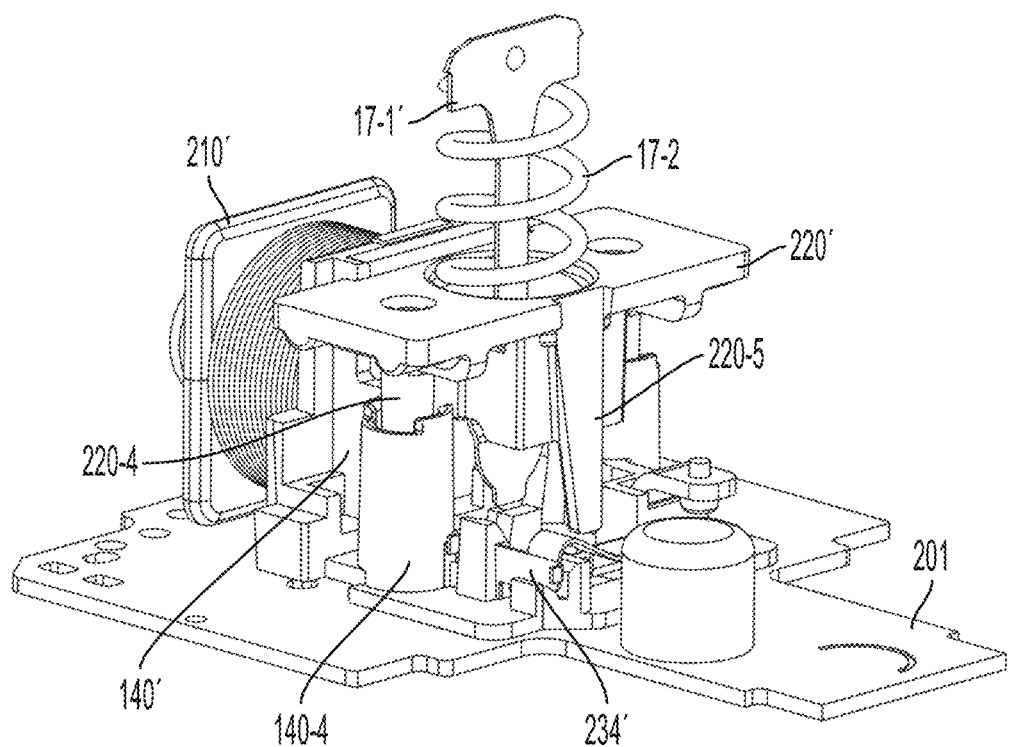
FIG. 29D is a perspective open view of various components of a protective electrical wiring device according to an alternative embodiment.
Figure 29E:
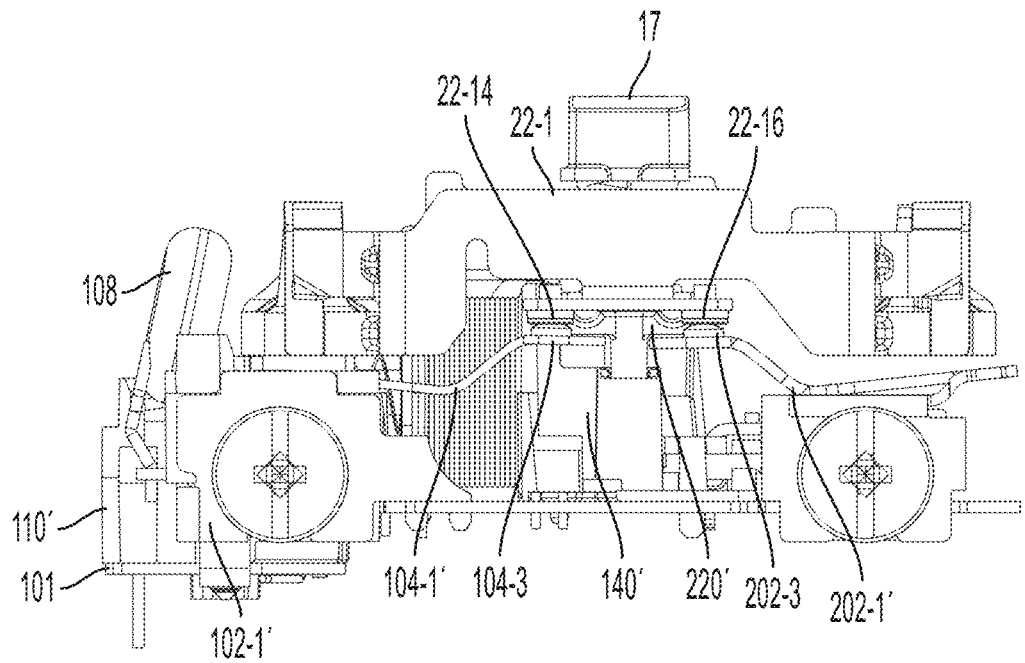
FIG. 29E is a side perspective open view of various components of a protective electrical wiring device according to an alternative embodiment.
Figure 29F:
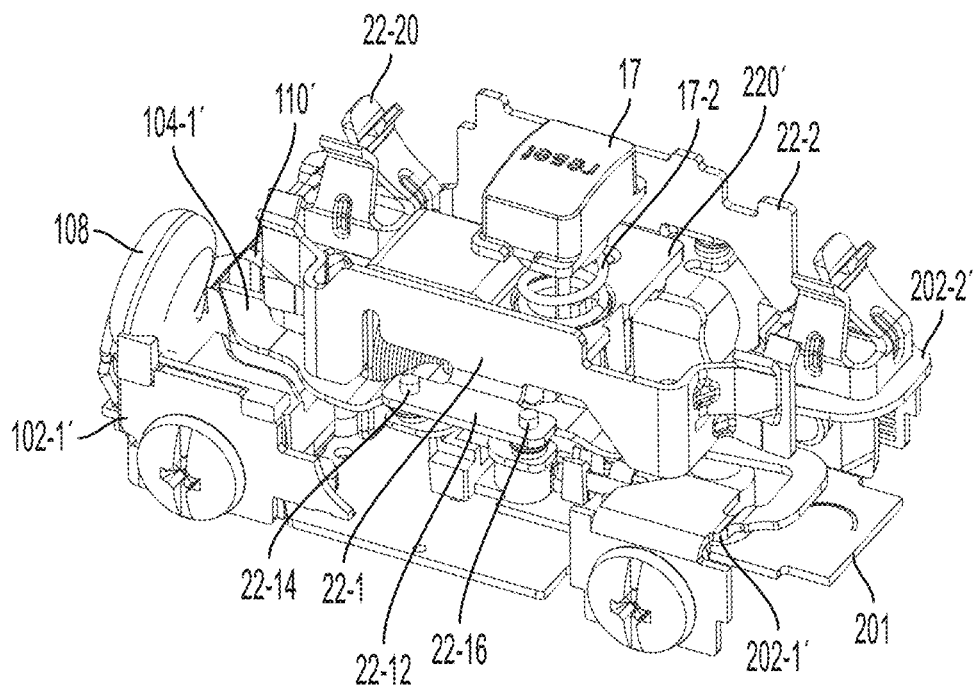
FIG. 29F is a perspective open view of various components of a protective electrical wiring device according to an alternative embodiment.
Figure 29G:
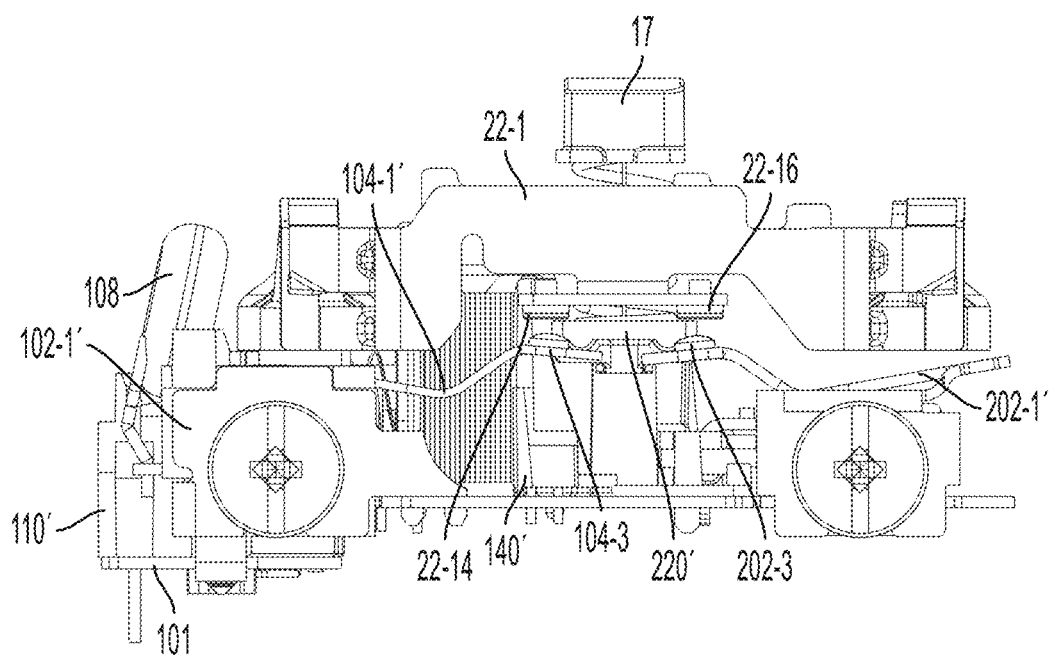
FIG. 29G is a side perspective open view of various components of a protective electrical wiring device according to an alternative embodiment.

Referring to FIGS. 27A-B, top and bottom perspective views, respectively, of the test button 18 are shown in accordance with an embodiment. The test button 18 includes a leg 18-10 extending from its bottom portion. FIG. 27C is a perspective view of the test button with certain other elements of device 10 positioned on PCB 201. In particular, test button 18 is positioned above and in contacting relation with a top portion of test blade 18-1 (see also FIG. 27F) via the leg 18-10 of test button 18. A bottom portion of test blade 18-1 is positioned through a portion of latch guide 140, and is in contacting relation with the PCB 201. The hot receptacle terminal 22-1 is also shown. The test blade 18-1 is a cantilever spring switch, and is biased "up" toward the leg 18-10 of test button 18, and in turn, biases the test button in the up direction (see FIG. 27D, a cross sectional view of a portion of the protective electrical wiring device showing the test button 18 etc. in the unactuated configuration/position). When the test button 18 is actuated/depressed by a user, the leg 18-10 of test button 18 moves down and deflects the top portion of the test blade 18-1 down until the test blade 18-1 contacts the hot receptacle terminal 22-1, and closes the circuit (see FIG. 27E, a cross sectional view of a portion of the protective electrical wiring device showing the test button 18 etc. in the actuated configuration/position). In contrast to conventional devices, a first bottom end of the test blade 18-1 of an embodiment is soldered directly to the PCB 201—leading to several benefits including cost reduction (elimination of parts, permits pick and place manufacturing—the geometry of the test blade 18-1 allows the receptacle terminals to be assembled with the device 10, i.e., the shape of test blade 18-1 does not interfere with assembly).

Additional alternative embodiments of the present invention are discussed below. Many of the elements of the alternative embodiments are the same and/or function the same as the embodiments discussed above and are not discussed again in detail below. Some of the major differences are discussed below with reference to accompanying figures.

Turning to FIGS. 28A-E, various perspective views of an alternative embodiment of a latch block 220' with a reset button 17, reset structure/catch 17-1', reset break spring 17-2, leg 220-5, and armature plunger 214' assembly (with and without the PCB 201) are shown.

Referring to FIGS. 29A-G, various perspective open views of an alternative embodiment of the protective wiring device are shown. The test button 18, reset button 17, reset structure/catch 17-1', reset break spring 17-2, latch block 220', latch guide 140' with tubes 140'-4 for positioning of legs/posts 220-4' of the latch block 220' and return springs 204' therein, MOV 108, hot line terminal 102-1', line contact arm 104-1' with movable contact 104-3, latch block leg 220-5, auxiliary contact 234' (which is normally closed during a reset state, and the latch block 220' pushes auxiliary contact 234' open in a tripped state in a similar manner described in U.S. Pat. No. 9,437,386), PCB 201, a separate PCB 101, load terminal neutral 202-2', load terminal hot 202-1' with moveable contact 202-3, fixed contact bridge 22-12 with hot fixed contacts 22-14 and 22-16, toroidal housing 110', neutral receptacle terminal 22-2, hot receptacle terminal 22-1, and solenoid bobbin assembly 210'.

The latch block 220' is similar in many respects to the latch block 220, discussed above (as should be understood and appreciated by a person of ordinary skill in the art in conjunction with a review of this disclosure). However, one major difference is that the latch block 220' includes two legs/posts 220-4 that are biased "up" toward the front cover 12 (not shown) by return springs 204' (positioned around or therein) in a reset state/position (similarly to the functionality of auxiliary spring 204 on latch block 220). These springs provide the "floating" configuration/functionality as discussed above.

Certain differences in the armature plunger 214' results in more striking force of the solenoid. For example, armature plunger 214' is shorter in length as compared with conventional armature plungers, which results in not fully penetrating the core of the inductive element. This "tricks" the solenoid/inductive element into "thinking" it has more distance to travel to the reset structure/catch 17-1'. The armature is designed to accommodate a distal tip/cap/spacer 214-2' (made from, e.g., Delrin), which is used to impact the reset structure/catch 17-1. The armature plunger 214' is also designed to have a larger diameter of the proximal end opposite end of impact of the reset structure/catch 17-1'. Each of these factors results in a greater force applied during impact of the reset structure/catch 17-1' by the armature plunger 214'.

Notably, there is no latch 230 or similar structure in this embodiment. Instead, the reset structure/catch 17-1' is held in place under a stop portion 220-6 of the latch block 220' in a reset position/configuration (see, e.g., FIGS. 28B, 28E, 29C). The reset structure/catch 17-1' is in a fixed position within the reset button, but is designed to flex within the latch block 220' as it moves between reset and tripped positions. This is different than other conventional catch/reset structure designs, which either swing/dangle from the reset button, or have a straight shot approach (typical of the pin type design). The reset structure/catch 17-1' (which can be a stamped metal piece) is also designed to have a hook-shaped distal catch portion 17-5 which serves to function with the latch block 220' (similar to the shoulder portions of the reset structure/catch 17-1 described above which function with the latch 230 to hold the latch block 220 in place in the reset state; but this distal catch portion 17-5 works directly with the latch block 220' by being positioned under stop portion 220-6 to hold the latch block 220' in place in the reset state, in part, via the fixed attachment of the reset structure/catch 17-1' to the reset button 17 and compressed with stored energy reset break spring 17-2), and also ease of manufacturability. In a tripped state, the armature plunger 214' strikes the distal catch portion 17-5, flexing the reset structure/catch 17-1' and moving the distal catch portion 17-5 into guide channel 17-4 of the latch block 220', and up along the channel via the biasing force (release of the stored energy) of the reset break spring 17-2 (while the reset break spring 17-2 also pushes the latch block down to break connection between the movable and fixed contacts in a similar manner as described above with respect to the initial described embodiment—see FIG. 29G).

Figure 30A:
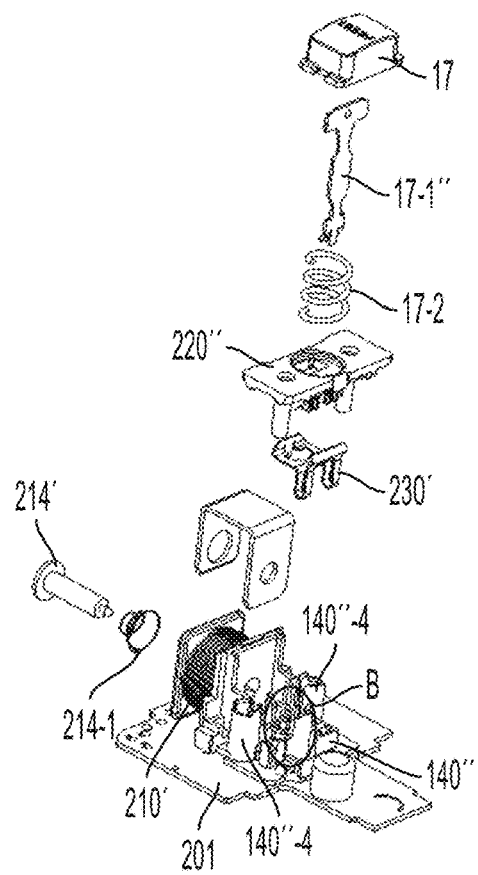
FIG. 30A is an exploded perspective view of various components of a protective electrical wiring device according to an alternative embodiment.
Figure 30B:
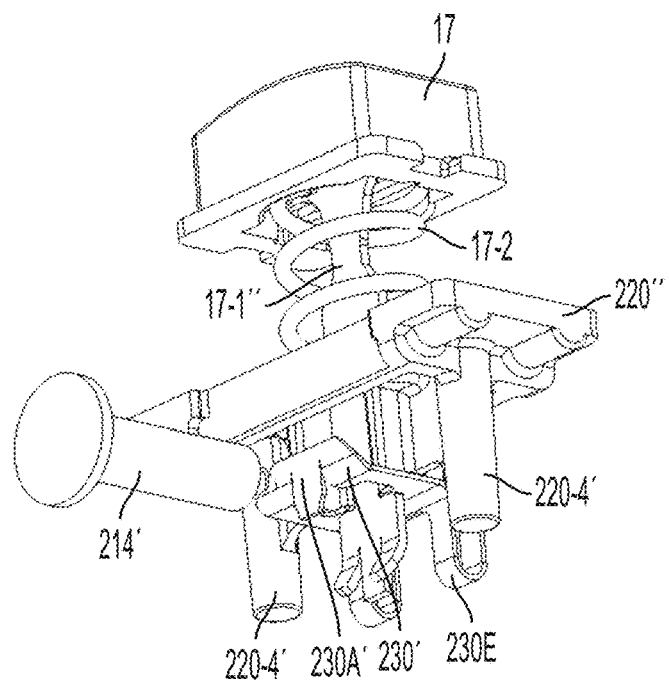
FIG. 30B is an assembled perspective view of various components of a protective electrical wiring device according to an alternative embodiment.
Figure 31:
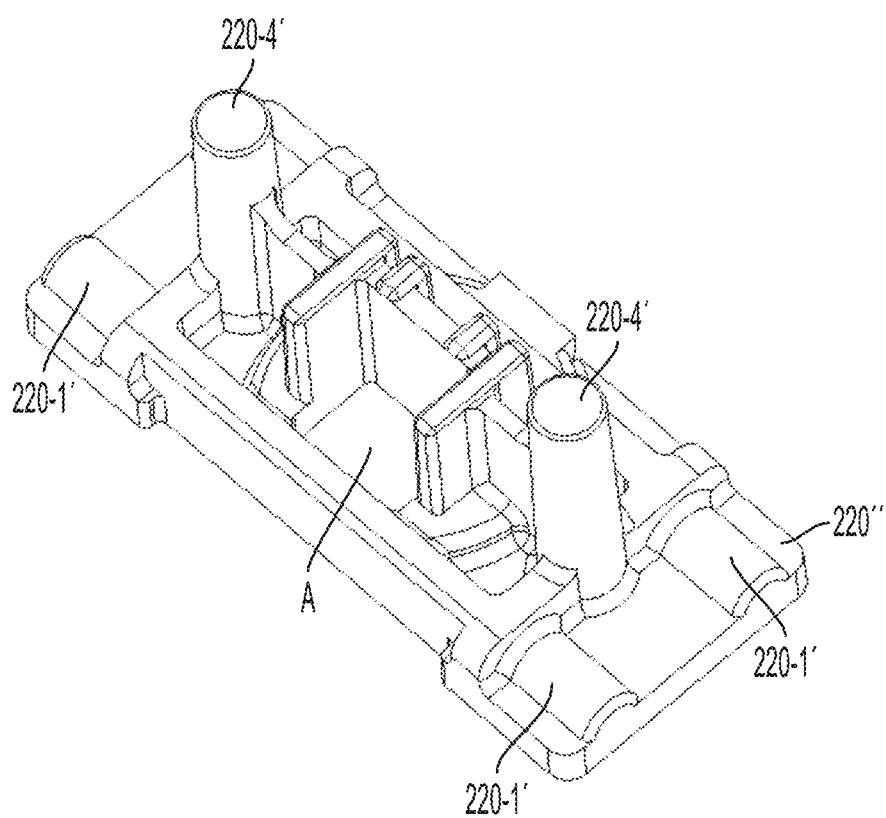
FIG. 31 is a bottom perspective view of a latch block component of an alternative embodiment.
Figure 32A:
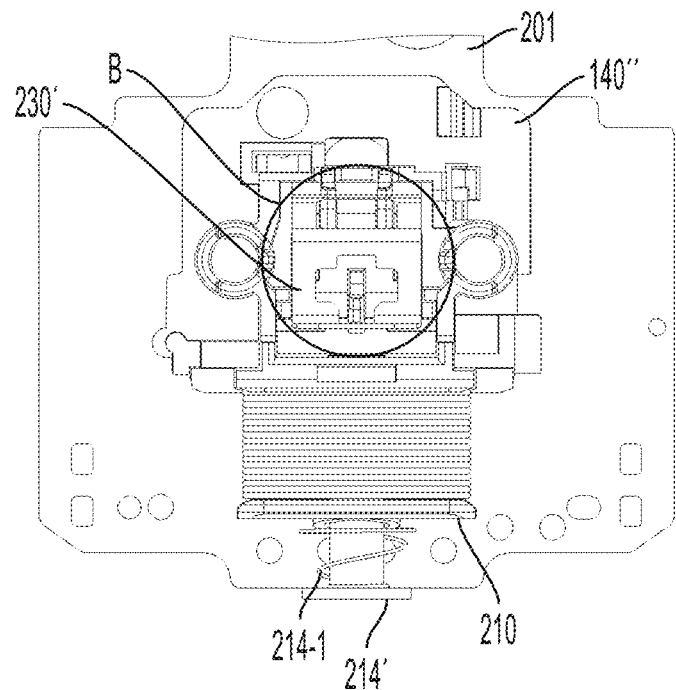
FIG. 32A is a top perspective view of a latch guide component of an alternative embodiment.
Figure 32B:
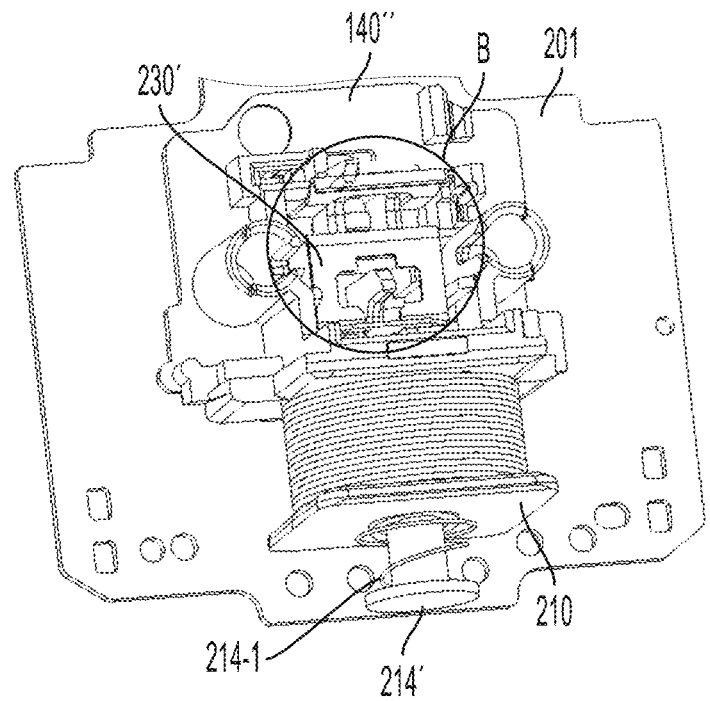

Turning to FIGS. 30A-B, an exploded and an assembled view of an alternative embodiment of a latch block 220" with a reset button 17, reset structure/catch 17-1', reset break spring 17-2, coil spring 214-1, latch 230' with a strike plate 230A' and u-shaped spring arms 230E, and armature plunger 214' assembly (with and without the PCB 201) are shown. Latch 230' includes a keyhole opening configuration that interacts with the shoulders of the reset structure/catch 17-1' in a manner similar to the first described embodiment (with latch 230 and reset structure/catch 17-1, as shown in, for example, FIGS. 18C-19C). Similar to the latch block 220' discussed immediately above, this latch block 220" includes legs/posts 220-4' and feet 220-1' (see FIG. 31, which is a bottom perspective view of the latch block 220"). As shown in FIG. 31, the latch block 220" also includes an opening "A", which does not assist with guiding the reset structure/catch 17-1" into a channel, as discussed with latch block 220', but does act as a pass through for the reset structure/catch 17-1' in a tripped state (similar to latch block 220). A solenoid bobbin assembly 210', latch guide 140" with tubes 140"-4 and area "B" where the latch 230' sits in an assembled configuration are also shown (see FIGS. 32A-B, which are top perspective views of the latch guide 140" with latch 230 positioned thereon).

Figure 33A:
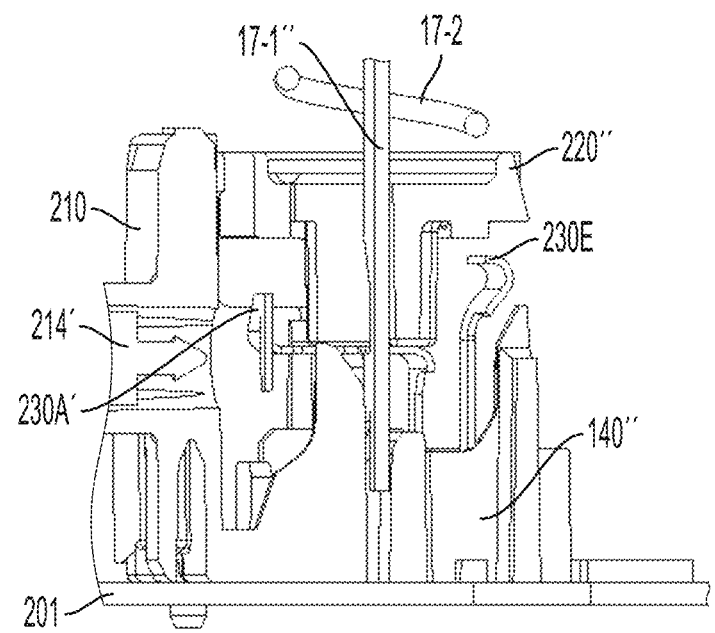
Figure 33B:
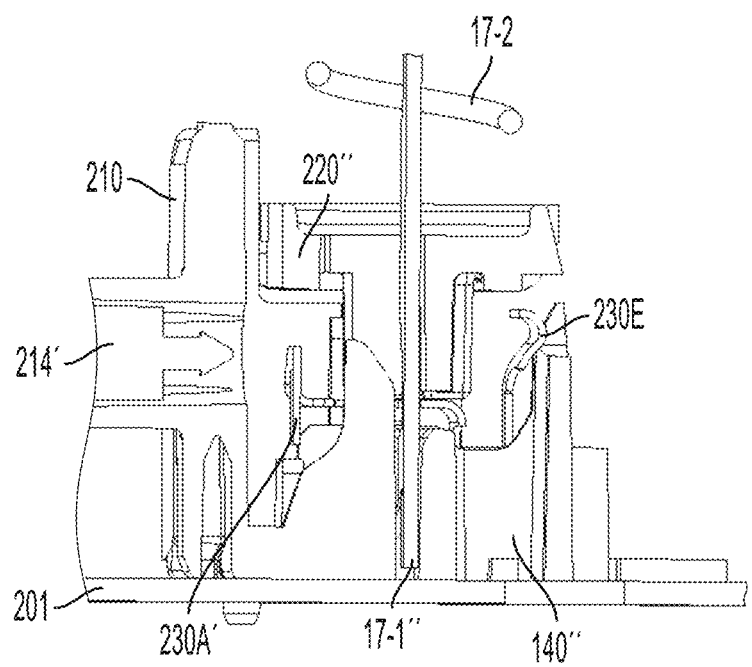

Referring to FIGS. 33A-B, sectional side views of the latch block 220" and latch guide 140" assembly are shown. Other elements shown in FIGS. 30A-B are also shown in FIGS. 33A-B. FIG. 33A shows certain elements of the device in the reset state and position. In the reset position, movement of the u-shaped spring arms 230E of latch 230 is not completely restricted (especially on the side opposite the armature plunger 214'). This allows the armature plunger 214' to use all of its force to overcome any friction of the system to move the latch 230' to the right and release the latch block 220" in a tripped state (as discussed in the first embodiment, above). Stated differently, the armature plunger 214' does not need to also overcome any stored energy in the u-shaped spring arms 230E of latch 230 upon the occurrence of a tripped state. In the tripped state and position, as shown in FIG. 33B, the u-shaped spring arms 230E are backed up by/abut a portion of the latch guide 140" so that the latch is pushed to the left in the direction of the armature plunger 214'. This force assists the latch 230" to engage shoulders of the reset structure/catch 17-1", so that the reset structure/catch 17-1" can pull up the latch block 220" upon reset in the reset position.

Figure 34A:
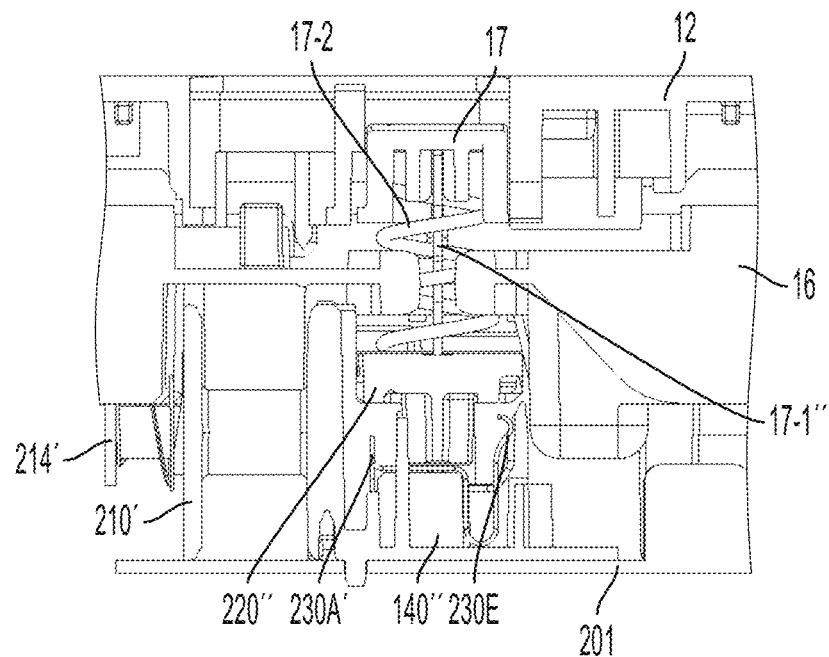
Figure 34B:
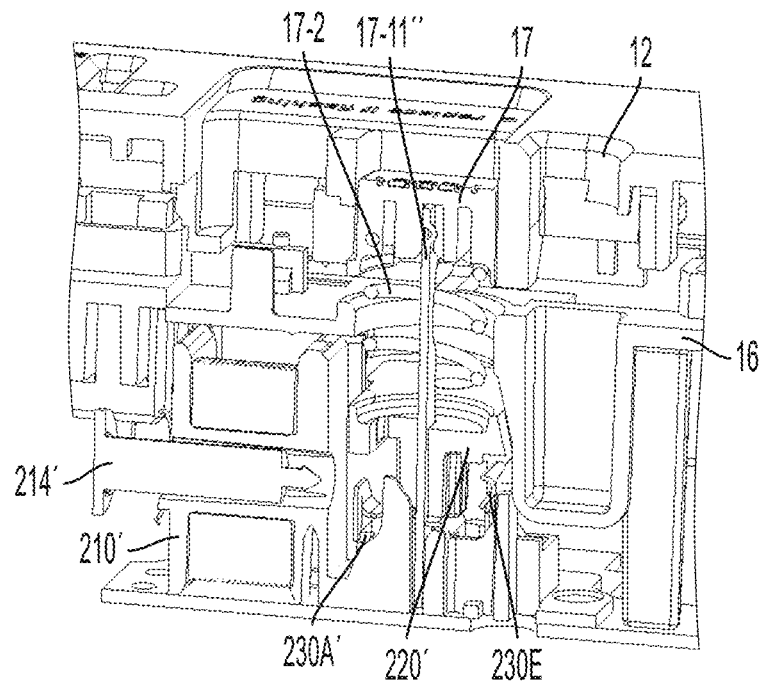
Figure 35A:
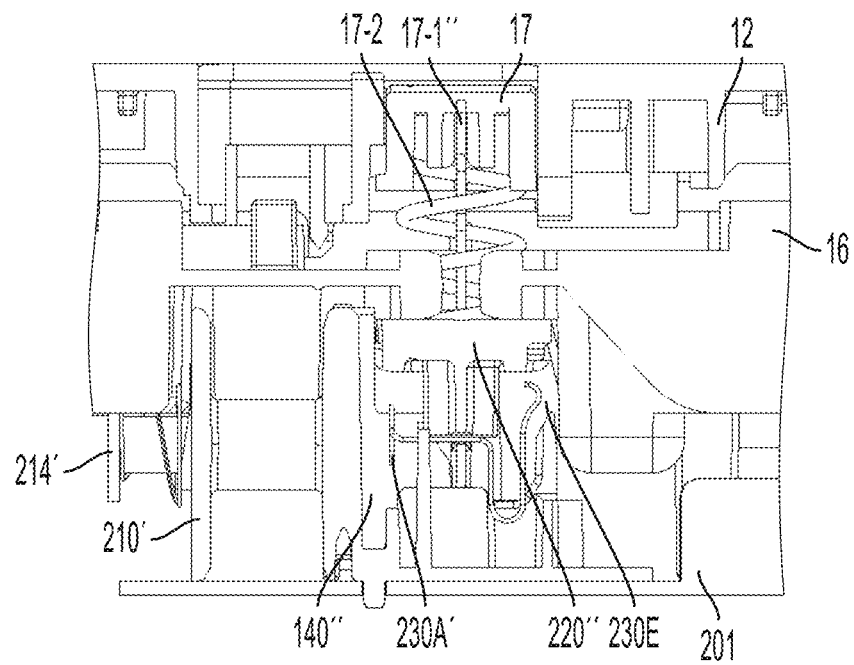
Figure 35B:
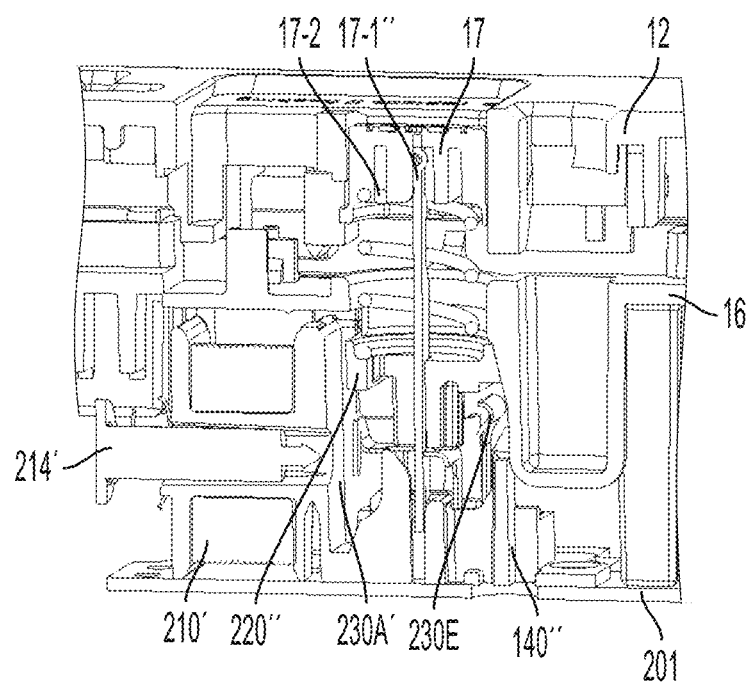
Figure 36A:
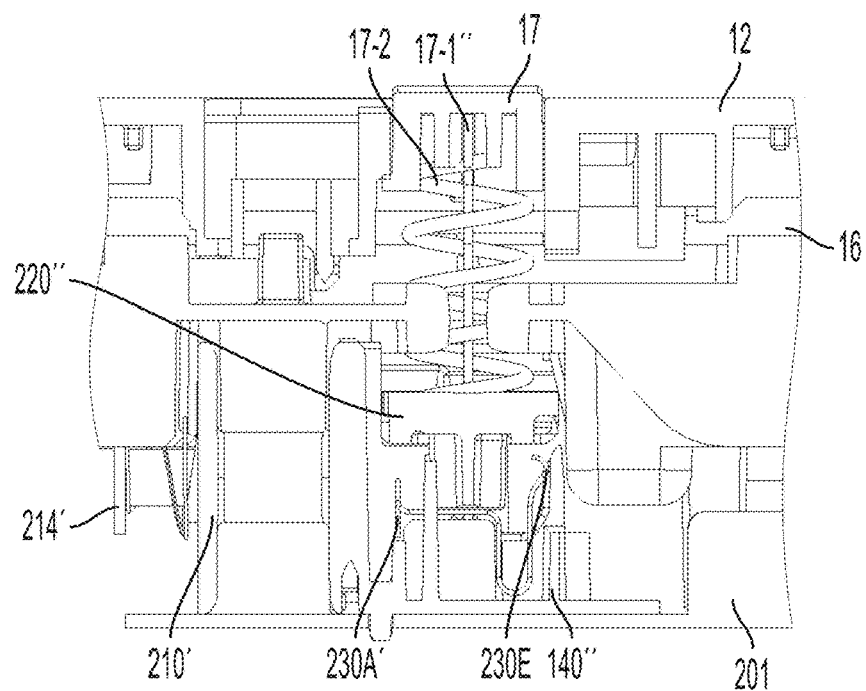
Figure 36B:
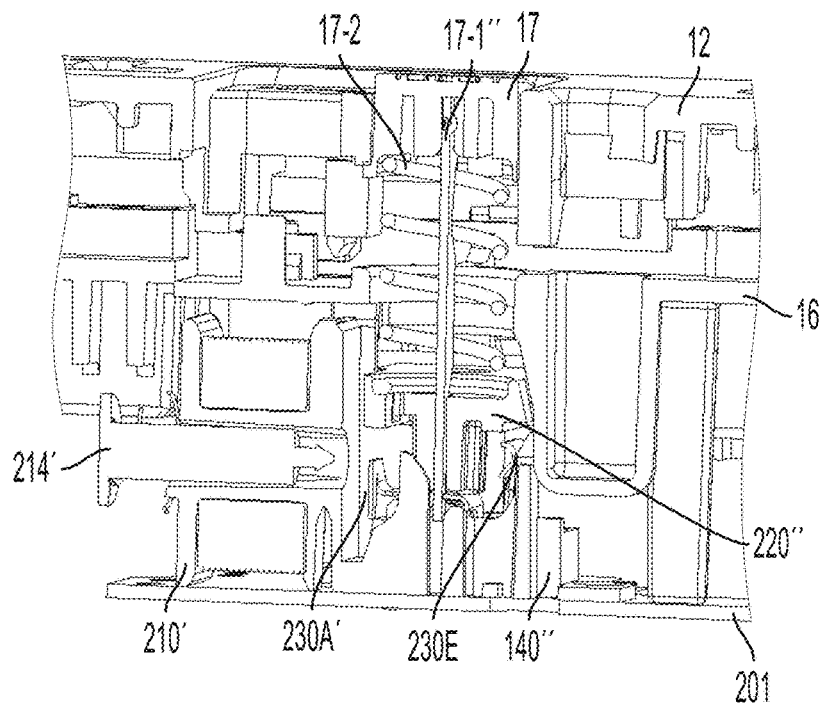

The following sets of figures show partial sectional side views of the assembled protective electrical wiring device in a reset button actuated position, a reset position and a tripped position according to an alternative embodiment. Latch 230' works in conjunction with latch block 220", reset structure/catch 17-1", armature plunger 214' and reset spring 17-2 (among other elements) in a similar manner as discussed above with respect to the first described embodiment (with latch block 220) in effectuating the reset state and position and tripped state and position. Turning to FIGS. 34A-B, partial sectional side views of the assembled protective electrical wiring device in the reset button actuated position of an alternative embodiment are shown. FIGS. 35A-B are partial sectional side views of the assembled protective electrical wiring device in the reset state and position of an alternative embodiment. FIGS. 36A-B are partial sectional side views of the assembled protective electrical wiring device in the tripped state and position of an alternative embodiment.

Referring to FIG. 37A, a partial sectional side view of the assembled protective electrical wiring device is shown according to an alternative embodiment. FIG. 37B is a perspective view of latch block 220" according to an alternative embodiment. FIG. 37C is a partial bottom view of separator 16' according to an alternative embodiment. The separator 16' has a wedge shaped structure 16-5 near an opening that mates with a wedge shaped structure 220"-5 of the latch block 220". These mating wedge structures assure firm positioning of the latch block 220" for entering the trip state and position from a reset state and position. In brief, the angled "wedged" surfaces of the latch block 220" and separator 16' mate when the device is reset. A purpose of the wedged configuration is to align the latch block/catch in position so it can be actuated with the armature in a tripped state (when a fault is detected). The wedged configuration also prevents movement of the latch block 220" during armature movement (the catch moves, but not the latch block).

Figure 38:
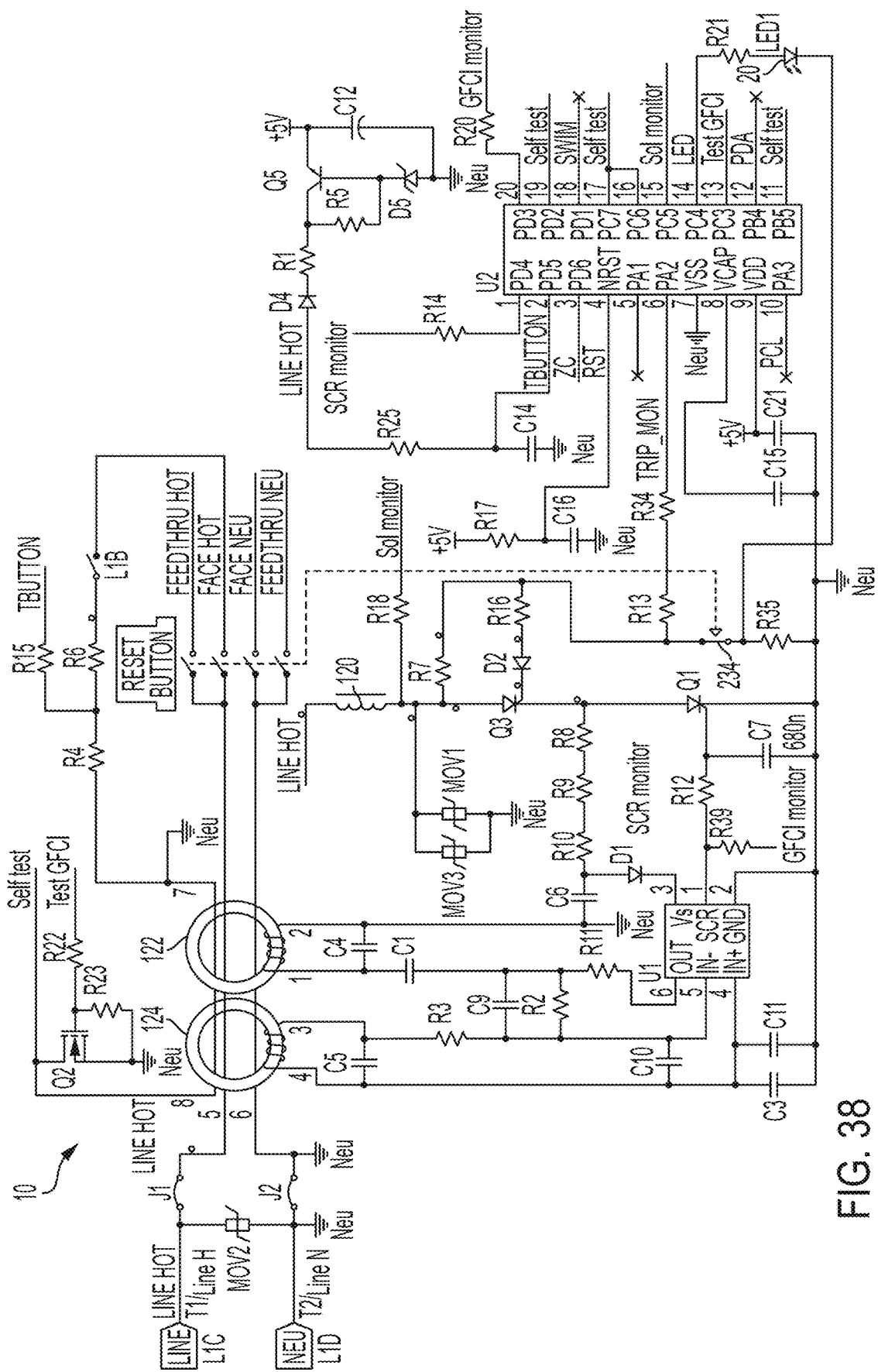

As embodied herein and depicted in FIG. 38, a schematic block diagram of the protective device 10 is disclosed that may be implemented using the arrangement depicted in the remaining figures. Because this is a schematic representation, it shows the electrical connections but not necessarily the mechanical implementation.

The protective device 10 includes a differential transformer 124 which is configured to sense load-side ground faults, i.e. ground faults located in loads connected to load terminals or receptacle contacts. Transformer 122 is configured as a grounded neutral transmitter that is configured for grounded-neutral fault detection. Both differential transformer 124 and grounded-neutral transformer 122 are electrically coupled to the fault detector U1. Detector U1 receives power from half wave rectification diode D1, inputting power to Vs pin 3 of detector U1 and further processed by internal regulation circuit. The output of the detector U1 is connected to the control input of SCR Q1. When SCR Q1 is turned ON, the solenoid coil 212 is energized to actuate the circuit interrupter such that the circuit interrupter opens and switch 234 closes. Solenoid coil 212 remains energized for a time period that is typically less than about 25 milliseconds. When the circuit interrupter trips, the line terminals are disconnected from their respective load terminals or receptacle contacts. After the fault condition has been eliminated, the circuit interrupter may be reset by way of a reset button. MCU U2 provides additional functionality to monitor detector U1. MCU U2 is responsible for self test, miswire detection and indicating status. Unlike detector U1 which only receives power and operates within the positive half cycles, MCU U2 has power and functions throughout the entire line cycle (positive and negative). This is accomplished via half wave rectification diode D4 and voltage regulator Q5, R5, D5, C12, where C12 provides storage during the negative half cycle. MCU U2 controls FET Q2 during self test via Test GFCI node, where drain of Q2 is provided with a positive DC voltage via multiple 10 via MCU U2. Various other 10 of MCU U2 are utilized for basic yet essential standard MCU practices such as zero cross ZC monitoring, system power availability via RST node, programming nodes, etc. Some aspects of self-test and miswire test of MCU U2 will be described in detail below, with reference, as appropriate, to related patents. Other aspects of MCU U2 are known and do not require a detailed explanation here.

The differential transformer 124 includes a secondary winding which is coupled to the fault detector U1 accompanied by noise filtering circuitry. The differential transformer 124 senses the current differential between the hot and neutral conductors and provides a sensor signal to the ground fault detector U1 via the (IN−, IN+) inputs. When the differential current (sensor signal) exceeds a predetermined threshold value, the fault detector U1 should cause the SCR output to go HIGH.

The grounded neutral transmitter 122 is configured to detect a grounded neutral condition. (The line neutral conductor is typically grounded in the electrical circuit at the panel—this does not constitute a grounded neutral fault condition). The neutral transmitter 122. is configured to couple equal signals into the hot, neutral and self test (3rd wire) conductors. Because the differential transformer 124 is configured to sense a current differential, the equal signals provided by the grounded neutral transmitter 124 effectively cancel each other out. On the other hand, a grounded neutral condition does occur when the load neutral conductor (i.e., the conductor that is connected to the load neutral terminal or the neutral receptacle contact) is accidentally grounded. This creates a parallel conductive path (relative to the neutral return path) between the neutral line terminal and neutral load terminal. As a result, another signal circulates around this current loop and is coupled onto the neutral conductor (but not the hot conductor) to create a differential current. The differential transformer 124 senses the differential current between the hot and neutral conductors and the detector U1 generates a fault detection signal to actuate SCR Q1, energize solenoid coil 212 and trip the circuit interrupter.

The MCU U2 may generate a simulated grounded neutral test signal by way of wire loop when FET Q2 is turned ON. When the FET Q2 is turned ON, the grounded neutral transmitter 122 produces an oscillating signal that is a function of the full power supply voltage. The ON state resistance of the FET is less than about 4 Ohms. Thus, the wire loop, in combination with the FET (in the ON state), form a loop that passes through the differential transformer 124 and grounded neutral transmitter 122 to simulate a grounded neutral condition. One advantage for placing the third wire within the wire loop relates to improved noise immunity. When the third wire is employed, the wire loop and the neutral conductor are isolated such that the current propagating in wire loop during the self-test is not affected by voltage drops or electrical noise propagating in the neutral conductor. Noise propagating on the neutral conductor could otherwise impair the test fault signal and its detection by the GFCI.

The timing of the FET ON state is controlled by the RC timing network R12, C7 and by processor U1. In one embodiment of the present invention, the FET is turned ON near the conclusion of the positive half cycle of the AC power source and remains ON through a portion of the negative half cycle to produce the test fault signal. The grounded neutral transformer 122 helps generate a differential current in response to a magnetic coupling provided by the wire loop. The differential current is, in turn, sensed by differential transformer 124. If the circuit is working properly, the sensor signal provided by differential transformer 124 should be deemed by detector U1 as a fault. Since the auto-test is performed during the negative half cycle or late in the positive half cycle such, SCR Q1 will not be turned ON and the device will not nuisance trip. In another embodiment, the grounded neutral is induced in the earlier and stronger parts of the positive half cycle, where the SCR Q1 can easily be triggered and result in breaking the contacts. However, the grounded neutral condition can be removed as controlled by MCU U2 before reaching the trigger threshold of SCR Q1. Thus, in combination of the test methods, it is possible to test functionality anywhere within the line cycle.

One of the functions of the MCU U2 is to orchestrate a four-step self-testing regimen. In the first step of the automated test process, a simulated fault (e.g., a grounded neutral fault) is performed during the positive half cycle of the AC line cycle to test the GFI (i.e., the sensors differential transformer 124, 122 and detector U1). The second test is directed to testing the operability of the SCR Q1, and this test is performed in a negative half cycle of the AC line cycle. The third test of the auto-test process determines if SCR Q3 is operating properly and this test is performed in a positive half cycle after the second test. Fundamental concepts of these tests are described in U.S. Pat. No. 10,020,649, incorporated herein by reference in its entirety. In addition, a fourth test determines if solenoid coil 212 is functioning properly by monitoring whether a HIGH signal is observed during a positive half-cycle of the AC line cycle.

In the event of a failed test, MCU U2 will cause the circuit interrupter to trip. In addition, an indicator may signal that an end-of-life (EOL) state has been reached. The indicator may be a visual indicator, such as indicator light 20, but those skilled in the art will appreciate that it may be implemented as an audible indicator or as both an audible and visual indicator. In alternate embodiment, after an end of life condition is detected, the indicator may provide a cyclical or oscillating indication to alert the user that power denial is imminent. After a predetermined interval, the power denial is implemented to trip the device. Once tripped due to EOL, the device cannot be reset. In another embodiment the device can be reset, however, it will trip again after another predetermined interval.

Thus, device 10 may include MOV 2 and two additional movistors MOV1 and MOV3 disposed in the signal conditioning circuits. The movistors, of course, are configured to protect the GFCI from lighting surges. Since MOV 2 is disposed across-the-line it is relatively large (12 mm) in order to withstand surges. Since the movistors in the conditioning circuit are disposed in series with the solenoid coil 212, they may be relatively smaller in size (e.g., 5-7 mm). The inductance of solenoid coil 212 serves as a high frequency filter that limits the surge energy that the conditioning circuit MOVs must absorb in the event of a lightning strike.

In the event of SCR Q1 shorting or device 10 being in the tripped state for an extended period of time, the resulting flow of current through solenoid coil 212 can cause solenoid coil 212 to fuse open. SCR Q3 is thus used to prevent the flow of current through K1A that would otherwise result in K1A fusing opening. (In an alternate embodiment, instead of an SCR, a transistor, such as a BJT, may be used). During operation, the solid-state switch must thus be opened (i.e., cease conducting current) after the device is tripped, which occurs after the SCR Q1 is closed resulting in 234 closing either due to a fault (during proper operation) or an end-of-life condition. Thus, in the reset state, the solid-state power-denial switch must be biased closed to allow current to flow through SCR Q1 and inductor K1A in the event of a fault. And, in the tripped state, the solid-state power-denial switch must be opened to deny power to inductor K1A. This is accomplished via 234, which is opened in the reset state, resulting in a high voltage (i.e., above the SCR gate voltage) being present at the gate of SCR Q3, and closed in the tripped state, resulting in a low voltage (i.e., below the SCR gate voltage) at the gate of SCR Q3. Power is thus provided to inductor K1A in a reset state when the SCR Q1 is in good working order and denied to inductor K1A when the device is tripped or the SCR Q1 experiences an end-of-life condition.

MCU U2 may provide miswiring protection capabilities. The miswire detection functions are described in detail in U.S. Pat. No. 10,020,649, again incorporated by reference in its entirety. Whether device 10 is properly wired or in a miswired state of the GFCI can be stored, and, thus, appropriate action may be performed during power up. For example, one bit of non-volatile memory may be used for this function although the system memory may include more. The one-bit memory, i.e., the wiring state register, is used to store the wiring state of the device. (1=miswiring, 0=proper wiring). Thus, when the wiring state register stores a LOW (0), MCU U2 allows the circuit interrupter to be reset (assuming that an end-of life state is not extant). However, if the wiring state register is HIGH (1), it indicates a miswired condition and the circuit interrupter cannot remain reset because the processor will keep tripping the interrupter until the proper wiring is achieved and the memory bit is set to a LOW state. As described above, the wiring state register is implemented using flash memory in one embodiment of the invention. While the device is being manufactured, one of the final assembly steps before the device enters the stream of commerce is to write a logic one into the wiring state register. While values of 1 and 0 are used to store the miswire and proper states, respectively, it should be understood that these values are merely provided as examples, and in alternate embodiments, a 1 may be used to represent proper wiring and a 0 may be used to represent a miswire state.

It will be apparent to those of ordinary skill in the pertinent art that modifications and variations can be made to the MCU U2 of the present invention depending on the degree of processing sophistication. MCU U2 includes on-board memory that typically includes random access memory (RAM) and read only memory (ROM). The embedded processor 252 functions may be implemented using hardware, software, embedded processors, signal processors, RISC computers, application specific integrated circuits (ASICs), field programmable gate array (FPGA) devices, gate array state machines, customized integrated circuits and/or a combination thereof. The RAM memory may have battery back-up. Thus, the embodiments of the present invention are not limited to any specific combination of hardware circuitry and/or software. Taken together, RAM and ROM may be referred to herein as "computer-readable media." The term "computer-readable medium," as used herein, refers to any medium that participates in providing data and/or instructions to the processor for execution. For example, the computer-readable media employed herein may include any suitable memory device including SRAM, DRAM, NVRWM, PROM, E2PROM, Flash memory, or any suitable type of memory. The Flash memory or RAM with battery back-up are examples of non-volatile memory that is provided herein to store the wiring state of the device for multi-use miswire purposes.

In an embodiment, resistors R13 and R34 couple the auxiliary switch 234 into the MCU U2 to allow for the MCU U2 to read the position of K1B. Resistors R7, R16 and D2 serve to bias Q3 normally on when there is positive rated voltage from LINE HOT to NEUTRAL. A high current path exists from K1A, Q3 and Q1. In an embodiment, Q3 is an SCR, as opposed to an NPN transistor or FET, because the SCR is the only semiconductor which will convert low current (~85 µA into gate) into large current (~2 Apk) from Anode to Cathode, at a low cost. In other words, the SCR and the FET are capable of such a transfer function, but high voltage FETs are expensive. Aux switch 234 is open when the GFCI is reset and closed when the GFCI is tripped. (In an alternate embodiment, the expensive NPN transistor, FET, or comparable component, may be selected over the SCR for implement Q3)

In the reset state, the aux switch 234 is open. This allows the R7-R16-D2 electrical path to keep Q3 in conduction in every half cycle. This is important so that there is no additional delay to the trip time. Also, there is 170 Vpk at LINE HOT biasing the MCU U2 input TRIP_MON to read a logic 1 value.

In the tripped state, the aux switch 234 is closed. With the aux switch 234 is connected to NEUTRAL through R35—this essentially short circuits the R7-R16 node to 0V. Therefore, no current can flow into Q3-gate and Q3 is no longer in conduction. This is valuable because in the failure mode of 'a shorted SCR' (in other words, End Of Life, short anode to cathode), protective device 10 will repeatedly trip indefinitely. This means that the solenoid windings must be kept from failing given repeated trips. Interrupting current through the solenoid windings in the tripped condition allows this path to withstand the EOL condition.

In the tripped state, TRIP_MON is now connected to NEUTRAL or 0V and so the MCU input reads a logic 0 value. Mechanically, this is important because the design interrupt 2 Apk current through the solenoid while passing only 85 µA through the aux switch. Pass such little current through the aux switch 234 allows the design to use less conductive contact materials, such as springs, to serve as switch components.

It should be understood that the values used above are only representative values, and other values may be in keeping with the spirit and intention of this disclosure.

While several inventive embodiments have been described and illustrated herein with reference to certain exemplary embodiments, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein (and it will be understood by one skilled in the art that various changes in detail may be effected therein without departing from the spirit and scope of the invention as defined by claims that can be supported by the written description and drawings). More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Further, where exemplary embodiments are described with reference to a certain number of elements it will be understood that the exemplary embodiments can be practiced utilizing either less than or more than the certain number of elements.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A protective electrical wiring device, comprising:

a plurality of line terminals including a first line terminal and a second line terminal;

a plurality of load terminals including a first load terminal and a second load terminal, wherein the plurality of line terminals and the plurality of load terminals are configured to be coupled to an AC electrical distribution system;

a pair of contacts including a first contact and a second contact; and a latch block being configured to move between a first position and a second position, wherein in the first position the latch block permits the first line terminal and the first load terminal to be in contact with the first contact and the second line terminal and second load terminal to be in contact with the second contact without exerting a force on the first line terminal, first load terminal, the second line terminal or second load terminal toward a respective first contact or second contact, wherein, when moving from the first position to the second position, the latch block advances at least one of the first line terminal and the first load terminal away from the first contact by exerting a force on the first line terminal or the first load terminal, and at least one of the second line terminal and the second load terminal away from the second contact by exerting a force on the second line terminal and the second load terminal, wherein the protective electrical wiring device is in a reset state when the latch block is in the first position and in a tripped state when the latch block is in the second position.

2. The protective electrical wiring device of claim 1, wherein the at least one of the first line terminal and first load terminal comprises a cantilevered spring biased against the first contact.

3. The protective electrical wiring device of claim 2, wherein the first line terminal comprises a first cantilevered spring biased against the first contact and the first load terminal comprises a second cantilevered spring biased against the first contact.

4. The protective electrical wiring device of claim 1, wherein the at least one of the second line terminal and second load terminal comprises a cantilevered spring biased against the second contact.

5. The protective electrical wiring device of claim 4, wherein the first line terminal comprises a first cantilevered spring biased against the first contact and the first load terminal comprises a second cantilevered spring biased against the first contact.

6. The protective electrical wiring device of claim 1, wherein the latch block is biased in the first position by a first spring.

7. The protective electrical wiring device of claim 6, wherein the latch block is driven from the first position to the second position by a second spring upon the occurrence of a detected fault, the second spring being compressed when the latch block is in the first position.

8. The protective electrical wiring device of claim 1, wherein the first line terminal is a hot line terminal and the second line terminal is neutral line terminal, wherein the first load terminal is a hot load terminal and the second load terminal is a neutral load terminal.

9. The protective electrical wiring device of claim 1, wherein the first contact is a hot receptacle terminal and the second contact is a neutral receptacle terminal.

* * * * *